United States Patent
Herzog et al.

(10) Patent No.: US 11,996,520 B2
(45) Date of Patent: May 28, 2024

(54) ELECTROLYTE ADDITIVES FOR FAST CHARGING LITHIUM ION BATTERIES

(71) Applicant: StoreDot Ltd., Herzeliya (IL)

(72) Inventors: Ido Herzog, Tel Aviv (IL); Sanaa Musa, Deir El-assad (IL); Shirel Cohen, Tel Aviv (IL); Rony Schwarz, Kibbutz Ma'anit (IL); Eran Sella, Tel Aviv (IL)

(73) Assignee: STOREDOT LTD., Herzeliya (IL)

( * ) Notice: Subject to any disclaimer, the term of this patent is extended or adjusted under 35 U.S.C. 154(b) by 735 days.

(21) Appl. No.: 16/774,004

(22) Filed: Jan. 28, 2020

(65) Prior Publication Data

US 2021/0234197 A1   Jul. 29, 2021

(51) Int. Cl.
| | |
|---|---|
| H01M 4/00 | (2006.01) |
| H01M 4/38 | (2006.01) |
| H01M 4/485 | (2010.01) |
| H01M 4/505 | (2010.01) |
| H01M 4/525 | (2010.01) |
| H01M 10/0525 | (2010.01) |

(Continued)

(52) U.S. Cl.
CPC ....... *H01M 10/0567* (2013.01); *H01M 4/386* (2013.01); *H01M 4/387* (2013.01); *H01M 4/485* (2013.01); *H01M 4/505* (2013.01); *H01M 4/525* (2013.01); *H01M 10/0525* (2013.01); *H01M 10/0569* (2013.01); *H01M 2300/0051* (2013.01)

(58) Field of Classification Search
CPC .. H01M 4/386; H01M 10/0525; H01M 4/505; H01M 2300/0051
See application file for complete search history.

(56) References Cited

U.S. PATENT DOCUMENTS

| | | |
|---|---|---|
| 10,096,859 B2 | 10/2018 | Burshtain et al. |
| 10,199,677 B2 | 2/2019 | Drach et al. |
| 2017/0294687 A1 | 10/2017 | Burshtain et al. |

(Continued)

FOREIGN PATENT DOCUMENTS

| | | | |
|---|---|---|---|
| WO | WO 2018/109774 | 6/2018 | |
| WO | WO-2018116159 A1 * | 6/2018 | ........... C07D 265/30 |

OTHER PUBLICATIONS

Bulinski, Hydrofluoroolefins and Methods of Using Same, Jun. 2018, See the Abstract. (Year: 2018).*

*Primary Examiner* — Cynthia H Kelly
*Assistant Examiner* — Monique M Wills
(74) *Attorney, Agent, or Firm* — Reches Patents

(57) ABSTRACT

Lithium ion batteries and electrolytes therefor are provided, which include electrolyte additives having dithioester functional group(s) that stabilize the SEI (solid-electrolyte interface) at the surfaces of the anode material particles, and/or stabilize the CEI (cathode electrolyte interface) at the surfaces of the cathode material particles, and/or act as oxygen scavengers to prevent cell degradation. The electrolyte additives having dithioester functional group(s) may function as polymerization controlling and/or chain transfer agents that regulate the level of polymerization of other electrolyte components, such as VC (vinyl carbonate) and improve the formation and operation of the batteries. The lithium ion batteries may have metalloid-based anodes—including mostly Si, Ge and/or Sn as anode active material particles.

2 Claims, 5 Drawing Sheets

(51) Int. Cl.
*H01M 10/0567* (2010.01)
*H01M 10/0569* (2010.01)

(56) References Cited

U.S. PATENT DOCUMENTS

| | | |
|---|---|---|
| 2019/0148774 A1 | 5/2019 | Kuks et al. |
| 2019/0198912 A1 | 6/2019 | Sella et al. |
| 2020/0099090 A1* | 3/2020 | Li .................. H01M 10/0567 |
| 2021/0194059 A1* | 6/2021 | Zhang ............. H01M 10/0525 |

* cited by examiner

ELECTROLYTE ADDITIVES FOR FAST CHARGING LITHIUM ION BATTERIES

BACKGROUND OF THE INVENTION

1. Technical Field

The present invention relates to the field of energy storage devices, and more particularly, to electrolytes and electrolyte additives for lithium ion batteries.

2. Discussion of Related Art

Lithium ion batteries are used for a growing range of applications, as their safety and performance are improved. The electrolytes of lithium ion batteries are an important component that affects their safety and performance.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an electrolyte solution for a fast charging a lithium ion battery, comprising linear solvent comprising at least one four-carbon chain ester, cyclic carbonate solvent comprising at least vinyl carbonate (VC) solvent, additives at an amount smaller than 5 wt %, and at least one lithium salt, wherein the at least one four-carbon chain ester is represented by the structure of Formula (XVIa), Formula (XVIb) or any combination thereof:

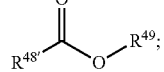

(XVIa)

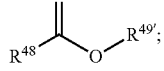

(XVIb)

wherein
$R^{45'}$ is a $C_3$-$C_{10}$ alkyl, $C_3$-$C_{20}$ alkyl or $C_3$-$C_{30}$ alkyl;
$R^{46'}$ is $C_4$-$C_{10}$ alkyl, $C_4$-$C_{20}$ alkyl or $C_4$-$C_{30}$ alkyl;
$R^{48}$ is alkyl, haloalkyl, cycloalkyl, aryl, heteroalicyclic, benzyl or heteroaryl;
$R^{49}$ is alkyl, haloalkyl, cycloalkyl, aryl, heteroalicyclic, benzyl or heteroaryl;
each of the alkyl, haloalkyl, cycloalkyl, aryl, heteroalicyclic, benzyl or heteroaryl of $R^8$, $R^{48'}$, $R^{49}$ or $R^{49'}$ is optionally substituted with one or more of alkyl, haloalkyl, alkenyl, alkynyl, heteroalicyclic, heteroaryl, O—P(=O)(OR$^{48}$)$_2$, trihalomethyl, cyano, S(=O)—R$^{48}$, S(=O)$_2$—R$^{48}$, S(=O)$_2$—NR$^{48}$R$^{49}$, halide, cycloalkyl, alkoxy, nitro, NR$^{48}$R$^{49}$, C(O)NR$^{48}$R$^{49}$, N(R$^{48}$)C(=O)—R$^{49}$, hydroxy, alkylthiol, thiol, arylthiol, heteroarylthiol, C(=O)—OR$^{48}$, C(=O)—R$^{48}$, aryl, aryloxy, heteroaryloxy, (CH$_2$CH$_2$O)$_{n+1}$ or any combination thereof; and n is an integer between 0 and 10.

One aspect of the present invention provides lithium-ion batteries having electrolytes with additive(s) having dithioester (—C(=S)—S—), diselenoester (—C(=Se)—Se—), thioselenoester or selenothioester ((—C(=S)—Se—) or (—C(=Se)—S—) functional group(s).

For example, one aspect of the present invention provides lithium ion battery comprising: at least one anode comprising active material based on Si, Ge and/or Sn, at least one cathode comprising active material based on at least one formulation comprising lithium Nickel-Manganese-Cobalt (NMC) and/or at least one formulation comprising modified Li-NMC (Li$_w$Ni$_x$Mn$_y$Co$_z$O$_2$) and/or at least one formulation comprising LiMeO wherein Me comprises one or more of Ni, Co, Fe, Mn, Al and Li and O comprise one or more respective lithium and oxygen atoms, and/or at least one formulation comprising lithium Nickel Cobalt Aluminum oxide (NCA), and electrolyte comprising: solvent comprising at least one linear carbonate and/or ester and at least one cyclic carbonate and/or ester, at least one dissolved lithium salt, and at least one additive that is represented by Formula (I) and/or (Ib):

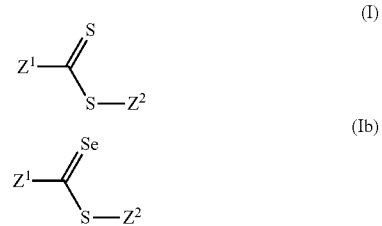

wherein:
$Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, NR$^1$R$^2$, P(=O)R$^1$R$^2$, benzyl, thiol, arylthiol, alkylthiol, heteroarylthiol, O(CH$_2$)$_n$C$_4$H$_4$S, amino pyridine, imidazole, cyclic amine, piperazine, N(CH$_2$CH$_2$)$_2$N—C(=S)—S—Z$^2$, a polymeric moiety or an oligomeric moiety; $Z^2$ is alkyl, haloalkyl, benzyl, aryl, cycloalkyl, alkenyl, alkynyl, heteroalicyclic, heteroaryl, a polymeric moiety, CH(P(=O)(OR$^1$)$_2$)((C=O)OR$^2$), CH$_2$C$_6$H$_5$, (CH$_2$)$_n$(CO)NR$^1$R$^2$, (CH$_2$)$_n$COOR$^1$, (CH$_2$)$_n$(CO)NH(C$_5$H$_4$N), (CH$_2$)$_n$SR$^1$, (CH$_2$)$_n$S(=O)R$^1$, (CH$_2$)$_n$S(=O)$_2$R$^1$,

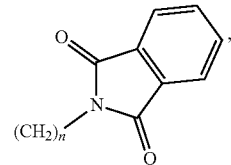

an oligomeric moiety or S—C(=S)—Z$^1$;
$R^1$-$R^2$ are each independently H, alkyl, haloalkyl, cycloalkyl, benzyl, aryl, heteroalicyclic, heteroaryl, polymeric moiety or an oligomeric moiety;
each of the alkyl, haloalkyl, aryl, benzyl, alkenyl, alkynyl, cycloalkyl, heteroaryl, heteroalicyclic, alkoxy, aryloxy, heteroaryloxy, polymeric moiety, oligomeric moiety arylthiol, alkylthiol or heteroarylthiol of $Z^1$, $Z^2$, $R^1$ or $R^2$ is optionally substituted with one or more of alkyl, haloalkyl, alkenyl, alkynyl, heteroalicyclic, heteroaryl, O—P(=O)(OR$^1$)$_2$, trihalomethyl, S(=O)—R$^1$, S(=O)$_2$—R$^1$, S(=O)$_2$—NR$^1$R$^2$, halide, cycloalkyl, alkoxy, nitro, cyano, NR$^1$R$^2$, C(O)NR$^1$R$^2$, N(R$^1$)C (=O)—R², hydroxy, alkylthiol, thiol, arylthiol, heteroarylthiol, C(=O)—OR¹, C(=O)—R¹, aryl, aryloxy, heteroaryloxy, (CH₂CH₂O)$_{n+1}$ or any combination thereof; and n is an integer between 0 and 10.

One aspect of the present invention provides a lithium ion battery comprising: at least one anode comprising anode active material based on Si, Ge and/or Sn, at least one cathode comprising cathode active material based on at least one formulation comprising lithium iron-phosphorus (LFP) oxide or lithium metal oxide (LiMeO), wherein Me is one or more metal selected from nickel, cobalt, manganese and aluminum and Li and O represent one or more respective lithium and oxygen atoms, and electrolyte comprising: solvent comprising at least one linear carbonate and/or ester and at least one cyclic carbonate and/or ester, at least one dissolved lithium salt, and at least one additive that is represented by Formula (XIII), (XIV), (XV) or any combination thereof:

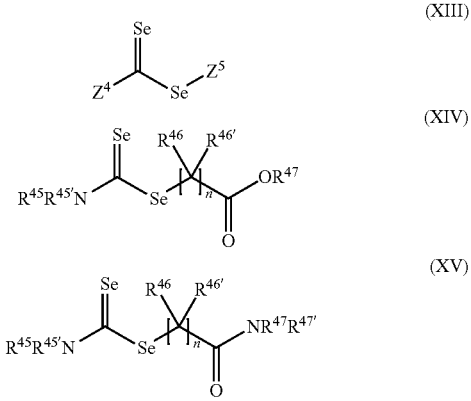

wherein:

Z⁴ is halide, alkyl, haloalkyl, aryl, alkenyl, alkynyl, cycloalkyl, heteroaryl, heteroalicyclic, hydroxyl, alkoxy, aryloxy, heteroaryloxy, NR⁴⁴R⁴⁴', p(O)R⁴⁴R⁴⁴', benzyl, thiol, arylthiol, alkylthiol, heteroarylthiol, O(CH₂)$_n$C₄H₄S, amino pyridine, imidazole, cyclic amine, piperazine, N(CH₂CH₂)₂N—C(=S)—S—Z⁵, P(=O)(OR⁴⁴)₂, a polymeric moiety or an oligomeric moiety;

Z⁵ is alkyl, haloalkyl, benzyl, aryl, cycloalkyl, alkenyl, alkynyl, heteroalicyclic, heteroaryl, alkylthiol, S(=O)₂—R⁴⁴, S(=O)—R⁴⁴, S(=O)₂—NR⁴⁴R⁴⁴', a polymeric moiety, CH(P(=O)(OR⁴⁴)²)((C=O)OR⁴⁴'), CH₂C₆H₅, (CH₂)$_n$(CO)NR⁴⁴R⁴⁴' (CH₂)$_n$COOR⁴⁴, (CH₂)$_n$(CO)NH(C₅H₄N), (CH₂)$_n$SR¹, (CH₂)$_n$S(=O)R¹, (CH₂)$_n$S(=O)₂R¹,

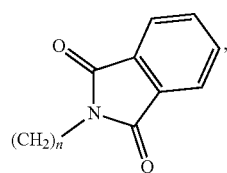

an oligomeric moiety or S—C(=S)—Z⁴;

R⁴⁴ and R⁴⁴' are each independently H, alkyl, haloalkyl, cycloalkyl, benzyl, aryl, heteroalicyclic, heteroaryl, polymeric moiety or an oligomeric moiety, wherein if nitrogen (N) is adjacent to R⁴⁴ and R⁴⁴' then R⁴⁴, R⁴⁴' and the adjacent nitrogen may form a heteroaryl or a heteroalicyclic ring;

R⁴⁵ and R⁴⁵' are each independently H, alkyl, haloalkyl, cycloalkyl, aryl, heteroalicyclic, benzyl or heteroaryl, wherein R⁴⁵, R⁴⁵' and the adjacent nitrogen may form together a heteroaryl or heteroalicyclic ring;

R⁴⁶ and R⁴⁶' are each independently H, alkyl, haloalkyl, cycloalkyl, aryl, heteroalicyclic, benzyl or heteroaryl;

R⁴⁷ and R⁴⁷' are each independently H, alkyl, haloalkyl, cycloalkyl, aryl, heteroalicyclic, benzyl or heteroaryl;

each of the alkyl, haloalkyl, aryl, benzyl, alkenyl, alkynyl, cycloalkyl, heteroaryl, heteroalicyclic, alkoxy, aryloxy, heteroaryloxy, polymeric moiety, oligomeric moiety arylthiol, alkylthiol or heteroarylthiol of Z⁴, Z⁵, R⁴⁴-R⁴⁷ or R⁴⁴'-R⁴⁷' is optionally substituted with one or more of alkyl, haloalkyl, alkenyl, alkynyl, heteroalicyclic, heteroaryl, O—P(=O)(OR⁴⁴)₂ or O—P(=O)(OR⁴⁵)₂, trihalomethyl, S(=O)—R⁴⁴ or S(=O)—R⁴⁵, C(=S)—O—R⁴⁴ or C(=S)—O—R⁴⁵, C(=O)—S—R⁴⁴ or C(=O)—S—R⁴⁵, S(=O)₂—R⁴⁴ or S(=O)₂—R⁴⁵, S(=O)₂—NR⁴⁴R⁴⁴' or S(=O)₂—NR⁴⁵R⁴⁵', halide, cycloalkyl, alkoxy, nitro, cyano, NR⁴⁴R⁴⁴' or NR⁴⁵R⁴⁵', C(O)NR⁴⁴R⁴⁴' or C(O)NR⁴⁵R⁴⁵', N(R⁴⁴)C(=O)—R⁴⁴' or N(R⁴⁵)C(=O)—R⁴⁵, hydroxy, alkylthiol, thiol, arylthiol, heteroarylthiol, C(=O)—OR⁴⁴ or C(=O)—OR⁴⁵, C(=O)—R⁴⁴ or C(=O)—R⁴⁵, aryl, aryloxy, heteroaryloxy, (CH₂CH₂O)$_{n+1}$ or any combination thereof; and n is an integer between 0 and 10.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
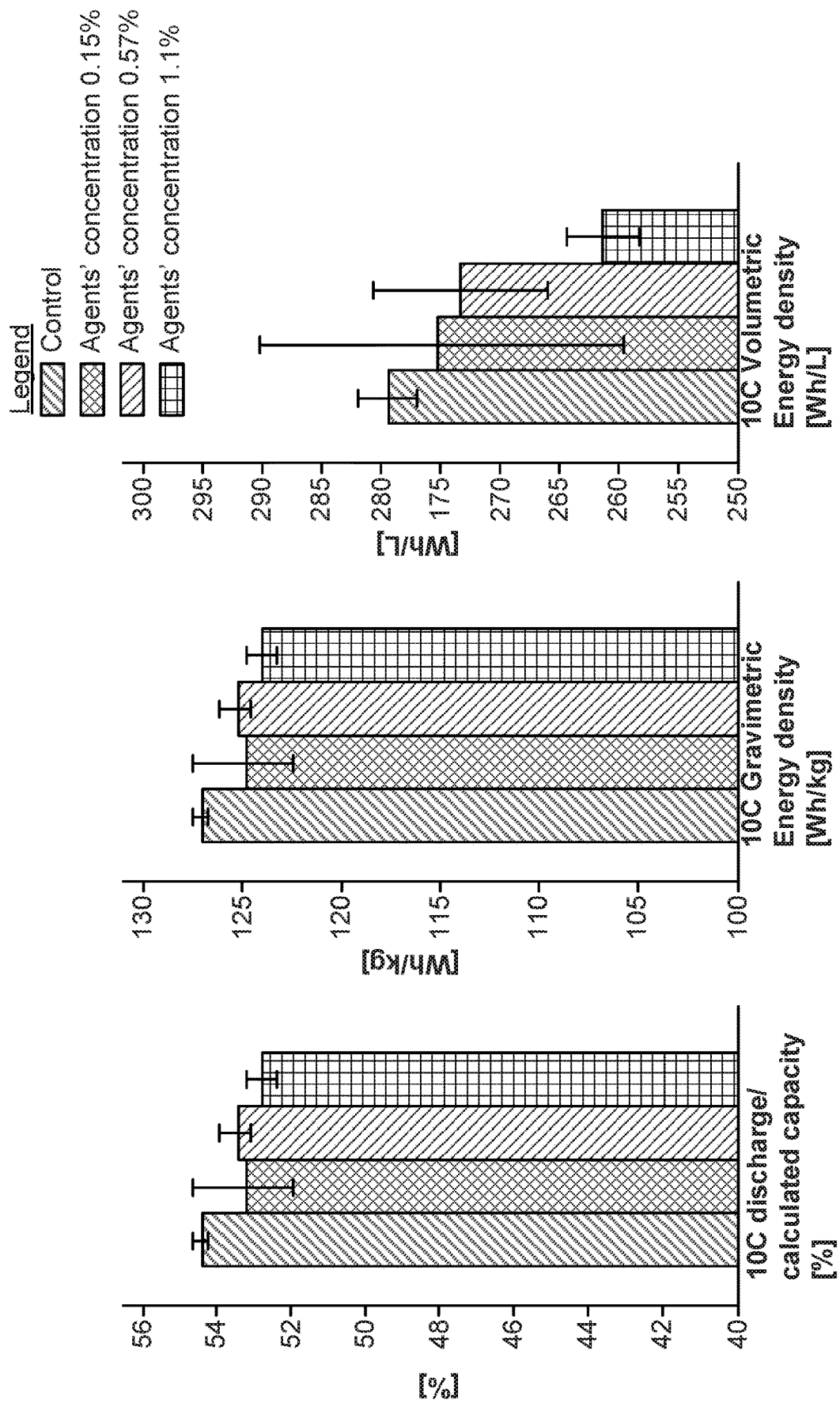
FIG. 1 provides experimental results indicating improvements achieved by using polymerization controlling agents as additives, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Embodiments of the present invention provide efficient and economical methods and mechanisms for improving the cycling lifetime of lithium ion batteries and thereby provide improvements to the technological field of energy storage.

Lithium ion batteries and electrolytes therefor are provided, which include electrolyte additives having dithioester functional group(s) that stabilize the SEI (solid-electrolyte interface) at the surfaces of the anode material particles, and/or stabilize the CEI (cathode electrolyte interface) at the surfaces of the cathode material particles (possibly through oxidation of one or more of the disclosed additives), and/or act as scavengers of oxygen species to prevent or slow down cell degradation. The electrolyte additives having dithioester functional group(s) may function as polymerization controlling and/or chain transfer agents that regulate the level of polymerization of other electrolyte components, such as VC (vinyl carbonate) and improve the formation and operation of the batteries. The lithium ion batteries may have metalloid-based anodes—including mostly Si, Ge and/or Sn as anode active material particles.

In various embodiments of lithium-ion batteries, e.g., in batteries having metalloid-based anode materials, electrolytes may comprise olefinic additives such as VC and/or olefin moieties which are formed in-situ during cell formation and cycling. Examples for electrolyte are disclosed e.g., in U.S. Pat. No. 10,096,859, incorporated herein by reference in its entirety. In certain embodiments, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. Patent Publication No. 2019/0148774, incorporated herein by reference in its entirety.

During formation, olefins (of the olefin additives and/or of the olefin moieties) polymerize to poly-olefins (in radical polymerization) and are attached to the anode as part of the SEI. "Polymerization controlling agents", defined herein as compounds that control the chain length of the poly-olefins and/or stop olefin polymerization—may be added to the electrolyte. Non-limiting examples of polymerization controlling agents include radical scavengers and chain transfer agents.

Radical scavenger(s), used as such polymerization controlling agent, may be added to the electrolyte after the formation stage (at an electrolyte replenishment stage)—to stop olefin polymerization. For example, BHT (Butylated hydroxytoluene) and/or TEMPO ((2,2,6,6-Tetramethylpiperidin-1-yl)oxyl) may be added to the electrolyte after the formation stage.

Alternatively or complementarily, "chain transfer agents", defined herein as compounds comprising a weak bond (e.g. —C(=S)—S— moiety, i.e. a dithioester functional group) which facilitates a chain transfer reaction (usually within a polymerization process/reaction)—can be used as polymerization controlling agents, to control chain length of the poly-olefins. Non-limiting examples of chain transfer agents include dithioester compounds, thiols, haloalkanes (e.g. perfluoroiodoalkanes), organoselenium compounds (e.g. diphenyldiselenide), alkyl telluride compounds, organostibine compounds and iniferter agents (which simultaneously act as initiators, transfer agents, and terminators; e.g. dithiocarbamate compounds). In some embodiments, non-limiting examples of mechanisms involving the chain transfer agents include: reversible addition fragmentation chain transfer (RAFT, using e.g. the dithioester compounds), iodine transfer polymerization (ITP, using e.g. the perfluoroiodoalkanes), Selenium-centered radical-mediated polymerization (using the organoselenium compounds), Telluride-mediated polymerization (TERP, using e.g. the alkyl telluride compounds), stibine mediated polymerization (using the organostibine compounds) and controlled free radical iniferter polymerization (using iniferter agents).

Without being bound by any mechanism or theory, it is contemplated that polymerization controlling agents may be used to provide any of the following advantages: (i) control the chain lengths/molecular weights and distribution thereof, of the poly-olefins (e.g., poly-VC), (ii) prevent continuous occurrence of the reaction (which consumes electrolyte, reduces the ionic conductivity of the electrolyte and reduces the electronic conductivity of the anode material particles), and related parasitic reactions. Specifically, chain transfer agents (or comparable compounds and processes) and/or radical scavengers may be used to stop the polymerization at specified chain lengths that are optimized with respect to battery operation and performance with respect to any of their cycle life, charging/discharging rates, safety and/or capacity.

Without being bound by any mechanism or theory, at least some of the disclosed compounds may improve the cycling lifetime by at least partly providing a passivation or protection layer on cathode active material particles and/or on the cathode, stabilizing the CEI—cathode electrolyte interface (e.g., possibly through oxidation of one or more of the disclosed additives).

Without being bound by any mechanism or theory, at least some of the disclosed compounds may oxidize before electrolyte components, anode components and/or cathode components oxidize, and so provide protection to any of these components. In certain embodiments, at least some of the disclosed compounds may operate as oxygen scavengers, removing $O_2$ that is left in the cell or that is being produced at small amounts during the operation of the cell before it damages other cell components.

It is noted that disclosed compounds may be used with cells comprising any of the anode types and cathode types listed above, as well as with various electrolyte compositions.

The inventors suggest the following possible electrolyte additives that may be used as polymerization controlling agents, possibly with different effective concentrations. In some embodiments, the polymerization controlling agents are dithioester compounds that may comprise molecules of the Formula (I):

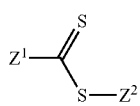
(I)

wherein:
$Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, $P(=O)R^1R^2$, benzyl, thiol, arylthiol, alkylthiol, heteroarylthiol, $O(CH_2)_nC_4H_4S$, amino pyridine, imidazole, cyclic amine, piperazine, $N(CH_2CH_2)_2N-C(=S)-S-Z^2$, a polymeric moiety or an oligomeric moiety;
$Z^2$ is alkyl, haloalkyl, benzyl, aryl, cycloalkyl, alkenyl, alkynyl, heteroalicyclic, heteroaryl, a polymeric moiety, $CH(P(=O)(OR^1)_2)((C=O)OR^2)$, $CH_2C_6H_5$, $(CH_2)_n(CO)NR^1R^2$, $(CH_2)_nCOOR^1$, $(CH_2)_n(CO)NH(C_5H_4N)$, $(CH_2)_nSR^1$, $(CH_2)_nS(=O)R^1$, $(CH_2)_nS(=O)_2R^1$,

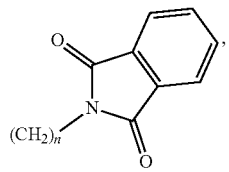

an oligomeric moiety or $S-C(=S)-Z^1$;
$R^1$-$R^2$ are each independently H, alkyl, haloalkyl, cycloalkyl, benzyl, aryl, heteroalicyclic, heteroaryl, polymeric moiety or an oligomeric moiety. If nitrogen (N) is adjacent to $R^1$ and $R^2$ then $R^1$, $R^2$ and the adjacent nitrogen may form a heteroaryl or a heteroalicyclic ring;
each of the alkyl, haloalkyl, aryl, benzyl, alkenyl, alkynyl, cycloalkyl, heteroaryl, heteroalicyclic, alkoxy, aryloxy, heteroaryloxy, polymeric moiety, oligomeric moiety arylthiol, alkylthiol or heteroarylthiol of $Z^1$, $Z^2$, $R^1$ or $R^2$ is optionally substituted with one or more of alkyl, haloalkyl, alkenyl, alkynyl, heteroalicyclic, heteroaryl, $O-P(=O)(OR^1)_2$, trihalomethyl, $S(=O)-R^1$, $S(=O)_2-R^1$, $S(=O)_2-NR^1R^2$, halide, cycloalkyl, alkoxy, nitro, cyano, $NR^1R^2$, $C(O)NR^1R^2$, $N(R^1)C(=O)-R^2$, hydroxy, alkylthiol, thiol, arylthiol, heteroarylthiol, $C(=O)-OR^1$, $C(=O)-R^1$, aryl, aryloxy, heteroaryloxy, $(CH_2CH_2O)_{n+1}$ or any combination thereof; and n is an integer between 0 and 10.

In certain embodiments, $Z^2$ may be a carbon chain, e.g., alkyl, haloalkyl, aryl, alkenyl, alkynyl, a polymeric moiety having a carbon chain or an oligomeric moiety having a carbon chain.

In certain embodiments, $Z^1$ may be an electron donating group, e.g., heteroaryl, heteroalicyclic, hydroxyl, alkoxy, aryloxy, heteroaryloxy, $NR^1R^2$, thiol, arylthiol, alkylthiol, heteroarylthiol, a polymeric moiety with an electron donating group or an oligomeric moiety with an electron donating group.

In some embodiments, the dithioester compounds may comprise molecules of the Formula (Ia), (Iai), (Ic) or any combination thereof:

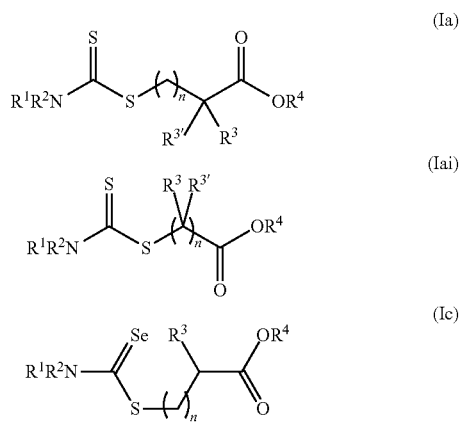

wherein
$R^1$ and $R^2$ are each independently H, alkyl, haloalkyl, cycloalkyl, aryl, heteroalicyclic, benzyl, heteroaryl, polymeric moiety or an oligomeric moiety. If nitrogen (N) is adjacent to $R^1$ and $R^2$ then $R^1$, $R^2$ and the adjacent nitrogen may form a heteroaryl or a heteroalicyclic ring;
$R^3$ and $R^{3'}$ are each independently H, alkyl, haloalkyl, alkenyl, alkynyl, cycloalkyl, aryl, heteroalicyclic heteroaryl, alkoxy, hydroxy, $O-P(=O)(OR^1)_2$, thiol, alkylthiol, aryloxy, heteroaryloxy, arylthiol, heteroarylthiol, nitro, halide, trihalomethyl, cyano, benzyl, $C(O)NR^1R^2$, $NR^1R^2$, $N(R^1)C(=O)-R^2$, $C(=O)-OR^1$, $S(=O)-R^1$, $S(=O)_2-R^1$ or $S(=O)_2-NR^1R^2$;
$R^4$ is H, alkyl, haloalkyl, cycloalkyl, aryl, heteroalicyclic, benzyl or heteroaryl; each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $R^1$, $R^2$, $R^3$, $R^{3'}$ or $R^4$ is optionally substituted with one or more of alkyl, haloalkyl, alkenyl, alkynyl, heteroalicyclic, heteroaryl, $O-P(=O)(OR^1)_2$, trihalomethyl, cyano, $S(=O)-R^1$, $S(=O)_2-R^1$, $S(=O)_2-NR^1R^2$, halide, cycloalkyl, alkoxy, nitro, $NR^1R^2$, $C(O)NR^1R^2$, $N(R^1)C(=O)-R^2$, hydroxy, alkylthiol, thiol, arylthiol, heteroarylthiol, $C(=O)-OR^1$, $C(=O)-R^1$, aryl, aryloxy, heteroaryloxy, $(CH_2CH_2O)_{n+1}$ or any combination thereof; and n is an integer between 0 and 10.

In certain embodiments, the dithioester compounds may comprise molecules of Formula (Iai), wherein $R^3$ and $R^{3'}$ are H and $R^1$-$R^2$ and $R^4$ are described hereinabove. In certain embodiments, the dithioester compounds may comprise molecules of Formula (Ia), (Iai) as described hereinabove or any combination thereof.

In any of the disclosed embodiments, the double-bonded sulfur may be at least partly replaced be selenium, with additives including, at least partly, molecules of the Formula (Ib):

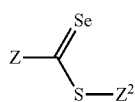
(Ib)

wherein:
- $Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, $P(=O)R^1R^2$, benzyl, thiol, arylthiol, alkylthiol, heteroarylthiol, $O(CH_2)_nC_4H_4S$, amino pyridine, imidazole, cyclic amine, piperazine, $N(CH_2CH_2)_2N—C(=S)—S—Z^2$, a polymeric moiety or an oligomeric moiety;
- $Z^2$ is alkyl, haloalkyl, benzyl, aryl, cycloalkyl, alkenyl, alkynyl, heteroalicyclic, heteroaryl, a polymeric moiety, $CH(P(=O)(OR^1)_2)((C=O)OR^2)$, $CH_2C_6H_5$, $(CH_2)_n(CO)NR^1R^2$, $(CH_2)_nCOOR^1$, $(CH_2)_n(CO)NH(C_5H_4N)$, $(CH_2)_nSR^1$, $(CH_2)_nS(=O)R^1$, $(CH_2)_nS(=O)_2R^1$,

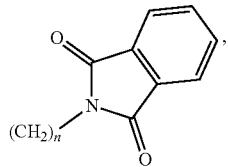

an oligomeric moiety or $S—C(=S)—Z^1$;
- $R^1$-$R^2$ are each independently H, alkyl, haloalkyl, cycloalkyl, benzyl, aryl, heteroalicyclic, heteroaryl, polymeric moiety or an oligomeric moiety. If nitrogen (N) is adjacent to 10 and $R^2$ then $R^1$, $R^2$ and the adjacent nitrogen may form a heteroaryl or a heteroalicyclic ring; each of the alkyl, haloalkyl, aryl, benzyl, alkenyl, alkynyl, cycloalkyl, heteroaryl, heteroalicyclic, alkoxy, aryloxy, heteroaryloxy, polymeric moiety, oligomeric moiety arylthiol, alkylthiol or heteroarylthiol of $Z^1$, $Z^2$, $R^1$ or $R^2$ is optionally substituted with one or more of alkyl, haloalkyl, alkenyl, alkynyl, heteroalicyclic, heteroaryl, $O—P(=O)(OR^1)_2$, trihalomethyl, $S(=O)—R^1$, $S(=O)_2—R^1$, $S(=O)_2—NR^1R^2$, halide, cycloalkyl, alkoxy, nitro, cyano, $NR^1R^2$, $C(O)NR^1R^2$, $N(R^1)C(=O)—R^2$, hydroxy, alkylthiol, thiol, arylthiol, heteroarylthiol, $C(=O)—OR^1$, $C(=O)—R^1$, aryl, aryloxy, heteroaryloxy, $(CH_2CH_2O)_{n+1}$ or any combination thereof; and n is an integer between 0 and 10.

In some embodiments, the dithioester compounds may comprise molecules of the Formula (II):

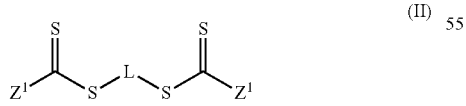
(II)

wherein
- $Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, $P(=O)R^1R^2$, benzyl, thiol, arylthiol, alkylthiol, heteroarylthiol, $O(CH_2)_nC_4H_4S$, amino pyridine, imidazole, cyclic amine, piperazine, $N(CH_2CH_2)_2N—C(=S)—S—Z^2$, a polymeric moiety or an oligomeric moiety;
- $Z^2$ is alkyl, haloalkyl, benzyl, aryl, cycloalkyl, alkenyl, alkynyl, heteroalicyclic, heteroaryl, a polymeric moiety, $CH(P(=O)(OR)_2)((C=O)OR)$, $CH_2C_6H_5$, $(CH_2)_n(CO)NR^1R^2$, $(CH_2)_n(CO)NH(C_5H_4N)$, $(CH_2)_nSR^1$, $(CH_2)_nS(=O)R^1$, $(CH_2)_nS(=O)_2R^1$,

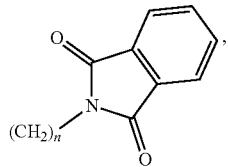

an oligomeric moiety or $S—C(=S)—Z^1$;
- $R^1$ and $R^2$ are each independently H, alkyl, haloalkyl, cycloalkyl, aryl, heteroalicyclic, benzyl, heteroaryl, polymeric moiety or an oligomeric moiety. If nitrogen (N) is adjacent to $R^1$ and $R^2$ then $R^1$, $R^2$ and the adjacent nitrogen may form a heteroaryl or a heteroalicyclic ring;
- each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $Z^1$, $Z^2$, $R^1$ or $R^2$ is optionally substituted with one or more of alkyl, haloalkyl, alkenyl, alkynyl, heteroalicyclic, heteroaryl, $O—P(=O)(OR^1)_2$, trihalomethyl, cyano, $S(=O)—R^1$, $S(=O)_2—R^1$, $S(=O)_2—NR^1R^2$, halide, cycloalkyl, alkoxy, nitro, $NR^1R^2$, $C(O)NR^1R^2$, $N(R^1)C(=O)—R^2$, hydroxy, alkylthiol, thiol, arylthiol, heteroarylthiol, $C(=O)—OR^1$, $C(=O)—R^1$, aryl, aryloxy, heteroaryloxy, $(CH_2CH_2O)_{n+1}$ or any combination thereof; L is a linker; and n is an integer between 0 and 10.

In some embodiments, the dithioester compounds may comprise molecules of the Formula (IIa):

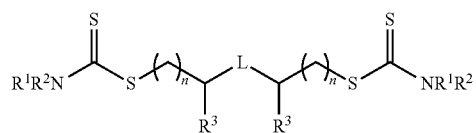
(IIa)

wherein
- $R^1$ and $R^2$ are each independently H, alkyl, haloalkyl, cycloalkyl, aryl, heteroalicyclic, benzyl, heteroaryl, polymeric moiety or an oligomeric moiety. If nitrogen (N) is adjacent to $R^1$ and $R^2$ then $R^1$, $R^2$ and the adjacent nitrogen may form a heteroaryl or a heteroalicyclic ring;
- $R^3$ is H, alkyl, haloalkyl, alkenyl, alkynyl, cycloalkyl, aryl, heteroalicyclic heteroaryl, alkoxy, hydroxy, $O—P(=O)(OR^1)_2$, thiol, alkylthiol, aryloxy, heteroaryloxy, arylthiol, heteroarylthiol, nitro, halide, trihalomethyl, cyano, benzyl, $C(O)NR^1R^2$, $NR^1R^2$, $N(R^1)C(=O)—R^2$, $C(=O)—OR^1$, $S(=O)—R^1$, $S(=O)_2—R^1$ or $S(=O)_2—NR^1R^2$;
- each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $R^1$, $R^2$ or $R^3$ is optionally substituted with one or more of alkyl, haloalkyl, alkenyl, alkynyl, heteroalicyclic, heteroaryl, $O—P(=O)(OR^1)_2$, trihalomethyl, cyano, S(=O)—R¹, S(=O)₂—R¹, S(=O)₂—NR¹R², halide, cycloalkyl, alkoxy, nitro, NR¹R², C(O)NR¹R², N(R¹)C(=O)—R², hydroxy, alkylthiol, thiol, arylthiol, heteroarylthiol, C(=O)—OR¹, C(=O)—R¹, aryl, aryloxy, heteroaryloxy, $(CH_2CH_2O)_{n+1}$ or any combination thereof;

L is a linker; and n each is independently an integer between 0 and 10.

In some embodiments, the dithioester compounds may comprise molecules of the Formula (IIb):

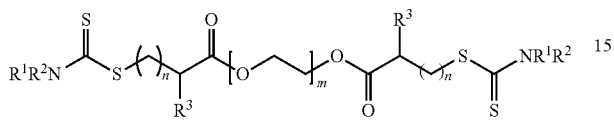

(IIb)

wherein $R^1$ and $R^2$ are each independently H, alkyl, haloalkyl, cycloalkyl, aryl, heteroalicyclic, benzyl, heteroaryl, polymeric moiety or an oligomeric moiety. If nitrogen (N) is adjacent to $R^1$ and $R^2$ then $R^1$, $R^2$ and the adjacent nitrogen may form a heteroaryl or a heteroalicyclic ring;

$R^3$ is H, alkyl, haloalkyl, alkenyl, alkynyl, cycloalkyl, aryl, heteroalicyclic heteroaryl, alkoxy, hydroxy, O—P(=O)(OR¹)₂, thiol, alkylthiol, aryloxy, heteroaryloxy, arylthiol, heteroarylthiol, nitro, halide, trihalomethyl, cyano, benzyl, C(O)NR¹R², NR¹R², N(R¹)C(=O)—R², C(=O)—OR¹, S(=O)—R¹, S(=O)₂—R¹ or S(=O)₂—NR¹R²;

each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $R^1$, $R^2$ or $R^3$ is optionally substituted with one or more of alkyl, haloalkyl, alkenyl, alkynyl, heteroalicyclic, heteroaryl, O—P(=O)(OR¹)₂, trihalomethyl, cyano, S(=O)—R¹, S(=O)₂—R¹, S(=O)₂—NR¹R², halide, cycloalkyl, alkoxy, nitro, NR¹R², C(O)NR¹R², N(R¹)C(=O)—R², hydroxy, alkylthiol, thiol, arylthiol, heteroarylthiol, C(=O)—OR¹, C(=O)—R¹, aryl, aryloxy, heteroaryloxy, $(CH_2CH_2O)_{n+1}$ or any combination thereof;

m is an integer between 1 and 10,000; and n each is independently an integer between 0 and 10.

In some embodiments, non-limiting examples of dithioester compounds include the following:

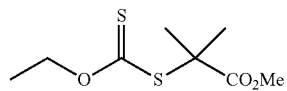

1

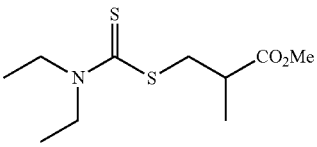

1a

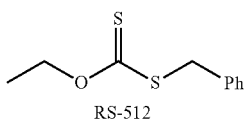

RS-512

1b

-continued

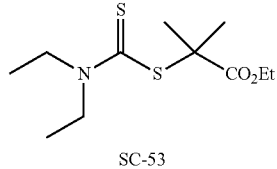

SC-53

1c

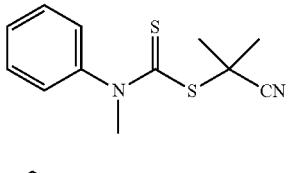

2

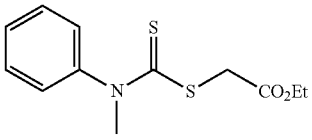

3

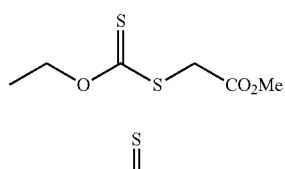

4

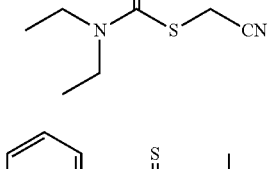

5

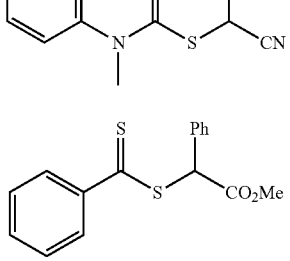

6

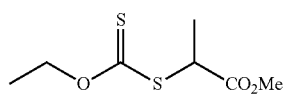

7

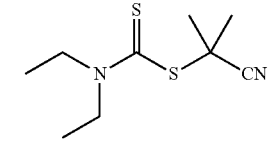

8

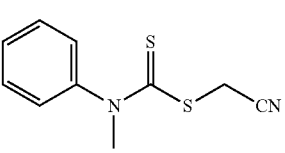

9

10

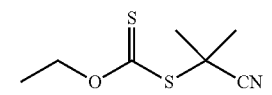

11

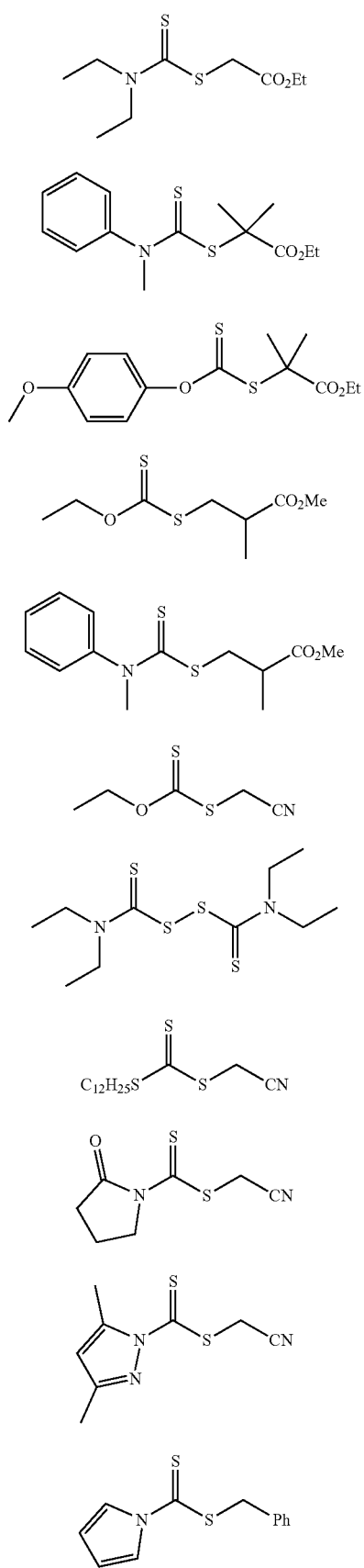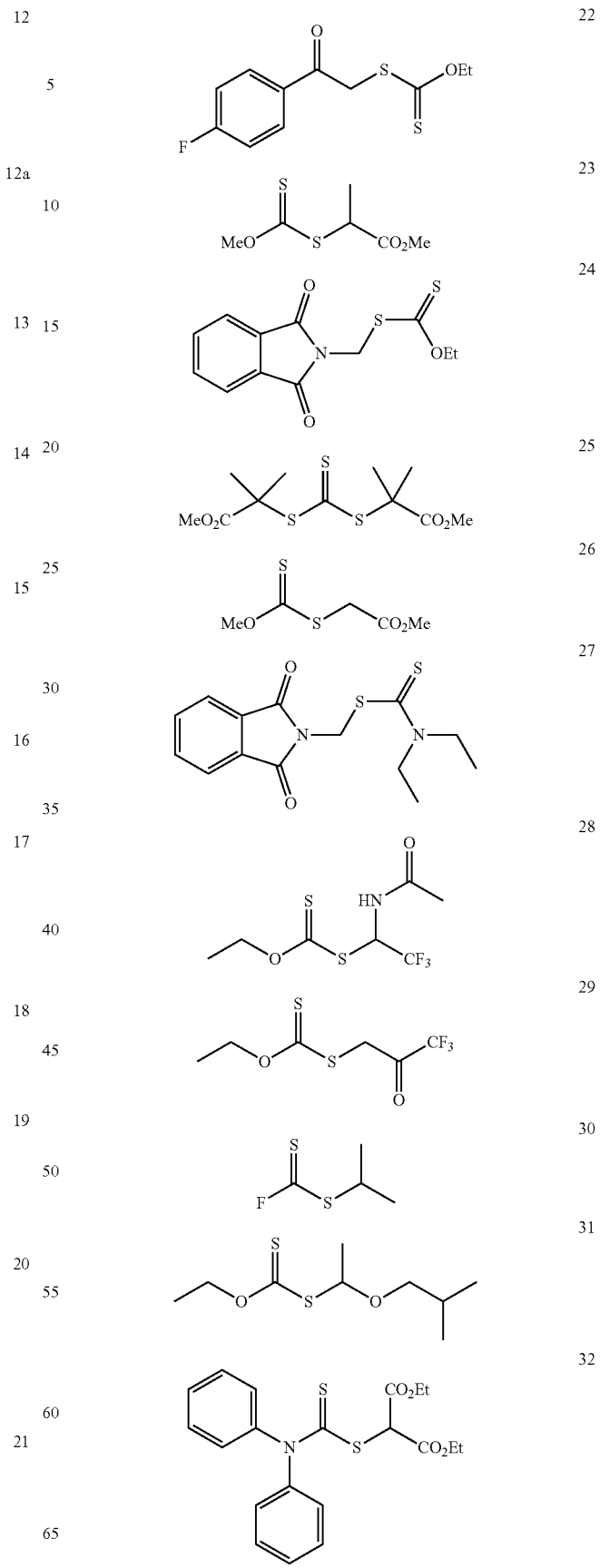

-continued

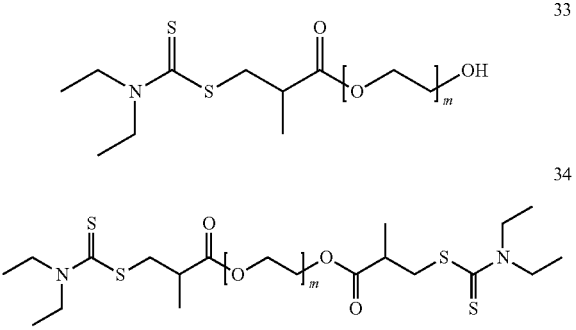

wherein
m is an integer between 1 and 10,000.

As a non-limiting example of a polymerization controlling agent, the additive 1a, may be used in the electrolyte.

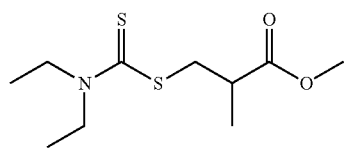

It is emphasized that disclosed embodiments and the results are not bound by theory and are not limited to the operation mechanism of the disclosed additives as a polymerization controlling agent. In various embodiments, any of the disclosed additives may be advantageous, e.g., for increasing the cycling lifetime of the respective batteries through any of a range of surface reactions involved in the process of the SEI (solid electrolyte interphase) layer, so that any of the disclosed additives may at least partly be used as an SEI-forming additive. Alternatively or complementarily, any of the disclosed additives may at least partly decompose and any of its decomposition products may be operative as an SEI-forming additive. In various embodiments, any of the disclosed additives may be advantageous, e.g., in modifying electrolyte components in a different way than through the chain transfer mechanism, e.g., reacting with double bonds in electrolyte components such as VC and/or olefins, and/or by affecting reaction products of electrolyte components during SEI formation and/or with SEI components, e.g., by promoting polymerization of double bonds to change the chemical composition of the electrolyte and/or of the SEI. In certain embodiments, any of the disclosed additives and/or their decomposition products and/or related compounds may be advantageous, e.g., for preventing or attenuating various parasitic reactions (via degenerative radical state) in the electrolyte and/or in the SEI during battery formation and/or operation. In certain embodiments, any of the disclosed additives and/or related compounds may be advantageous, e.g., for scavenging various by-products of the reactions in the operating battery, such operating as an $H_2O$/HF scavenger. In certain embodiments, any of the disclosed additives and/or related compounds may be advantageous in electrochemical processes, in addition or in place of their advantages in chemical processes. For example, any of the disclosed additives and/or related compounds may affect the surface potential and/or the voltage during cell operation, and increase the cell cycling lifetime through electrochemical effects.

Various embodiments comprise new additive structures based on Formula I and/or additive structures with added functional groups and/or application of various additives in energy storage devices such as lithium ion batteries. Disclosed additives may be used in the electrolyte of the batteries in liquid and/or solid form. One or more of the disclosed additives may be added to any form of electrolyte, such as solid, gel, liquid and/or polymeric electrolytes, with corresponding solvents. In various embodiments, one or more of the disclosed additives may be added to the cathode and/or to the anode, possibly in addition to their use in the electrolyte. In various embodiments, two or more of the disclosed additives may be used in combination, in any of the disclosed embodiments (e.g., in the same or in different components of the battery, in same or in different states, applied in same or in different stages of battery production, etc.).

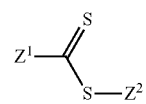
(I)

In some embodiments, the additives are represented by Formula (I):

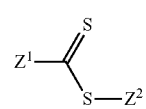
(I)

wherein
$Z^2$ is $(CH_2)_n(CO)NR^1R^2$, $(CH_2)_nSR^1$, $(CH_2)_nS(=O)R^1$, $(CH_2)_nS(=O)_2R^1$, or

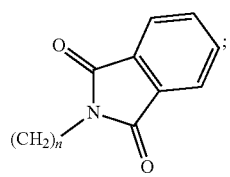

and $Z^1$ is $NR^1R^2$, cyclic amine, piperazine and $N(CH_2CH_2)_2N-C(=S)-S-Z^2$, and where n, $R^1$ and $R^2$ are as defined hereinabove.

In some embodiments, $Z^2$ is $(CH_2)_n(CO)NR^1R^2$; and $Z^1$ is $NR^1R^2$. In another embodiment, $Z^2$ is $(CH_2)_n(CO)N(CH_3)_2$ and $Z^1$ is $NR^1R^2$; and the additives may comprise:

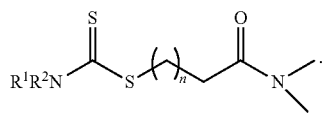

In some embodiments, $Z^1$ is $NR^1R^2$ and $Z^2$ is $(CH_2)_nSR^1$, $(CH_2)_nS(=O)R^1$ or $(CH_2)_nS(=O)_2R^1$; and the additives may comprise:

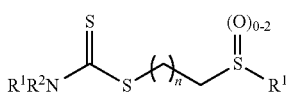

In some embodiments, the additives are represented by Formula (Id):

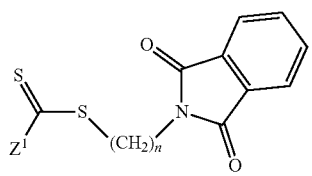

wherein n and $Z^1$ are as defined hereinabove. In one embodiment, $Z^1$ is $NR^1R^2$. In certain embodiments, disclosed additives may comprise any of the following structures and/or variations and substitutions thereof.

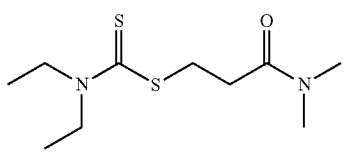

35

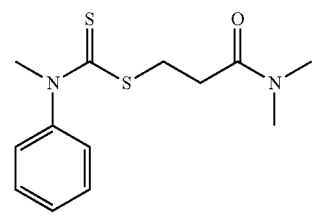

36

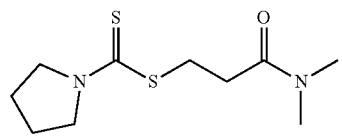

37

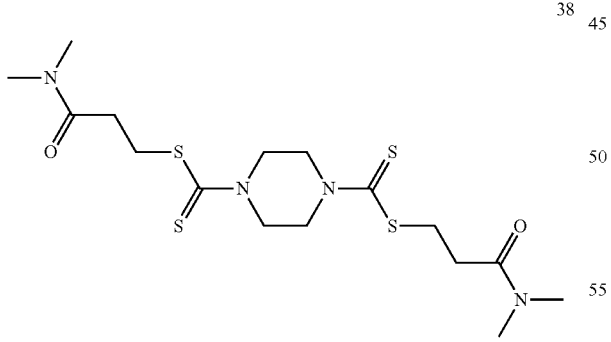

38

Concerning compound 36, the inventors note that using 0.6% of compound 36 as additive increased the cycling lifetime ca. threefold (~330%), and using compounds 1a or 35 as additives increased the cycling lifetime ca. twofold (~230%). Accordingly, in any of disclosed electrolytes, one or more of compounds 1a, 35 and/or 46 may be added.

In some embodiments, the N,N-Dimethyl acetamide functional group of the above compounds possibly forms a complex with the Lewis acid $PF_5$ which is produced by the thermal dissociation of $LiPF_6$ and possibly prevents the decomposition of electrolytes in lithium ion batteries. Alternatively or complimentarily, the same or corresponding functional groups may be used to prevent decomposition of electrolytes with other types of lithium salt.

In some embodiments, the additives are represented by Formula (I):

wherein
$Z^2$ is $(CH_2)_n(CO)NR^1R^2$ or $(CH_2)_n(CO)NH(C_5H_4N)$, and $Z^1$ is $NR^1R^2$, imidazole or amino pyridine, and where n, $R^1$ and $R^2$ are as defined hereinabove. In some embodiments, the imidazole ring or amino pyridine of $Z^1$ is possibly involved in HF scavenging when applied in lithium ion batteries. Alternatively or complimentarily, the same or corresponding functional groups may be used to prevent decomposition of electrolytes with other types of lithium salt. In certain embodiments, disclosed additives may comprise the following structure and/or variations and substitutions thereof:

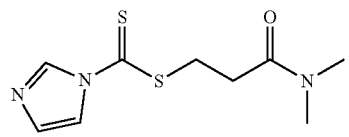

39

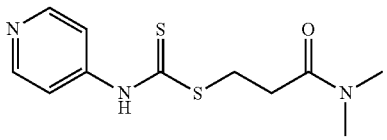

40

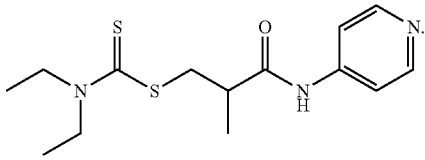

41

In some embodiments, the additives are represented by Formula (I):

wherein
$Z^2$ is $(CH_2)_nC_6H_5$, and $Z^1$ is $O(CH_2)_nC_4H_4S$, and where n is defined hereinabove.

In some embodiments, the thiophene functional group of $Z^1$ is possibly decomposed and/or polymerized on the electrode's surface prior to the introduction of electrolyte, possibly forming a conducting protective layer and preventing electrolyte decomposition when applied in lithium ion batteries. In certain embodiments, disclosed additives may comprise the following structure and/or variations and substitutions thereof:

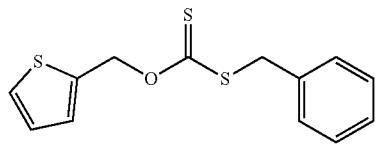

42

In some embodiments, the additives are represented by Formula (I):

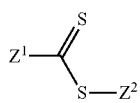

(I)

wherein
Z² is CH(P(=O)(OR¹)₂)((C=O)OR²), and Z' is NR¹R², and where R¹ and R² are as defined hereinabove. In certain embodiments, disclosed additives may comprise the following structure and/or variations and substitutions thereof:

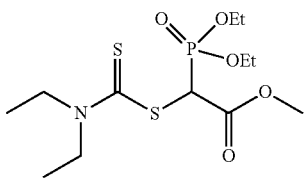 [SMILES: CCOP(=O)(OCC)C(SC(=S)N(CC)CC)C(=O)OC]

In some embodiments, when applied in lithium ion batteries, the oxygen of the phosphate functional group may have the ability to neutralize PF₅ through (Lewis) acid-base coordination, and/or the phosphate functional group may function as a fire retardant, terminating the radical propagation in the combustion process. Alternatively or complimentarily, the same or corresponding functional groups may be used to prevent decomposition of electrolytes with other types of lithium salt.

In certain embodiments, disclosed additives may comprise any of the following structures and/or variations and substitutions thereof:

44

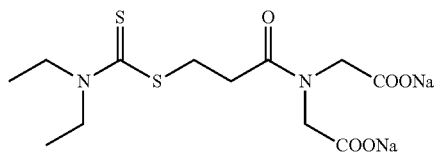

45

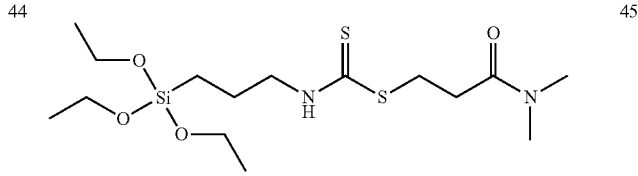

46

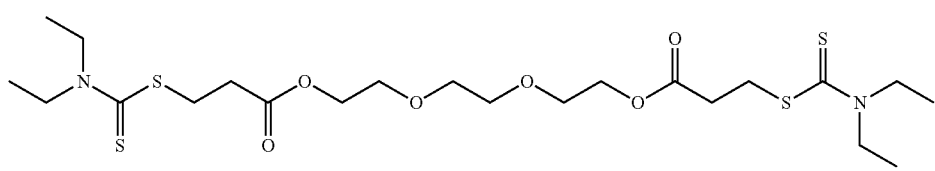

47

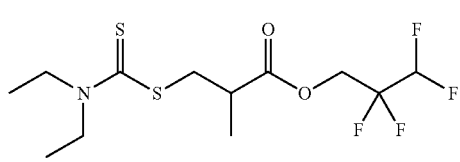

48

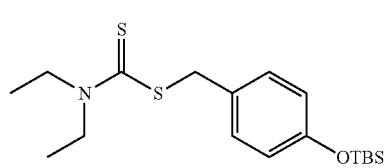

49

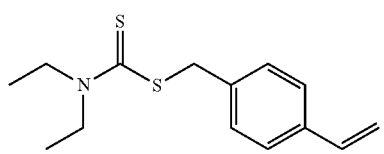

50

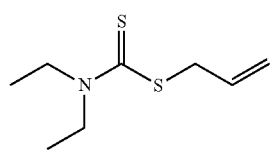

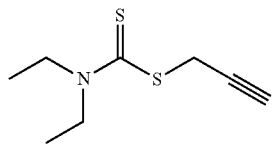

51

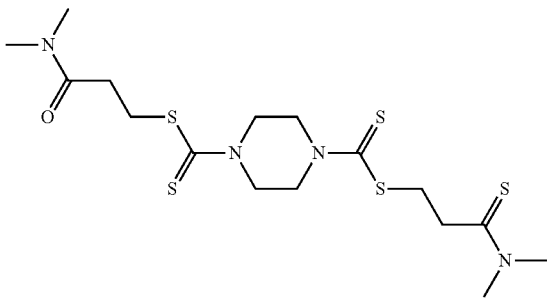

52

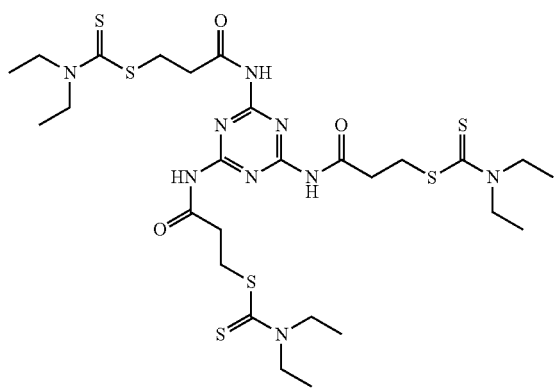

53

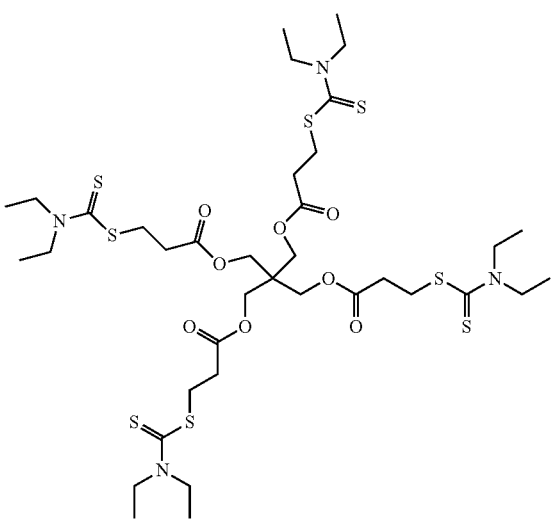

54

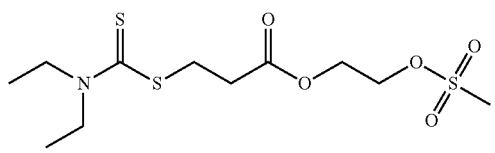

55

In various embodiments, compound 44 and/or variations and/or substitutions thereof may be used for chelation of metals when applied in lithium ion batteries. In various embodiments, compound 45 and/or variations and/or substitutions thereof may be used for covalent binding to Si (or possibly Ge and/or Sn), when applied in lithium ion batteries. In various embodiments, compound 46 and/or variations and/or substitutions thereof may be used for improving the ionic conductivity in any of the cell components, when applied in lithium ion batteries. In various embodiments, compound 47 and/or variations and/or substitutions thereof may be used for forming SEI (solid electrolyte interphase) on the anode(s) and/or CEI (cathode electrolyte interphase) on the cathode(s), when applied in lithium ion batteries. In various embodiments, compound 48 and/or variations and/or substitutions thereof may be used for scavenging HF when applied in lithium ion batteries. In various embodiments, end double bonds of compounds 49, 50 and/or variations and/or substitutions thereof may be used for polymerization of disclosed additive(s), see, e.g., below, when applied in lithium ion batteries. In various embodiments, the end triple bond of compound 51 and/or variations and/or substitutions thereof may be used for polymerization of disclosed additive(s), see, e.g., below, when applied in lithium ion batteries. In various embodiments, compound 52 and/or variations and/or substitutions thereof may be used to provide di-functional additives as an example for multi-arm additives (e.g., RAFT additives), see, e.g., below, when applied in lithium ion batteries. In various embodiments, compound 53 and/or variations and/or substitutions thereof may be used to provide tri-functional additives as an example for multi-arm additives (e.g., RAFT additives), see, e.g., below, when applied in lithium ion batteries. In various embodiments, compound 54 and/or variations and/or substitutions thereof may be used to provide tetra-functional additives as an example for multi-arm additives (e.g., RAFT additives), see, e.g., below, when applied in lithium ion batteries. In various embodiments, compound 55 and/or variations and/or substitutions thereof comprise a sultone functional group that may be used to support SEI formation, when applied in lithium ion batteries.

In various embodiments, disclosed additives may comprise any of the following structures and/or variations and substitutions thereof, e.g., as RAFT structures:

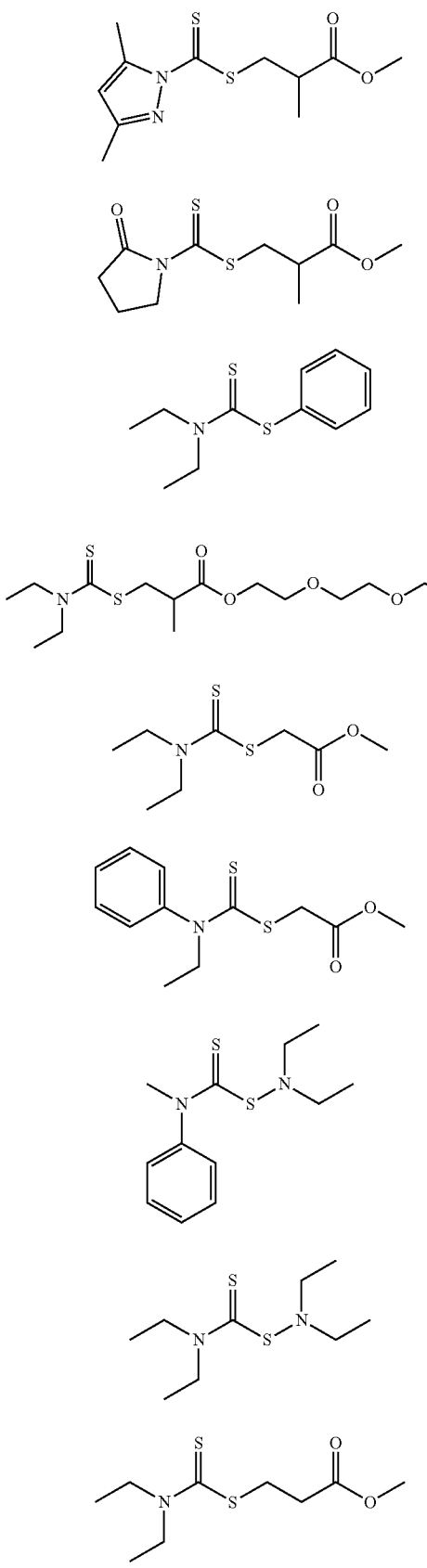

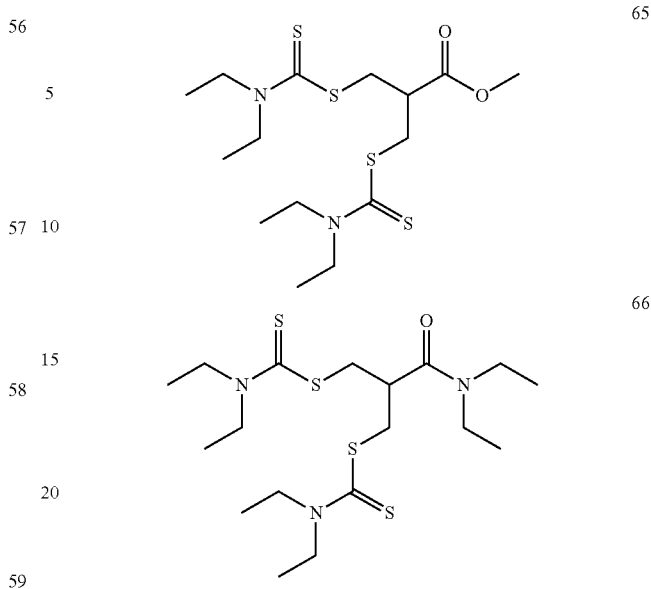

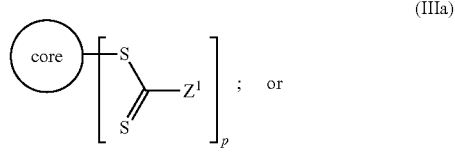

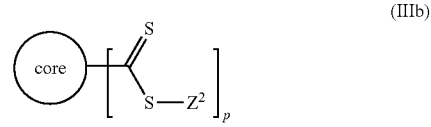

It is noted that while structures of some of the disclosed compounds, e.g., compounds 37, 49, 50, 56-58, 60, 61, 63 and 64 may be known, their application in lithium ion batteries, e.g., in electrolytes thereof, were found by the inventors to be surprisingly beneficial. Moreover, modification of disclosed compounds may also be beneficial in their application in lithium ion batteries, e.g., in electrolytes thereof.

In various embodiments, disclosed additives may be applied in lithium ion batteries having metalloid-based anodes, e.g., having active material particles with Si, Ge and/or Sn. In various embodiments, disclosed additives may be applied in lithium ion batteries having carbon-based anodes, e.g., having graphite active material particles and/or possibly active material particles with graphene or other carbon forms.

In some embodiments, the dithioester compounds are polymeric, oligomeric or dendritic compounds comprising a polymeric, oligomeric or dendrimeric core and multiple dithioester moieties "arms" attached to the core, as may be represented by Formula (IIIa) or (IIIb):

(IIIa)

(IIIb)

wherein
the core is a dendritic, oligomeric or polymeric moiety, e.g., having a carbon chain such as polyamide chains, polyester chains, or polyethylene chains;
$Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, $P(=O)R^1R^2$, benzyl, thiol, arylthiol, alkylthiol, heteroarylthiol, a polymeric moiety or an oligomeric moiety;

$Z^2$ is alkyl, haloalkyl, benzyl, aryl, cycloalkyl, alkenyl, alkynyl, heteroalicyclic, heteroaryl, a polymeric moiety, $CH(P(=O)(OR^1)_2)((C=O)OR^2)$, $CH_2C_6H_5$, $(CH_2)_n(CO)NR^1R^2$, $(CH_2)_nCOOR^1$, $(CH_2)_n(CO)NH(C_5H_4N)$, $(CH_2)_nSR^1$, $(CH_2)_nS(=O)R^1$, $(CH_2)-S(=O)_2R^1$,

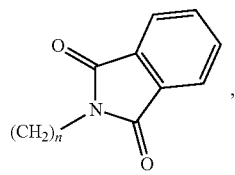

an oligomeric moiety or $S-C(=S)-Z^1$;

$R^1$ and $R^2$ are each independently H, alkyl, haloalkyl, cycloalkyl, aryl, heteroalicyclic, benzyl, heteroaryl, polymeric moiety or an oligomeric moiety. If nitrogen (N) is adjacent to $R^1$ and $R^2$ then $R^1$, $R^2$ and the adjacent nitrogen may form a heteroaryl or a heteroalicyclic ring;

each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $Z^1$, $Z^2$, $R^1$ or $R^2$ is optionally substituted with one or more of alkyl, haloalkyl, alkenyl, alkynyl, heteroalicyclic, heteroaryl, $O-P(=O)(OR^1)_2$, trihalomethyl, cyano, $S(=O)-R^1$, $S(=O)_2-R^1$, $S(=O)_2-NR^1R^2$, halide, cycloalkyl, alkoxy, nitro, $NR^1R^2$, $C(O)NR^1R^2$, $N(R^1)C(=O)-R^2$, hydroxy, alkylthiol, thiol, arylthiol, heteroarylthiol, $C(=O)-OR^1$, $C(=O)-R^1$, aryl, aryloxy, heteroaryloxy, $(CH_2CH_2O)_{n+1}$ or any combination thereof;

p is an integer between 1 and 1000; and n is an integer between 0 and 10.

In certain embodiments, p of Formula (Ma) and (Mb) may be 1 or 2.

In various embodiments, the double-bonded sulfur may be replaced by selenium.

In some embodiments, the polymeric, oligomeric or dendritic compounds are represented by the following non-limiting examples:

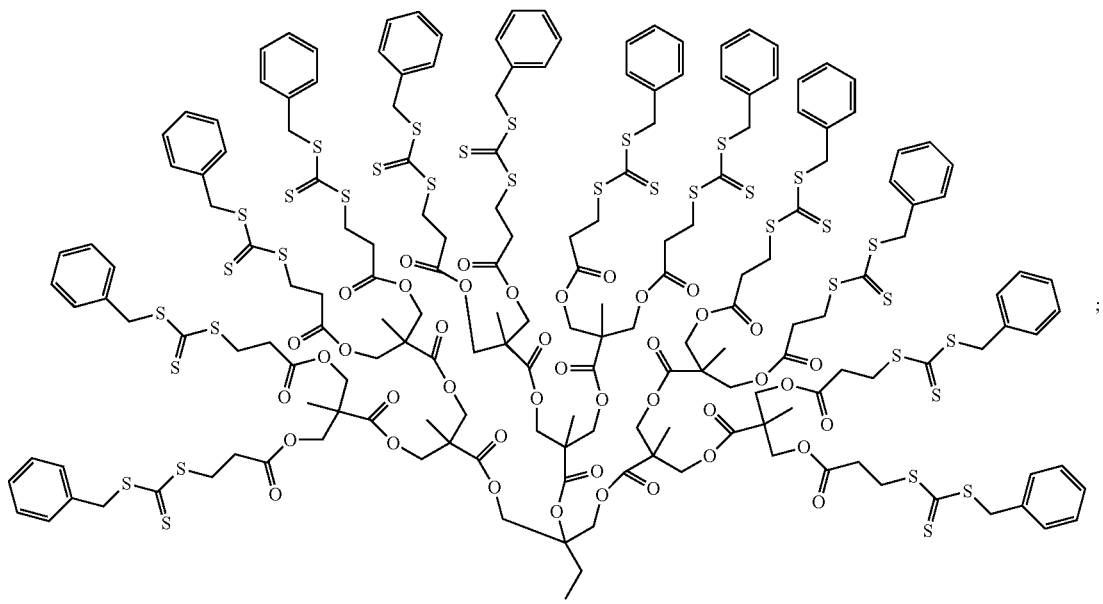

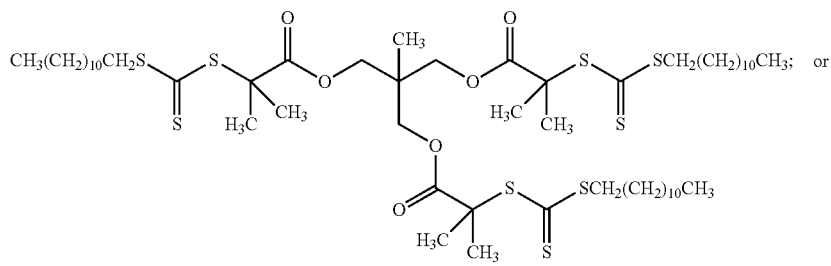

-continued

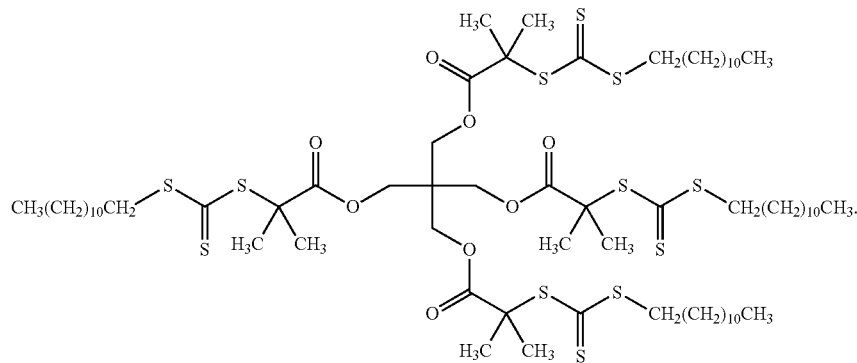

In some embodiments, the additives are represented by Formula (IVa) or (IVb):

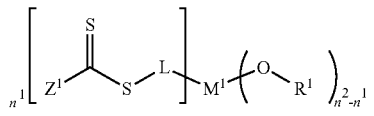

(IVa)

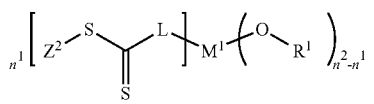

(IVb)

wherein $Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, $P(=O)R^1R^2$, benzyl, thiol, arylthiol, alkylthiol, heteroarylthiol, $O(CH_2)_n C_4H_4S$, amino pyridine, imidazole, cyclic amine, piperazine, $N(CH_2CH_2)_2N-C(=S)-S-Z^2$, a polymeric moiety or an oligomeric moiety;

$Z^2$ is alkyl, haloalkyl, benzyl, aryl, cycloalkyl, alkenyl, alkynyl, heteroalicyclic, heteroaryl, a polymeric moiety, $CH(P(=O)(OR^1)_2)((C=O)OR^2)$, $CH_2C_6H_5$, $(CH_2)_n(CO)NR^1R^2$, $(CH_2)_nCOOR^1$, $(CH_2)_n(CO)NH (C_5H_4N)$, $(CH_2)_nSR^1$, $(CH_2)_nS(=O)R^1$, $(CH_2)_nS(=O)_2R^1$,

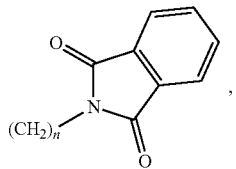

an oligomeric moiety or $S-C(=S)-Z^1$;

$R^1$ and $R^2$ are each independently H, alkyl, haloalkyl, cycloalkyl, aryl, heteroalicyclic, benzyl, heteroaryl, polymeric moiety or an oligomeric moiety. If nitrogen (N) is adjacent to $R^1$ and $R^2$ then $R^1$, $R^2$ and the adjacent nitrogen may form a heteroaryl or a heteroalicyclic ring;

each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $Z^1$, $Z^2$, $R^1$ or $R^2$ is optionally substituted with one or more of alkyl, haloalkyl, alkenyl, alkynyl, heteroalicyclic, heteroaryl, $O-P(=O)(OR^1)_2$, trihalomethyl, cyano, $S(=O)-R^1$, $S(=O)_2-R^1$, $S(=O)_2-NR^1R^2$, halide, cycloalkyl, alkoxy, nitro, $NR^1R^2$, $C(O)NR^1R^2$, $N(R^1)C(=O)-R^2$, hydroxy, alkylthiol, thiol, arylthiol, heteroarylthiol, $C(=O)-OR^1$, $C(=O)-R^1$, aryl, aryloxy, heteroaryloxy, $(CH_2CH_2O)_{n+1}$ or any combination thereof;

n is an integer between 0 and 10;

$n^1$ is an integer between 1 and 3;

$n^2$ is 3 or 4;

$M^1$ is a metal selected from Si, Ti, Zr and Al;

if $M^1$ is Si, Ti or Zr then $n^1$ is an integer between 1-3 and $n^2$ is 4;

if $M^1$ is Al then $n^1$ 1 or 2 and $n^2$ is 3; and

L is a linker.

Alternative known chain transfer agents and corresponding modifications may also be used to achieve increased cycling lifetime of the respective cells.

In certain embodiments, cells with high VC proportion and polymerization controlling agents were shown to increase cycling lifetime of the respective cells by 50-100%, providing a significant progress in the field of fast charging lithium ion batteries. For example, the results presented below indicate the efficiency of polymerization controlling agents in this respect.

FIG. 1 provides experimental results indicating improvements achieved by using polymerization controlling agents as additives, according to some embodiments of the invention. The experiment was designed to contain four groups with different concentrations of polymerization controlling agents as additives. The first group, composed of three full cells, served as control, running at default parameters (1 Ah cells, 6.5 ml of electrolyte composed of 3/3.5/3.5 of VC(vinylene carbonate)/EB(ethyl butyrate)/BA(butyl acetate) and 1M LiPF$_6$, same formation and cycling schemes, see e.g., below, and 15 bar pressure applied to the pouches over metal plates) with no polymerization controlling agents as inhibitors. In the other three groups, each containing six full cell pouches (and an additional pouch that is run for half the cycling lifetime, used for understanding the degradation mechanisms), three different electrolyte concentrations of polymerization controlling agents as additives were used, namely 0.15%, 0.57% and 1.1%. The electrolyte was filled in two steps, before formation 5.6 ml of electrolyte were filled, with no inhibitors, for all groups, and after degassing additional 0.9 ml of electrolyte were added, with inhibitor concentration calculated to generate the final desired concentrations listed above. Other running parameters were the standard "zero-series" for all cells. The cells were assembled with standard parameters in C:A ratio range of 1.01-0.95, and calculated capacity range of 2178-2103 mAh and 6.5 ml of 3/3.5/3.5 VC/EB/BA electrolyte. In the formation procedure, the cells were charged up to 4V, at varying currents (typically starting at a very low current that corresponds to a charging rate of C/1000 and increasing the current as the cell charges and the voltage rises, carried out similarly for all cells), following a discharge at C/10 down to 3V. The first cycle was following by four cycles of CCCV (constant current followed by constant voltage) charging to 4V and discharging to 3V, both at C/2. The cycles were performed under plates with applied pressure of 15 bar and completed with degassing and addition of 0.9 ml of electrolyte with additive concentration calculated to generate the final desired concentration as disclosed above. Standard cycling was performed with CCCV charging at 8 C up to 4.3V and discharging down to 3V. The voltage range and the charging rate were adjusted according to the capacity retention percent until EoL (end of life) was reached at 80% retention.

The formation procedure was similar for the four groups, prior to the addition of the polymerization controlling agent. It was found that the addition of the polymerization controlling agent decreased the high C capacity in a gradual manner as illustrated in the figure below, yet even the cells in the highest polymerization controlling agent concentration run in a capacity within the spec (>51.5%). The different high C capacity was taken into account in the cycle life comparison presented below, as it is known that even a few percent difference has an effect on cycling.

The low volumetric energy density observed on the highest polymerization controlling agent concentration (1.1%) may be understood as a result of both the lower 10 C capacity and the larger thickness of the cells as described above.

Figure 2:
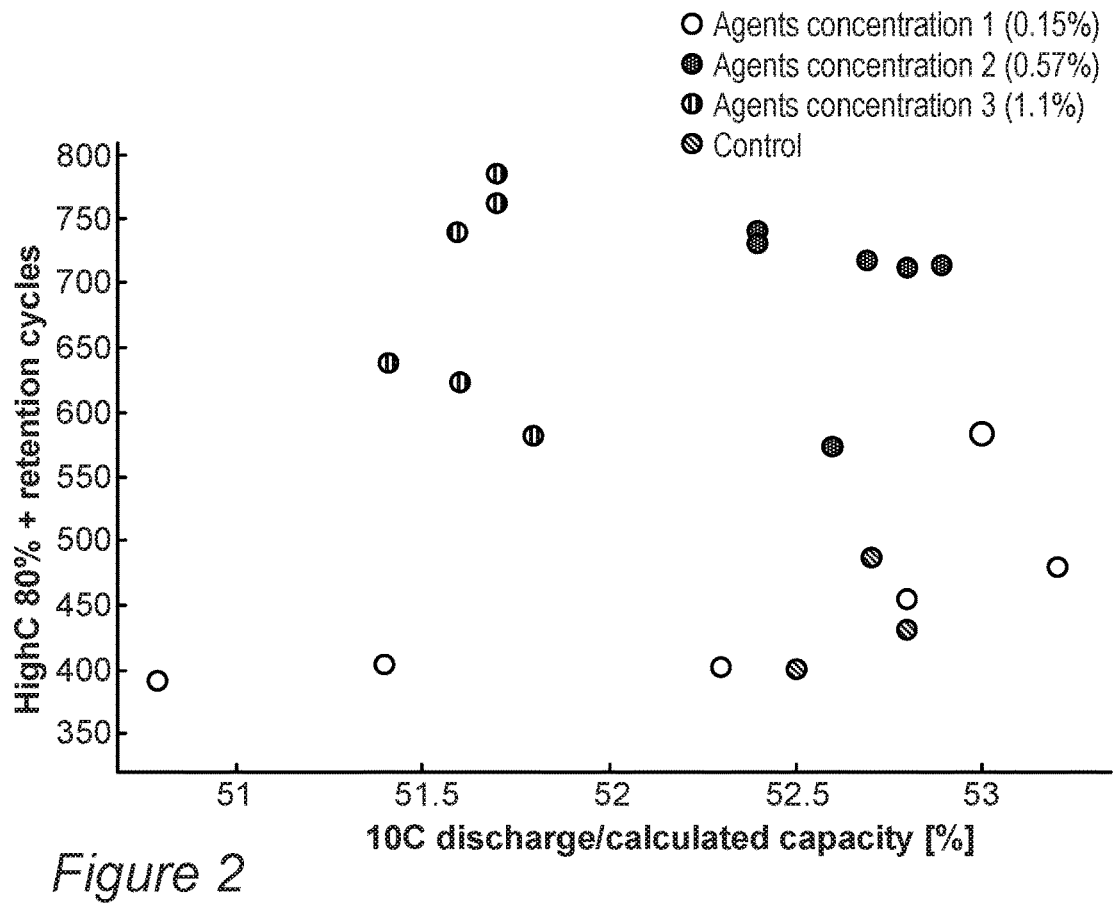
FIG. 2 provides a scatter plot of cycle life versus capacity for the experimental results, according to some embodiments of the invention.

FIG. 2 provides a scatter plot of cycle life versus capacity for the experimental results, according to some embodiments of the invention. It is noted that the medium polymerization controlling agent concentration group (0.57%) yielded the best results in terms of cycling rate and cycling lifetime. The group of cells with the highest polymerization controlling agent concentration (1.1%) seems to present better performance than the control cell group (0%) and the low polymerization controlling agent concentration groups (0.15%), which display similar performances with relatively low cycling lifetime. However, presently but no direct comparison is enabled due to capacity difference and possibly other differences.

Figure 3:
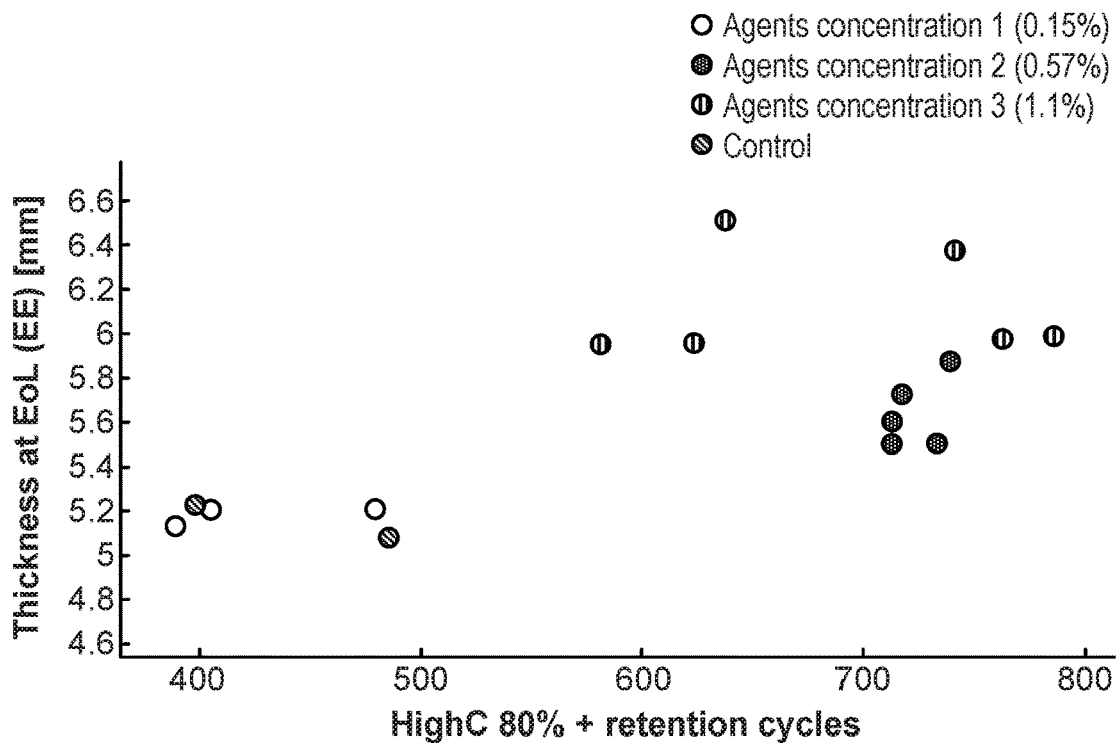
FIG. 3 provides a scatter plot of cell thickness versus cycle life for the experimental results, according to some embodiments of the invention.

FIG. 3 provides a scatter plot of cell thickness versus cycle life for the experimental results, according to some embodiments of the invention. The results show that cells with the medium polymerization controlling agent concentration (0.57%) swelled less than cells with the higher polymerization controlling agent concentration (1.1%), and both groups ran a similar and larger number cycles than cells from the two other groups that swelled less (and are not directly comparable with regard to swelling). In a detailed examination of the individual pouches with respect to the number of cycles indicates no specific effect of the addition of polymerization controlling agent on the swelling of the pouches.

In conclusion, pouches with the medium and high polymerization controlling agent concentration of 0.57% and 1.1% displayed considerably longer cycling lifetimes, by ca. 55%, compared to the control group (without polymerization controlling agents) and compared to the group with lower polymerization controlling agent concentration (0.15%). The group with medium polymerization controlling agent concentration (0.57%) exhibited higher capacity than the group with high polymerization controlling agent concentration (1.1%).

Figure 4:
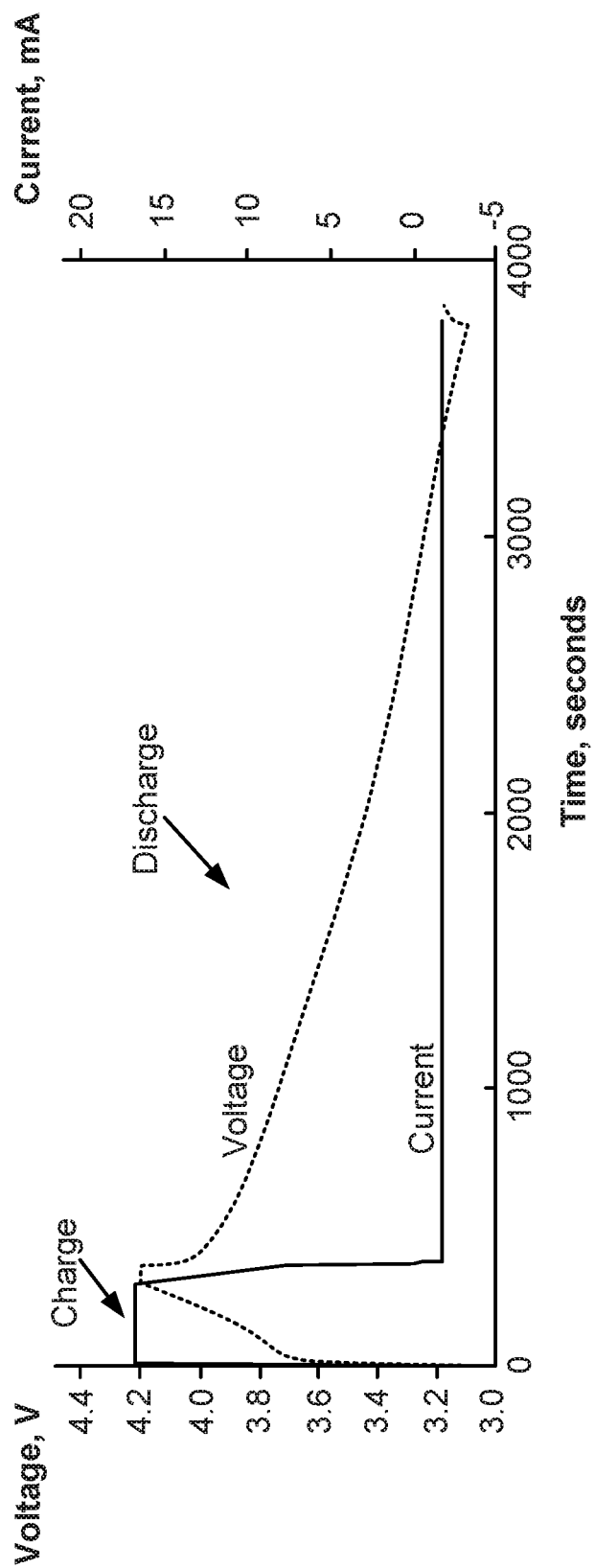
FIG. 4 illustrates a typical charging/discharging curve with corresponding voltage and current values over time, according to some embodiments of the invention.

In an experimental setting, coin cells were used to compare performance with different additives. The anode was a Si-based anode with a NMC-based cathode. The baseline electrolyte included vinyl carbonate, butyl acetate and ethyl butyrate. This electrolyte was compared to electrolytes with additives (listed in Table 1 below), numbered according to the disclosure above. The cycle life was measured by running the coin cells by 10 C (6 minutes) charge and 1 C (60 minutes) discharge. FIG. 4 illustrates a typical charging/discharging curve with corresponding voltage and current values over time, according to some embodiments of the invention. All the experiments were conducted on at least five coin cells each, with the average cycle life shown in Table 1.

TABLE 1

Comparison of performance with different additives

| Electrolyte | Average Cycle life |
|---|---|
| Baseline | 171 |
| With additive 12a | 302 |
| With additive 1b | 265 |
| With additive 9 | 234 |
| With additive 11 | 215 |
| With additive 2 | 274 |
| With additive 3 | 218 |
| With additive 57 | 217 |
| With additive 15 | 215 |
| With additive 18 | 260 |
| With additive 35 | 320 |
| With additive 59 | 290 |
| With both additives, 35 and 59 | 339 |

It is clearly seen that an increase of cycle life has been achieved using the disclosed additives. It is noted that no tradeoffs in energy density or average or nominal voltage were observed in comparison to the baseline sample.

In particular, additives 9, 18, 1b, 2, 59, 12a and 35 (reproduced below), as well as combinations thereof (exemplified on the combination of additives 35 and 59) have been shown to increase the cycling lifetime by 50-100%.

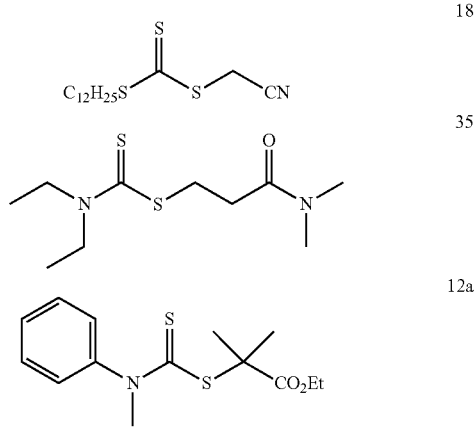

-continued

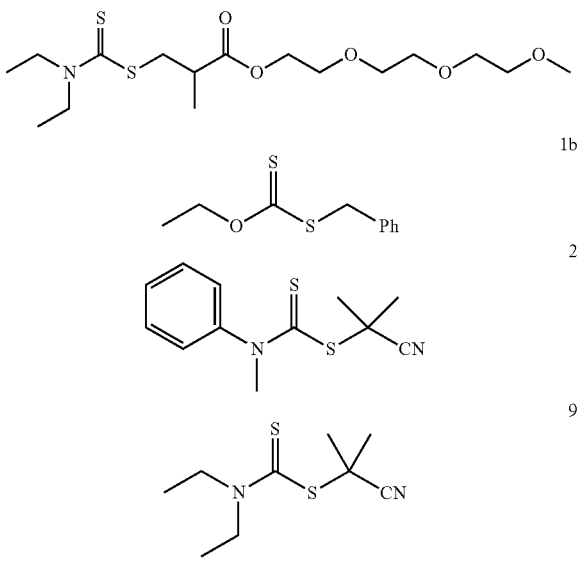

In various embodiments, any of the following related additives may be used in the electrolytes:

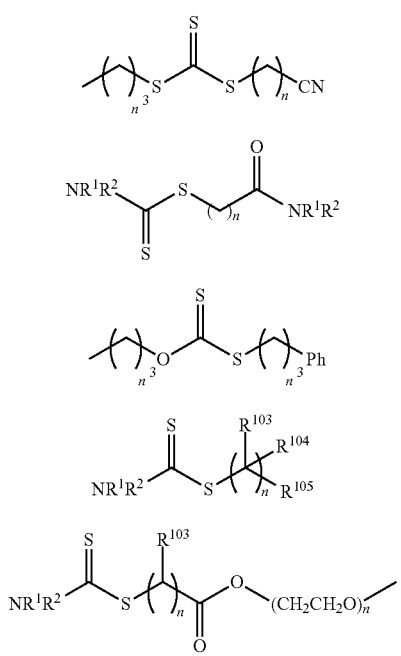

wherein $R^{103}$, $R^{104}$ and $R^{105}$ are each independently H, alkyl, haloalkyl, alkenyl, alkynyl, cycloalkyl, aryl, heteroalicyclic heteroaryl, alkoxy, hydroxy, O—P(=O)(OR$^1$)$_2$, thiol, alkylthiol, aryloxy, heteroaryloxy, arylthiol, heteroarylthiol, nitro, halide, trihalomethyl, cyano, benzyl, C(O)NR$^1$R$^2$, NR$^1$R$^2$, N(R$^1$)C(=O)—R$^2$, C(=O)—OR$^1$, S(=O)—R$^1$, S(=O)$_2$—R$^1$ or S(=O)$_2$—NR$^1$R$^2$;
wherein each of the alkyl, haloalkyl, cycloalkyl, aryl, benzyl, heteroaryl, alkenyl, alkynyl, heteroalicyclic, alkoxy, alkylthiol, heteroarylthiol, aryloxy, heteroaryloxy or arylthiol of $R^1$, $R^2$, $R^{103}$, $R^{104}$ and $R^{105}$ is optionally substituted with one or more of alkyl, haloalkyl, alkenyl, alkynyl, heteroalicyclic, heteroaryl, O—P(=O)(OR$^1$)$_2$, trihalomethyl, cyano, S(=O)—R$^1$, S(=O)$_2$-R$^1$, S(=O)$_2$—NR$^1$R$^2$, halide, cycloalkyl, alkoxy, nitro, NR$^1$R$^2$, C(O)NR$^1$R$^2$, N(R$^1$)C(=O)—R$^2$, hydroxy, alkylthiol, thiol, arylthiol, heteroarylthiol, C(=O)—OR$^1$, C(=O)—R$^1$, aryl, aryloxy, heteroaryloxy or any combination thereof, and/or with $R^1$ and $R^2$ as defined hereinabove;
$n^3$ each is independently an integer between 0 and 10; and
n each is independently an integer between 0 and 10.

In some embodiments, the electrolytic additives are represented by the structure of Formula (V):

(V)

Wherein
$R^5$-$R^7$ are each independently H, alkyl, haloalkyl, cycloalkyl, aryl, heteroalicyclic, benzyl or heteroaryl;
$R^8$ is H, alkyl, haloalkyl, alkenyl, alkynyl, cycloalkyl, aryl, heteroalicyclic heteroaryl, alkoxy, hydroxy, O—P(=O)(OR$^5$)$_2$, thiol, alkylthiol, aryloxy, heteroaryloxy, arylthiol, heteroarylthiol, nitro, halide, trihalomethyl, cyano, benzyl, C(O)NR$^5$R$^6$, NR$^5$R$^6$, N(R$^5$)C(=O)—R$^6$, C(=O)—OR$^5$, S(=O)—R$^5$, S(=O)$_2$—R$^5$ or S(=O)$_2$—NR$^5$R$^6$;
$R^9$ is H, alkyl, haloalkyl, alkenyl, alkynyl, cycloalkyl, aryl, heteroalicyclic heteroaryl, alkoxy, hydroxy, O—P(=O)(OR$^5$)$_2$, thiol, alkylthiol, aryloxy, heteroaryloxy, arylthiol, heteroarylthiol, nitro, halide, trihalomethyl, cyano, benzyl, C(O)NR$^5$R$^6$, NR$^5$R$^6$, N(R$^5$)C(=O)—R$^6$, C(=O)—OR$^5$, S(=O)—R$^5$, S(=O)$_2$—R$^6$ or S(=O)$_2$—NR$^5$R$^6$;
each of the alkyl, alkenyl, alkynyl, haloalkyl, cycloalkyl, aryl, benzyl, heteroaryl, heteroalicyclic, alkoxy, alkylthiol, heteroarylthiol, aryloxy, heteroaryloxy or arylthiol of $R^5$, $R^6$, $R^7$, $R^8$ or $R^9$ is optionally substituted with one or more of alkyl, haloalkyl, alkenyl, alkynyl, heteroalicyclic, heteroaryl, O—P(=O)(OR$^5$)$_2$, trihalomethyl, cyano, S(=O)—R$^5$, S(=O)$_2$—R$^5$, S(=O)$_2$—NR$^5$R$^6$, halide, cycloalkyl, alkoxy, nitro, NR$^5$R$^6$, C(O)NR$^5$R$^6$, N(R$^5$)C(=O)—R$^6$, hydroxy, alkylthiol, thiol, arylthiol, heteroarylthiol, C(=O)—OR$^5$, C(=O)—R$^5$, aryl, aryloxy, heteroaryloxy, (CH$_2$CH$_2$O)$_{n+1}$ or any combination thereof; and
n is an integer between 0 and 10.

Figure 5:
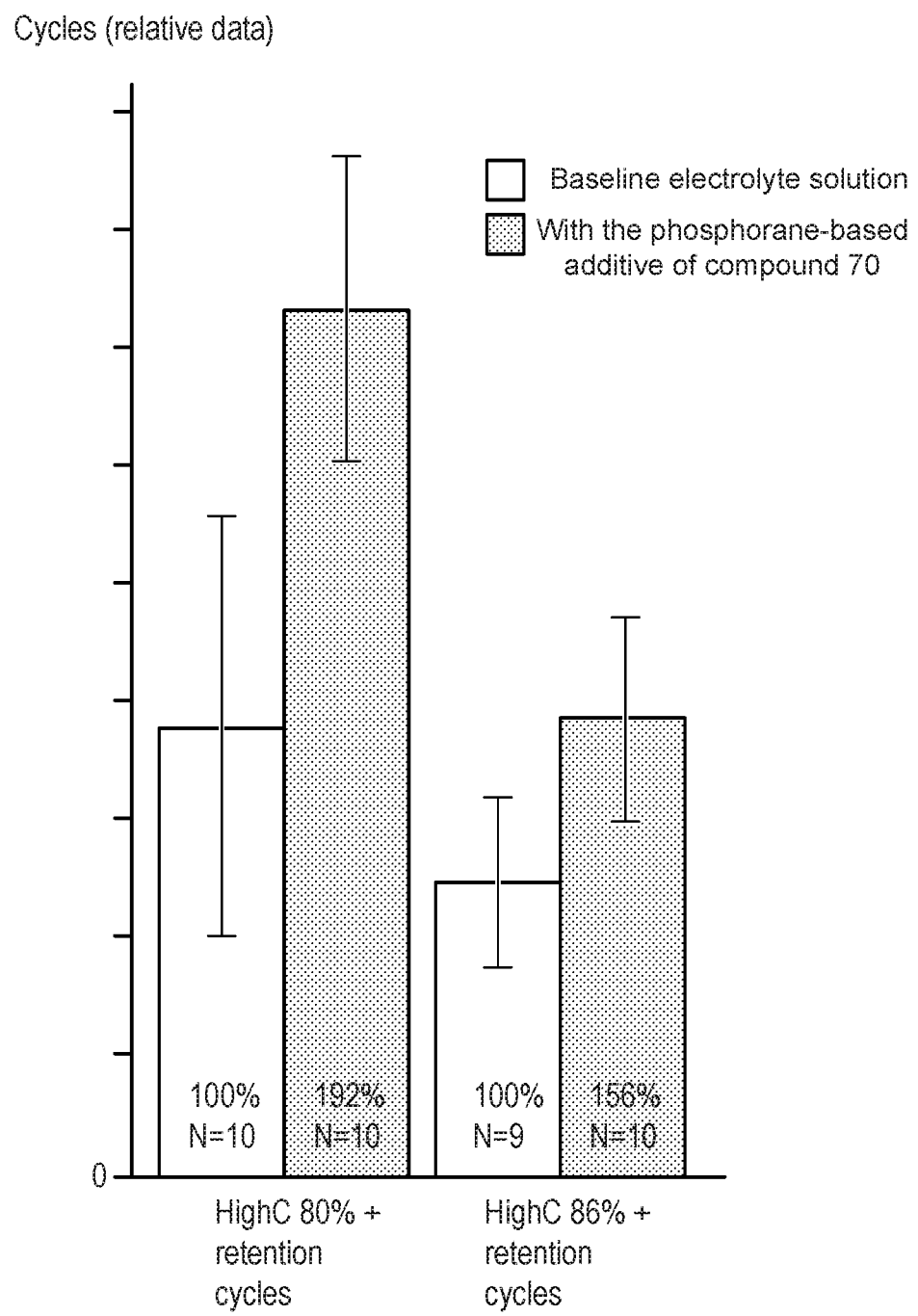
FIG. 5 illustrates an improvement in cycling lifetime achieved by a phosphorane-based additive, according to some embodiments of the invention.

FIG. 5 illustrates an improvement in cycling lifetime achieved by a phosphorane-based additive, according to some embodiments of the invention. Specifically, FIG. 5 illustrates a ca. two-fold increase in cycling lifetime using compound 70 listed below, and fast-charging cycling (6 C charging 1 C discharging), using two different end of life criteria (cell capacity decrease to 80% and 86% of initial capacity). The experiment was performed with an anode load of ca. 2 mg/cm$^2$, NMC-based cathodes with a cathode load of ca. 16 mg/cm$^2$, and 3/3.5/3.5 VC/EB/BA as baseline electrolyte. Disclosed additives improved cycling lifetime by ca. 60-90%, depending on the experimental conditions.
Compound 70:

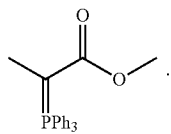

In some embodiments, the electrolytic additives are represented by the structure of Formula (VI):

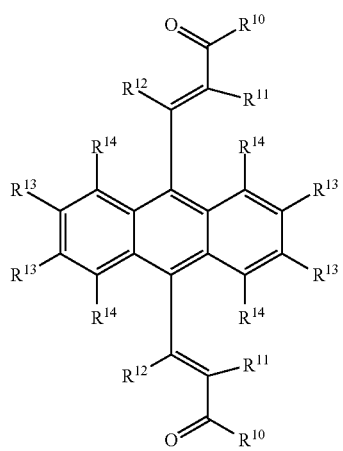

(VI)

Wherein

R$^{10}$ is H, alkyl, haloalkyl, cycloalkyl, aryl, heteroalicyclic, benzyl or heteroaryl;

R$^{11}$-R$^{14}$ are each independently H, alkyl, haloalkyl, alkenyl, alkynyl, cycloalkyl, aryl, heteroalicyclic heteroaryl, alkoxy, hydroxy, O—P(=O)(OR$^{10}$)$_2$, thiol, alkylthiol, aryloxy, heteroaryloxy, arylthiol, heteroarylthiol, nitro, halide, trihalomethyl, cyano, benzyl, C(O)NR$^{10}$R$^{10'}$, NR$^{10}$R$^{10'}$, N(R$^{10}$)C(=O)—R$^{10'}$, C(=O)—OR$^{10}$, S(=O)—R$^{10}$, S(=O)$_2$—R$^{10}$ or S(=O)$_2$—NR$^{10}$R$^{10'}$;

each of the alkyl, alkenyl, alkynyl, haloalkyl, cycloalkyl, aryl, benzyl, heteroaryl, heteroalicyclic, alkoxy, alkylthiol, heteroarylthiol, aryloxy, heteroaryloxy or arylthiol of R$^{10}$, R$^{11}$, R$^{12}$, R$^{13}$ or R$^{14}$ is optionally substituted with one or more of alkyl, haloalkyl, alkenyl, alkynyl, heteroalicyclic, heteroaryl, O—P(=O)(OR$^{10}$)$_2$, trihalomethyl, cyano, S(=O)—R$^{10}$, S(=O)$_2$—R$^{10}$, S(=O)$_2$—NR$^{10}$R$^{10'}$, halide, cycloalkyl, alkoxy, nitro, NR$^{10}$R$^{10'}$, C(O)NR$^{10}$R$^{10'}$, N(R$^{10}$)C(=O)—R$^{10'}$, hydroxy, alkylthiol, thiol, arylthiol, heteroarylthiol, C(=O)—OR$^{10}$, C(=O)—R$^{10}$, aryl, aryloxy, heteroaryloxy, (CH$_2$CH$_2$O)$_{n+1}$ or any combination thereof;

R$^{10'}$ is H, alkyl, haloalkyl, cycloalkyl, aryl, heteroalicyclic, benzyl or heteroaryl; and n is an integer between 0 and 10.

In some embodiments, the electrolytic additives are represented by the structure of Formula (VII):

(VII)

wherein

Z$^3$ is OR$^{15}$ or NR$^{15}$R$^{15'}$ wherein R$^{15}$, R$^{15'}$ and the adjacent nitrogen may form together a heteroaryl or a heteroalicyclic ring;

R$^{15}$ and R$^{15'}$ are each independently H, alkyl, haloalkyl, cycloalkyl, aryl, heteroalicyclic, benzyl or heteroaryl;

R$^{16}$-R$^{18}$ are each independently H, alkyl, haloalkyl, alkenyl, alkynyl, cycloalkyl, aryl, heteroalicyclic heteroaryl, alkoxy, hydroxy, O—P(=O)(OR$^{15}$)$_2$, thiol, alkylthiol, aryloxy, heteroaryloxy, arylthiol, heteroarylthiol, nitro, halide, trihalomethyl, cyano, benzyl, C(O)NR$^{15}$R$^{15'}$, NR$^{15}$R$^{15'}$, N(R$^{15}$)C(=O)—R$^{15'}$, C(=O)—OR$^{15}$, S(=O)—R$^{15}$, S(=O)$_2$—R$^{15}$ or S(=O)$_2$—NR$^{15}$R$^{15'}$;

R$^{16}$, R$^{17}$ and the adjacent carbon may form together a cycloalkyl ring;

each of the alkyl, alkenyl, alkynyl, haloalkyl, cycloalkyl, aryl, benzyl, heteroaryl, heteroalicyclic, heteroaryl or heteroalicyclic ring formed from R$^{15}$, R$^{15'}$ and the adjacent nitrogen, cycloalkyl ring formed from R$^{16}$, R$^{17}$ and the adjacent carbon, alkoxy, alkylthiol, heteroarylthiol, aryloxy, heteroaryloxy, arylthiol of R$^{15}$, R$^{15'}$, R$^{16}$, R$^{17}$ or R$^{18}$ is optionally substituted with one or more of alkyl, haloalkyl, alkenyl, alkynyl, heteroalicyclic, heteroaryl, O—P(=O)(OR$^{15}$)$_2$, trihalomethyl, cyano, S(=O)—R$^{15}$, S(=O)$_2$—R$^{15}$, S(=O)$_2$—NR$^{15}$R$^{15'}$, halide, cycloalkyl, alkoxy, nitro, NR$^{15}$R$^{15'}$, C(O)NR$^{15}$R$^{15'}$, N(R$^{15}$)C(=O)—R$^{15}$, hydroxy, alkylthiol, thiol, arylthiol, heteroarylthiol, C(=O)—OR$^{15}$, C(=O)—R$^{15}$, aryl, aryloxy, heteroaryloxy, (CH$_2$CH$_2$O)$_{n+1}$ or any combination thereof; and n is an integer between 0 and 10.

In another embodiment, the electrolytic additives are represented by the structure of Formula (VIIa):

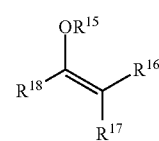

(VIIa)

wherein

R$^{15}$-R$^{18}$ are described hereinabove.

In another embodiment, the electrolytic additives are represented by the structure of Formula (VIIai):

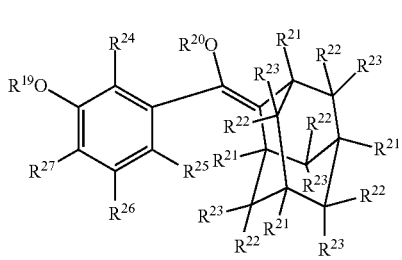

(VIIai)

wherein $R^{19}$-$R^{23}$ are each independently H, alkyl, haloalkyl, cycloalkyl, aryl, heteroalicyclic, benzyl or heteroaryl;

$R^{24}$-$R^{27}$ are each independently H, alkyl, haloalkyl, alkenyl, alkynyl, cycloalkyl, aryl, heteroalicyclic heteroaryl, alkoxy, hydroxy, O—P(=O)(OR$^{15}$)$_2$, thiol, alkylthiol, aryloxy, heteroaryloxy, arylthiol, heteroarylthiol, nitro, halide, trihalomethyl, cyano, benzyl, C(O)NR$^{15}$R$^{15'}$, NR$^{15}$R$^{15'}$, N(R$^{15}$)C(=O)—R$^{15'}$, C(=O)—OR$^{15}$, S(=O)—R$^{15}$, S(=O)$_2$—R$^{15}$ or S(=O)$_2$—NR$^{15}$R$^{15'}$;

each of the alkyl, alkenyl, alkynyl, haloalkyl, cycloalkyl, aryl, benzyl, heteroaryl, heteroalicyclic, alkoxy, alkylthiol, heteroarylthiol, aryloxy, heteroaryloxy or arylthiol of $R^{19}$, $R^{20}$, $R^{21}$, $R^{22}$, $R^{23}$, $R^{24}$, $R^{25}$, $R^{26}$ or $R^{27}$ is optionally substituted with one or more of alkyl, haloalkyl, alkenyl, alkynyl, heteroalicyclic, heteroaryl, O—P(=O)(OR$^{15}$)$_2$, trihalomethyl, cyano, S(=O)—R$^{15}$, S(=O)$_2$—R$^{15}$, S(=O)$_2$—NR$^{15}$R$^{15'}$, halide, cycloalkyl, alkoxy, nitro, NR$^{15}$R$^{15'}$, C(O)NR$^{15}$R$^{15'}$, N(R$^{15}$)C(=O)—R$^{15'}$, hydroxy, alkylthiol, thiol, arylthiol, heteroarylthiol, C(=O)—OR$^{15}$, C(=O)—R$^{15}$, aryl, aryloxy, heteroaryloxy, (CH$_2$CH$_2$O)$_{n+1}$ or any combination thereof;

$R^{15}$ and $R^{15'}$ are described hereinabove; and n is an integer between 0 and 10.

In another embodiment, the electrolytic additives are represented by the structure of Formula (VIIb):

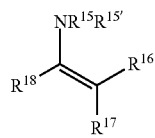

(VIIb)

wherein $R^{15}$-$R^{18}$ and $R^{15'}$ are described hereinabove.

In another embodiment, the electrolytic additives are represented by the structure of Formula (VIIbi):

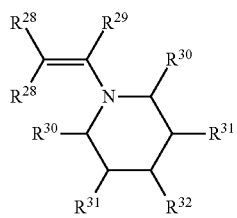

(VIIbi)

wherein $R^{28}$-$R^{32}$ are each independently H, alkyl, haloalkyl, alkenyl, alkynyl, cycloalkyl, aryl, heteroalicyclic heteroaryl, alkoxy, hydroxy, O—P(=O)(OR$^{15}$)$_2$, thiol, alkylthiol, aryloxy, heteroaryloxy, arylthiol, heteroarylthiol, nitro, halide, trihalomethyl, cyano, benzyl, C(O)NR$^{15}$R$^{15'}$, NR$^{15}$R$^{15'}$, N(R$^{15}$)C(=O)—R$^{15'}$, C(=O)—OR$^{15}$, S(=O)—R$^{15}$, S(=O)$_2$—R$^{15}$ or S(=O)$_2$—NR$^{15}$R$^{15'}$;

each of the alkyl, alkenyl, alkynyl, haloalkyl, cycloalkyl, aryl, benzyl, heteroaryl, heteroalicyclic, alkoxy, alkylthiol, heteroarylthiol, aryloxy, heteroaryloxy or arylthiol of $R^{28}$, $R^{29}$, $R^{30}$, $R^{31}$ or $R^{32}$ is optionally substituted with one or more of alkyl, haloalkyl, alkenyl, alkynyl, heteroalicyclic, heteroaryl, O—P(=O)(OR$^{15}$)$_2$, trihalomethyl, cyano, S(=O)—R$^{15}$, S(=O)$_2$—R$^{15}$, S(=O)$_2$—NR$^{15}$R$^{15'}$, halide, cycloalkyl, alkoxy, nitro, NR$^{15}$R$^{15'}$, C(O)NR$^{15}$R$^{15'}$, N(R$^{15}$)C(=O)—R$^{15'}$, hydroxy, alkylthiol, thiol, arylthiol, heteroarylthiol, C(=O)—OR$^{15}$, C(=O)—R$^{15}$, aryl, aryloxy, heteroaryloxy, (CH$_2$CH$_2$O)$_{n+1}$ or any combination thereof;

$R^{15}$ and $R^{15'}$ are described hereinabove; and n is an integer between 0 and 10.

In some embodiments, the electrolytic additives are represented by the structure of Formula (VIII):

(VIII)

wherein $R^{33}$ and $R^{33'}$ are each independently H, alkyl, haloalkyl, cycloalkyl, aryl, heteroalicyclic, benzyl or heteroaryl, wherein $R^{33}$, $R^{33'}$ and the adjacent nitrogen may form together a heteroaryl or a heteroalicyclic ring;

$R^{34}$ is H, alkyl, haloalkyl, alkenyl, alkynyl, cycloalkyl, aryl, heteroalicyclic heteroaryl, alkoxy, hydroxy, O—P(=O)(OR$^{33}$)$_2$, thiol, alkylthiol, aryloxy, heteroaryloxy, arylthiol, heteroarylthiol, nitro, halide, trihalomethyl, cyano, benzyl, C(O)NR$^{33}$R$^{33'}$, NR$^{33}$R$^{33'}$, N(R$^{33}$)C(=O)—R$^{33'}$, C(=O)—OR$^{33}$, S(=O)—R$^{33}$, S(=O)$_2$—R$^{33}$ or S(=O)$_2$—NR$^{33}$R$^{33'}$;

each of the alkyl, alkenyl, alkynyl, haloalkyl, cycloalkyl, aryl, benzyl, heteroaryl, heteroalicyclic, heteroaryl or heteroalicyclic ring formed from $R^{33}$, $R^{33'}$ and the adjacent nitrogen, alkoxy, alkylthiol, heteroarylthiol, aryloxy, heteroaryloxy or arylthiol of $R^{33}$, $R^{33'}$ or $R^{34}$ is optionally substituted with one or more of alkyl, haloalkyl, alkenyl, alkynyl, heteroalicyclic, heteroaryl, O—P(=O)(OR$^{33}$)$_2$, trihalomethyl, cyano, S(=O)—R$^{33}$, S(=O)$_2$—R$^{33}$, S(=O)$_2$—NR$^{33}$R$^{33'}$, halide, cycloalkyl, alkoxy, nitro, NR$^{33}$R$^{33'}$, C(O)NR$^{33}$R$^{33'}$, N(R$^{33}$)C(=O)—R$^{33'}$, hydroxy, alkylthiol, thiol, arylthiol, heteroarylthiol, C(=O)—OR$^{33}$, C(=O)—R$^{33}$, aryl, aryloxy, heteroaryloxy, (CH$_2$CH$_2$O)$_{n+1}$ or any combination thereof; and n is an integer between 0 and 10.

In another embodiment, the electrolytic additives are represented by the structure of Formula (VIIIa):

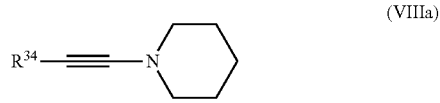

(VIIIa)

wherein $R^{34}$ is described hereinabove.

In another embodiment, the electrolytic additives are represented by the structure of Formula (VIIIb):

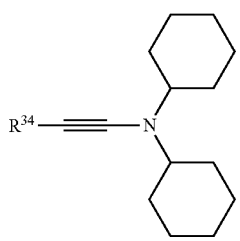

(VIIIb)

wherein

R³⁴ is described hereinabove.

In some embodiments, the electrolytic additives are represented by the structure of Formula (IX):

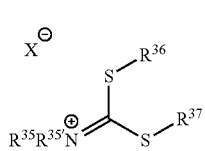

(IX)

wherein $R^{35}$ and $R^{35'}$ are each independently H, alkyl, haloalkyl, cycloalkyl, aryl, heteroalicyclic, benzyl or heteroaryl, wherein $R^{35}$, $R^{35'}$ and the adjacent nitrogen may form together a heteroaryl or heteroalicyclic ring;

$R^{36}$-$R^{37}$ are each independently alkyl, haloalkyl, benzyl, aryl, cycloalkyl, alkenyl, alkynyl, heteroalicyclic, heteroaryl, $CH(P(=O)(OR^{35})_2)((C=O)OR^{35'})$, $CH_2C_6H_5$, $(CH_2)_n(CO)NR^{35}R^{35'}$ or $(CH_2)_n(COOR^{35})$;

each of the alkyl, alkenyl, alkynyl, haloalkyl, cycloalkyl, aryl, heteroaryl or heteroalicyclic ring formed from $R^{35}$, $R^{35'}$ and the adjacent nitrogen, benzyl, heteroaryl and heteroalicyclic of $R^{35}$, $R^{35'}$, $R^{36}$ or $R^{37}$ is optionally substituted with one or more of alkyl, haloalkyl, alkenyl, alkynyl, heteroalicyclic, heteroaryl, $O-P(=O)(OR^{35})_2$, trihalomethyl, cyano, $S(=O)-R^{35}$, $S(=O)_2-R^{35}$, $S(=O)_2-NR^{35}R^{35'}$, halide, cycloalkyl, alkoxy, nitro, $NR^{35}R^{35'}$, $C(O)NR^{35}R^{35'}$, $N(R^{35})C(=O)-R^{35'}$, hydroxy, alkylthiol, thiol, arylthiol, heteroarylthiol, $C(=O)-OR^{35}$, $C(=O)-R^{35}$, aryl, aryloxy, heteroaryloxy, $(CH_2CH_2O)_{n+1}$ or any combination thereof;

X⁻ is an anion; and n is an integer between 0 and 10.

In some embodiments, the electrolytic additives are represented by the structure of Formula (X):

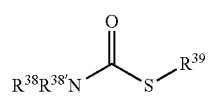

(X)

wherein $R^{38}$ and $R^{38'}$ are each independently H, alkyl, haloalkyl, cycloalkyl, aryl, heteroalicyclic, benzyl or heteroaryl, wherein $R^{38}$, $R^{38'}$ and the adjacent nitrogen may form together a heteroaryl or heteroalicyclic ring;

$R^{39}$ is alkyl, haloalkyl, benzyl, aryl, cycloalkyl, alkenyl, alkynyl, heteroalicyclic, heteroaryl, $CH(P(=O)(OR^{38})_2)((C=O)OR^{38'})$, $CH_2C_6H_5$, $(CH_2)_n(CO)NR^{38}R^{38'}$ or $(CH_2)_n(COOR^{38})$;

each of the alkyl, alkenyl, alkynyl, haloalkyl, cycloalkyl, aryl, heteroaryl or heteroalicyclic ring formed from $R^{38}$, $R^{38'}$ and the adjacent nitrogen, benzyl, heteroaryl and heteroalicyclic of $R^{38}$, $R^{38'}$ or $R^{39}$ is optionally substituted with one or more of alkyl, haloalkyl, alkenyl, alkynyl, heteroalicyclic, heteroaryl, $O-P(=O)(OR^{38})_2$, trihalomethyl, cyano, $S(=O)-R^{38}$, $S(=O)_2-R^{38}$, $S(=O)_2-NR^{38}R^{38'}$, halide, cycloalkyl, alkoxy, nitro, $NR^{38}R^{38'}$, $C(O)NR^{38}R^{38'}$, $N(R^{38})C(=O)-R^{38'}$, hydroxy, alkylthiol, thiol, arylthiol, heteroarylthiol, $C(=O)-OR^{38}$, $C(=O)-R^{38}$, aryl, aryloxy, heteroaryloxy, $(CH_2CH_2O)_{n+1}$ or any combination thereof; and n is an integer between 0 and 10.

In some embodiments, the electrolytic additives are represented by the structure of Formula (XI):

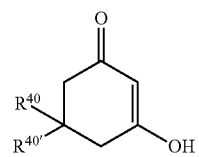

(XI)

wherein $R^{40}$ and $R^{40'}$ are each independently alkyl, haloalkyl, benzyl, aryl, cycloalkyl, alkenyl, alkynyl, heteroalicyclic, heteroaryl, $CH(P(=O)(OR^{41})_2)((C=O)OR^{41'})$, $CH_2C_6H_5$, $(CH_2)_n(CO)NR^{41}R^{41'}$ or $(CH_2)_n(COOR^{41})$;

each of the alkyl, alkenyl, alkynyl, haloalkyl, cycloalkyl, aryl, benzyl, heteroaryl and heteroalicyclic of $R^{40}$ or $R^{40'}$ is optionally substituted with one or more of alkyl, haloalkyl, alkenyl, alkynyl, heteroalicyclic, heteroaryl, $O-P(=O)(OR^{41})_2$, trihalomethyl, cyano, $S(=O)-R^{41}$, $S(=O)_2-R^{41}$, $S(=O)_2-NR^{41}R^{41'}$, halide, cycloalkyl, alkoxy, nitro, $NR^{41}R^{41'}$, $C(O)NR^{41}R^{41'}$, $N(R^{41})C(=O)-R^{41'}$, hydroxy, alkylthiol, thiol, arylthiol, heteroarylthiol, $C(=O)-OR^{41}$, $C(=O)-R^{41}$, aryl, aryloxy, heteroaryloxy, $(CH_2CH_2O)_{n+1}$ or any combination thereof;

$R^{41}$ and $R^{41'}$ are each independently H, alkyl, haloalkyl, cycloalkyl, aryl, heteroalicyclic, benzyl or heteroaryl; and n is an integer between 0 and 10.

In some embodiments, the electrolytic additives are represented by the structure of Formula (XII):

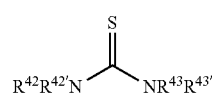

(XII)

wherein $R^{42}$ and $R^{42'}$ are each independently H, alkyl, haloalkyl, cycloalkyl, aryl, heteroalicyclic, benzyl or heteroaryl, wherein $R^{42}$, $R^{42'}$ and the adjacent nitrogen may form together a heteroaryl or heteroalicyclic ring;

$R^{43}$ and $R^{43'}$ are each independently H, alkyl, haloalkyl, cycloalkyl, aryl, heteroalicyclic, benzyl or heteroaryl, wherein $R^{43}$, $R^{43'}$ and the adjacent nitrogen may form together a heteroaryl or heteroalicyclic ring;

each of the alkyl, haloalkyl, cycloalkyl, aryl, heteroaryl or heteroalicyclic ring formed from $R^{42}$, $R^{42'}$ and the adjacent nitrogen, heteroaryl or heteroalicyclic ring formed from $R^{43}$, $R^{43'}$ and the adjacent nitrogen, benzyl, heteroaryl and heteroalicyclic of $R^{42}$, $R^{42'}$, $R^{43}$ or $R^{43'}$ is optionally substituted with one or more of alkyl, haloalkyl, alkenyl, alkynyl, heteroalicyclic, heteroaryl, O—P(=O)(OR$^{42}$)$_2$, trihalomethyl, cyano, S(=O)—R$^{42}$, S(=O)$_2$—R$^{42}$, S(=O)$_2$—NR$^{42}$R$^{42'}$, halide, cycloalkyl, alkoxy, nitro, NR$^{42}$R$^{42'}$, C(O)NR$^{42}$R$^{42'}$, N(R$^{42}$)C(=O)—R$^{42'}$, hydroxy, alkylthiol, thiol, arylthiol, heteroarylthiol, C(=O)—OR$^{42}$, C(=O)—R$^{42}$, aryl, aryloxy, heteroaryloxy, (CH$_2$CH$_2$O)$_{n+1}$ or any combination thereof; and n is an integer between 0 and 10.

In another embodiment, the electrolytic additives are represented by the structure of Formula (XIIa):

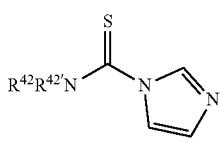

(XIIa)

wherein
$R^{42}$ and $R^{42'}$ are described hereinabove.

In some embodiments, the dithioester, selenothioester and/or thioselenoester compounds as described hereinabove may be added or replaced by molecules of the Formula (XIII):

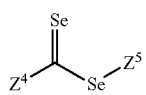

(XIII)

wherein:
$Z^4$ is halide, alkyl, haloalkyl, aryl, alkenyl, alkynyl, cycloalkyl, heteroaryl, heteroalicyclic, hydroxyl, alkoxy, aryloxy, heteroaryloxy, NR$^{44}$R$^{44'}$, P(O)R$^{44}$R$^{44'}$, benzyl, thiol, arylthiol, alkylthiol, heteroarylthiol, O(CH$_2$)$_n$C$_4$H$_4$S, amino pyridine, imidazole, cyclic amine, piperazine, N(CH$_2$CH$_2$)$_2$N—C(=S)—S—Z$^5$, P(=O)(OR$^{44}$)$_2$, a polymeric moiety or an oligomeric moiety;

$Z^5$ is alkyl, haloalkyl, benzyl, aryl, cycloalkyl, alkenyl, alkynyl, heteroalicyclic, heteroaryl, alkylthiol, S(=O)$_2$—R$^{44}$, S(=O)—R$^{44}$, S(=O)$_2$—NR$^{44}$R$^{44'}$, a polymeric moiety, CH(P(=O)(OR$^{44}$)$^2$)((C=O)OR$^{44'}$), CH$_2$C$_6$H$_5$, (CH$_2$)$_n$(CO)NR$^{44}$R$^{44'}$, (CH$_2$)$_n$COOR$^{44}$, (CH$_2$)$_n$(CO)NH(C$_5$H$_4$N), (CH$_2$)$_n$SR$^{44}$, (CH$_2$)$_n$S(=O)R$^{44}$, (CH$_2$)$_n$S(=O)$_2$R$^{44}$,

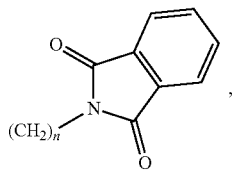

an oligomeric moiety or S—C(=S)—Z$^4$;
$R^{44}$ and $R^{44'}$ are each independently H, alkyl, haloalkyl, cycloalkyl, benzyl, aryl, heteroalicyclic, heteroaryl, polymeric moiety or an oligomeric moiety, wherein if nitrogen (N) is adjacent to $R^{44}$ and $R^{44'}$ then $R^{44}$, $R^{44'}$ and the adjacent nitrogen may form a heteroaryl or a heteroalicyclic ring;

each of the alkyl, haloalkyl, aryl, benzyl, alkenyl, alkynyl, cycloalkyl, heteroaryl, heteroalicyclic, alkoxy, aryloxy, heteroaryloxy, polymeric moiety, oligomeric moiety arylthiol, alkylthiol or heteroarylthiol of $Z^4$, $Z^5$, $R^{44}$ or $R^{44'}$ is optionally substituted with one or more of alkyl, haloalkyl, alkenyl, alkynyl, heteroalicyclic, heteroaryl, O—P(=O)(OR$^{44}$)$_2$, trihalomethyl, S(=O)—R$^{44}$, C(=S)—O—R$^{44}$, C(=O)—S—R$^{44}$, S(=O)$_2$—R$^{44}$, S(=O)$_2$—NR$^{44}$R$^{44'}$, halide, cycloalkyl, alkoxy, nitro, cyano, NR$^{44}$R$^{44'}$, C(O)NR$^{44}$R$^{44'}$, N(R$^{44}$)C(=O)—R$^{44'}$, hydroxy, alkylthiol, thiol, arylthiol, heteroarylthiol, C(=O)—OR$^{44}$, C(=O)—R$^{44}$, aryl, aryloxy, heteroaryloxy, (CH$_2$CH$_2$O)$_{n+1}$ or any combination thereof; and n is an integer between 0 and 10.

In certain embodiments, $Z^4$ may be alkyl, haloalkyl, aryl, alkenyl, alkynyl, a polymeric moiety having a carbon chain or an oligomeric moiety having a carbon chain.

In certain embodiments, $Z^4$ may be heteroaryl, heteroalicyclic, hydroxyl, alkoxy, aryloxy, heteroaryloxy, NR$^1$R$^2$, thiol, arylthiol, alkylthiol, heteroarylthiol, a polymeric moiety with an electron donating group or an oligomeric moiety with an electron donating group.

In certain embodiments, $Z^4$ may be NR$^{44}$R$^{44'}$.

In certain embodiments, $Z^5$ may be alkyl, haloalkyl, benzyl, aryl, cycloalkyl, alkenyl, alkynyl, a polymeric moiety having a carbon chain or an oligomeric moiety having a carbon chain.

In some embodiments, the dithioester, selenothioester and/or thioselenoester compounds as described hereinabove may be added or replaced by molecules of the Formula (XIV):

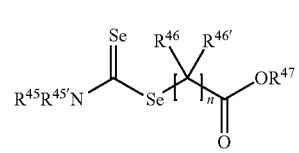

(XIV)

wherein
$R^{45}$ and $R^{45'}$ are each independently H, alkyl, haloalkyl, cycloalkyl, aryl, heteroalicyclic, benzyl or heteroaryl, wherein $R^{45}$, $R^{45'}$ and the adjacent nitrogen may form together a heteroaryl or heteroalicyclic ring;

$R^{46}$ and $R^{46'}$ are each independently H, alkyl, haloalkyl, cycloalkyl, aryl, heteroalicyclic, benzyl or heteroaryl;

$R^{47}$ is H, alkyl, haloalkyl, cycloalkyl, aryl, heteroalicyclic, benzyl or heteroaryl;

each of the alkyl, haloalkyl, aryl, benzyl, cycloalkyl, heteroaryl, heteroalicyclic, of $R^{45}$, $R^{45'}$, $R^{46}$, $R^{46'}$ or $R^{47}$ is optionally substituted with one or more of alkyl, haloalkyl, alkenyl, alkynyl, heteroalicyclic, heteroaryl, O—P(=O)(OR$^{45}$)$_2$, trihalomethyl, S(=O)—R$^{45}$, C(=S)—O—R$^{45}$, C(=O)—S—R$^{45}$, S(=O)$_2$—R$^{45}$, S(=O)$_2$—NR$^{45}$R$^{45'}$, halide, cycloalkyl, alkoxy, nitro, cyano, NR$^{45}$R$^{45'}$, C(O)NR$^{45}$R$^{45'}$, N(R$^{45}$)C(=O)—R$^{45'}$, hydroxy, alkylthiol, thiol, arylthiol, heteroarylthiol, C(=O)—OR$^{45}$, C(=O)—R$^{45}$, aryl, aryloxy, heteroaryloxy, (CH$_2$CH$_2$O)$_{n+1}$ or any combination thereof; and n is an integer between 0 and 10.

In some embodiments, the dithioester, selenothioester and/or thioselenoester compounds as described hereinabove may be added or replaced by molecules of the Formula (XV):

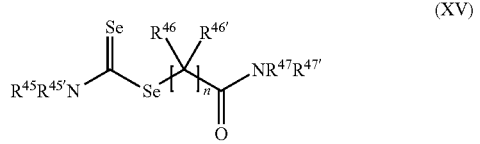
(XV)

wherein
$R^{45}$ and $R^{45'}$ are each independently H, alkyl, haloalkyl, cycloalkyl, aryl, heteroalicyclic, benzyl or heteroaryl, wherein $R^{45}$, $R^{45'}$ and the adjacent nitrogen may form together a heteroaryl or heteroalicyclic ring;
$R^{46}$ and $R^{46'}$ are each independently H, alkyl, haloalkyl, cycloalkyl, aryl, heteroalicyclic, benzyl or heteroaryl;
$R^{47}$ and $R^{47'}$ are each independently H, alkyl, haloalkyl, cycloalkyl, aryl, heteroalicyclic, benzyl or heteroaryl;
each of the alkyl, haloalkyl, aryl, benzyl, cycloalkyl, heteroaryl, heteroalicyclic, of $R^{45}$, $R^{45'}$, $R^{46}$, $R^{46'}$, $R^{47}$ or $R^{47'}$ is optionally substituted with one or more of alkyl, haloalkyl, alkenyl, alkynyl, heteroalicyclic, heteroaryl, O—P(=O)(OR$^{45}$)$_2$, trihalomethyl, S(=O)—R$^{45}$, C(=S)—O—R$^{45}$, C(=O)—S—R$^{45}$, S(=O)$_2$—R$^{45}$, S(=O)$_2$—NR$^{45}$R$^{45'}$, halide, cycloalkyl, alkoxy, nitro, cyano, NR$^{45}$R$^{45'}$, C(O)NR$^{45}$R$^{45'}$, N(R$^{45}$)C(=O)—R$^{45'}$, hydroxy, alkylthiol, thiol, arylthiol, heteroarylthiol, C(=O)—OR$^{45}$, C(=O)—R$^{45}$, aryl, aryloxy, heteroaryloxy, (CH$_2$CH$_2$O)$_{n+1}$ or any combination thereof; and
n is an integer between 0 and 10.

In some embodiments, the dithioester, selenothioester and/or thioselenoester compounds as described hereinabove may be added or replaced by molecules of the Formula (XIII), (XIV), (XV) or any combination thereof, wherein Formula (XIII)-(XV) are described hereinabove. In another embodiment, the compounds may be added or replaced by molecules of the Formula (XIV), (XV) or any combination thereof.

Specific, non-limiting examples include compounds 102-109 presented below.

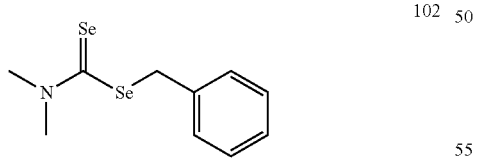
102

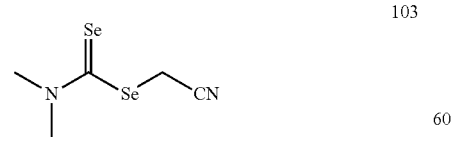
103

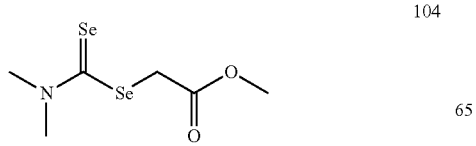
104

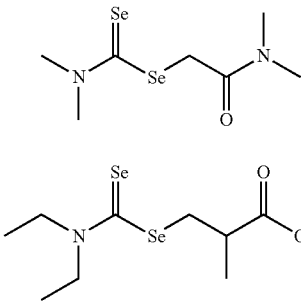
105

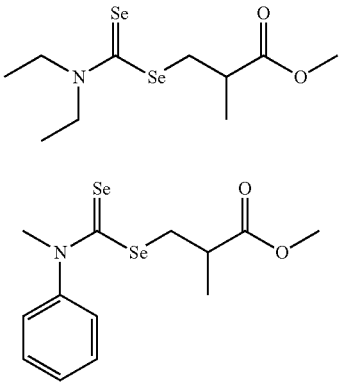
106

107

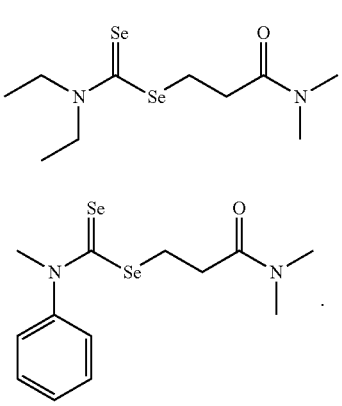

108

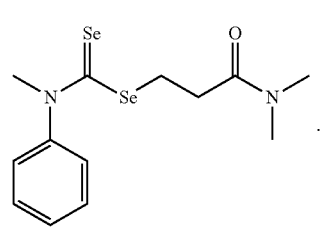

109

In another embodiment, the electrolytic additives are represented by the following non limiting examples:

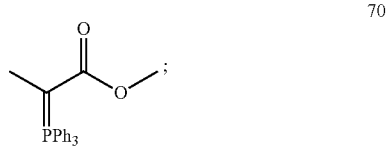
70

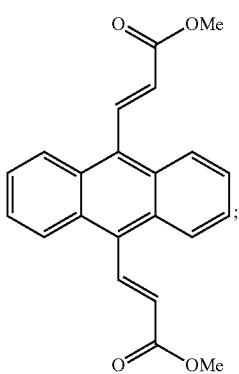
71

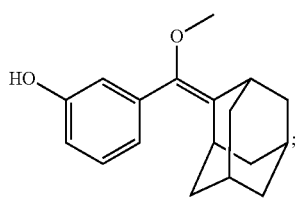
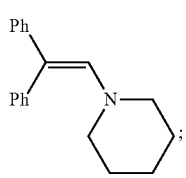
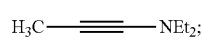
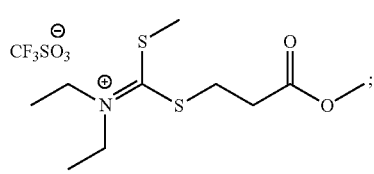
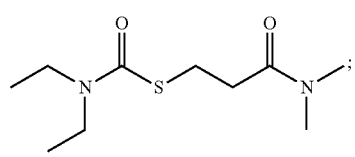
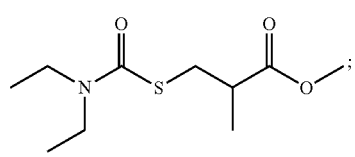
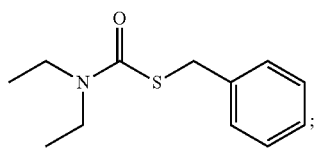
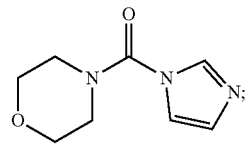
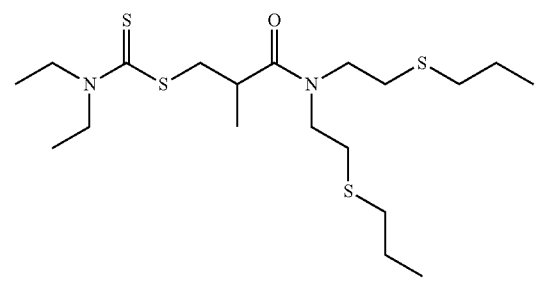
In various embodiments, disclosed additives may comprise any of the following structures and/or variations and substitutions thereof, e.g., as RAFT structures:
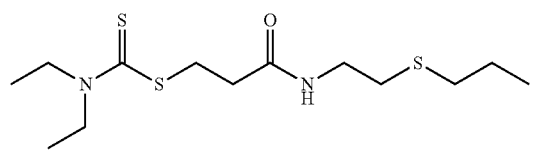
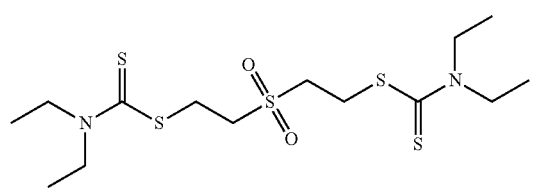
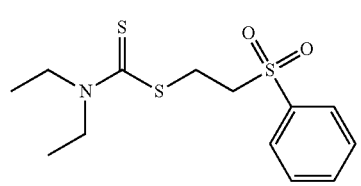
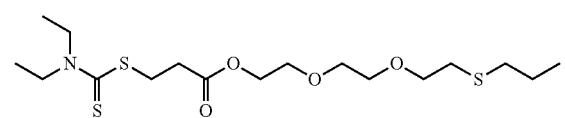
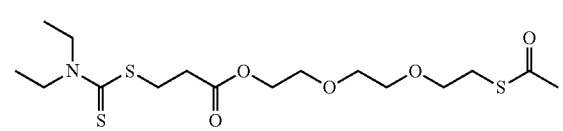

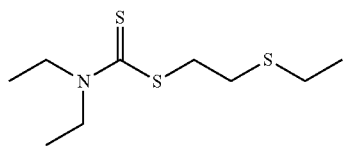
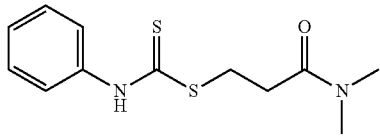
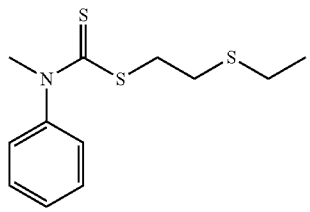
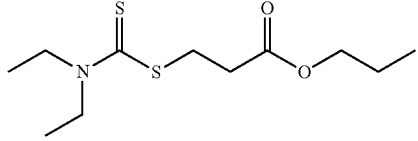
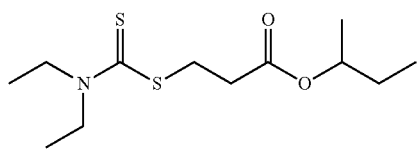
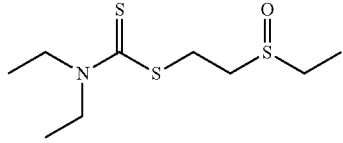
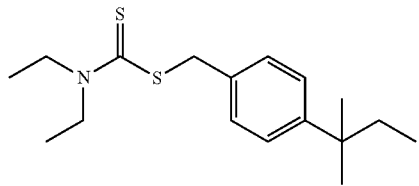
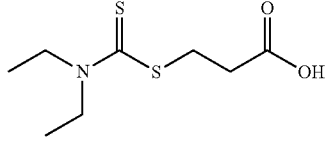
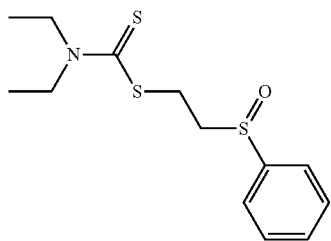
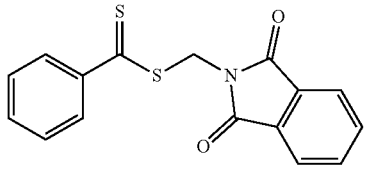
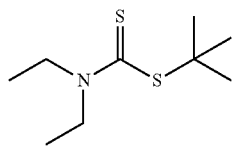
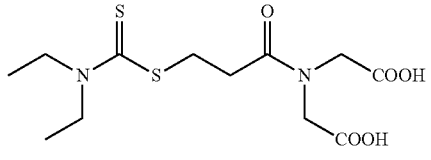
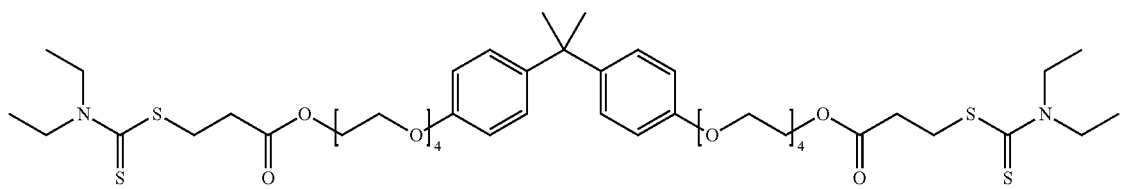
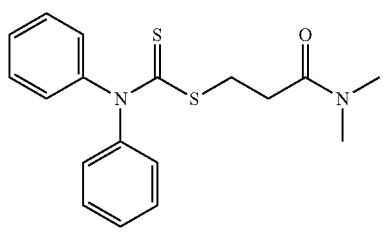
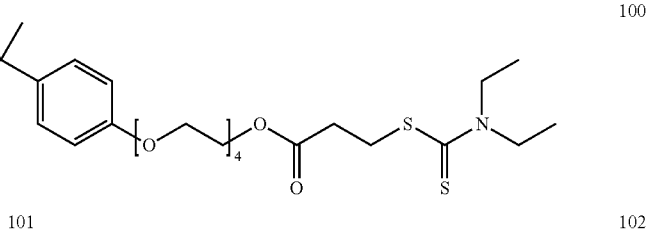
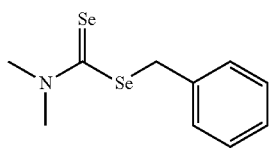

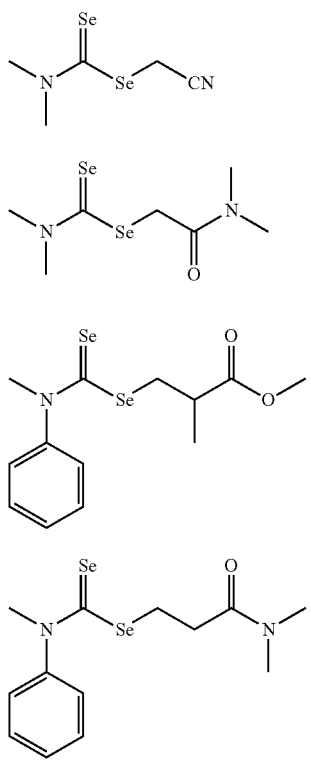

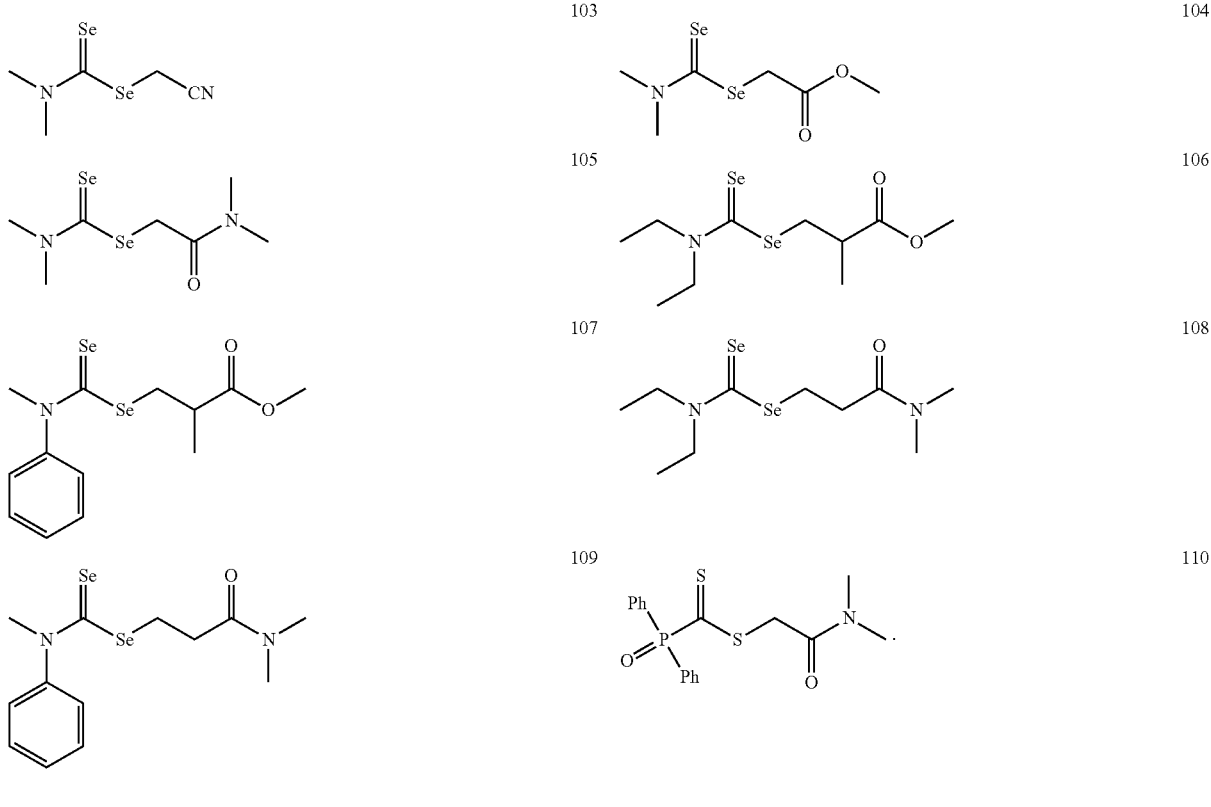

In various embodiments, disclosed additive(s) may be selected or configured to capture reactive oxygen species (ROS) such as oxygen radicals, singlet oxygen ($^1O_2$), hydrogen peroxide ($H_2O_2$) and/or any reactive oxygen-containing compounds including them.

In another experimental setting, graphite-based anodes (without silicon or any other metalloid) were used with NMC-based cathodes in coin cells, comparing the same baseline electrolyte that included vinyl carbonate, butyl acetate and ethyl butyrate with electrolyte that included disclosed additive 1a. The cycling life periods were measured by running five coin cells at 1 C (60 minutes) charging and 1 C (60 minutes) discharging cycles, and yielded over doubled lifetimes using disclosed additive 1a (ca. 230% with respect to the baseline).

The concentration of disclosed additives in the electrolyte may range between 0.01 vol % and 10 vol %, possibly even up to 20 vol %. Typical concentrations may range between 0.1 vol % and 5 vol %, possibly between 0.5 vol % and 2 vol %, e.g., around 1 vol %±0.5 vol %.

Definitions

In some embodiments, $Z^1$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^1R^2$, $P(=O)R^1R^2$, benzyl, thiol, arylthiol, alkylthiol, heteroarylthiol, $O(CH_2)_nC_4H_4S$, amino pyridine, imidazole, cyclic amine, piperazine, $N(CH_2CH_2)_2N—C(=S)—S—Z^2$, a polymeric moiety or an oligomeric moiety. Each possibility represents a separate embodiment of this invention.

In some embodiments, $Z^2$ is alkyl, haloalkyl, benzyl, aryl, cycloalkyl, alkenyl, alkynyl, heteroalicyclic, heteroaryl, a polymeric moiety, $CH(P(=O)(OR^1)_2)((C=O)OR^2)$, $CH_2C_6H_5$, $(CH_2)_n(CO)NR^1R^2$, $(CH_2)_nCOOR^1$, $(CH_2)_n(CO)NH(C_5H_4N)$, $(CH_2)_nSR^1$, $(CH_2)_nS(=O)R^1$, $(CH_2)_nS(=O)_2R^1$,

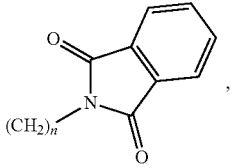

an oligomeric moiety or $S—C(=S)—Z^1$. Each possibility represents a separate embodiment of this invention.

In some embodiments, $Z^3$ is $OR^{15}$ or $NR^{15}R^{15'}$ wherein $R^{15}$, $R^{15'}$ and the adjacent nitrogen may form together a heteroaryl or a heteroalicyclic ring. Each possibility represents a separate embodiment of this invention.

In some embodiments, $Z^4$ is halide, alkyl, haloalkyl, aryl, alkenyl, alkynyl, cycloalkyl, heteroaryl, heteroalicyclic, hydroxyl, alkoxy, aryloxy, heteroaryloxy, $NR^{44}R^{44'}$, $P(=O)R^{44}R^{44'}$, benzyl, thiol, arylthiol, alkylthiol, heteroarylthiol, $O(CH_2)_nC_4H_4S$, amino pyridine, imidazole, cyclic amine, piperazine, $N(CH_2CH_2)_2N—C(=S)—S—Z^5$, $P(=O)(OR^{44})_2$, a polymeric moiety or an oligomeric moiety. Each possibility represents a separate embodiment of this invention.

In some embodiments, $Z^5$ is alkyl, haloalkyl, benzyl, aryl, cycloalkyl, alkenyl, alkynyl, heteroalicyclic, heteroaryl, alkylthiol, $S(=O)_2—R^{44}$, $S(=O)—R^{44}$, $S(=O)_2—NR^{44}R^{44'}$, a polymeric moiety, $CH(P(=O)(OR^{44})_2)((C=O)OR^{44'})$, $CH_2C_6H_5$, $(CH_2)_n(CO)NR^{44}R^{44'}$, $(CH_2)_nCOOR^{44}$, $(CH_2)_n(CO)NH(C_5H_4N)$, $(CH_2)_nSR^{44}$, $(CH_2)_nS(=O)R^{44}$, $(CH_2)_nS(=O)_2R^{44}$,

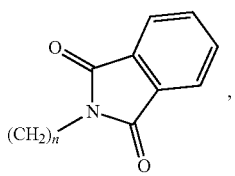

an oligomeric moiety or S—C(=S)—Z$^4$. Each possibility represents a separate embodiment of this invention.

In some embodiments, $R^1$-$R^2$ are each independently H, alkyl, haloalkyl, benzyl, cycloalkyl, aryl, heteroalicyclic, heteroaryl, a polymeric moiety or an oligomeric moiety. In certain embodiments, if nitrogen (N) is adjacent to $R^1$ and $R^2$ then $R^1$, $R^2$ and the adjacent nitrogen form a heteroaryl or a heteroalicyclic ring. Each possibility represents a separate embodiment of this invention.

In some embodiments, $R^3$ and $R^{3'}$ are each independently H, alkyl, haloalkyl, alkenyl, alkynyl, cycloalkyl, aryl, heteroalicyclic heteroaryl, alkoxy, hydroxy, O—P(=O)(=O)$_2$, thiol, alkylthiol, aryloxy, heteroaryloxy, arylthiol, heteroarylthiol, nitro, halide, trihalomethyl, cyano, benzyl, NR$^1$R$^2$, C(O)NR$^1$R$^2$, N(R$^1$)C(=O)—R$^2$, C(=O)—OR$^1$, S(=O)—R$^1$, S(=O)$_2$—R$^1$ or —S(=O)$_2$—NR$^1$R$^2$. Each possibility represents a separate embodiment of this invention.

In some embodiments, $R^4$ is H, alkyl, haloalkyl, cycloalkyl, aryl, heteroalicyclic, benzyl or heteroaryl. Each possibility represents a separate embodiment of this invention.

In some embodiments, $R^5$-$R^7$ are each independently H, alkyl, haloalkyl, cycloalkyl, aryl, heteroalicyclic, benzyl or heteroaryl. Each possibility represents a separate embodiment of this invention.

In some embodiments, $R^8$ is H, alkyl, haloalkyl, alkenyl, alkynyl, cycloalkyl, aryl, heteroalicyclic heteroaryl, alkoxy, hydroxy, O—P(=O)(OR$^5$)$_2$, thiol, alkylthiol, aryloxy, heteroaryloxy, arylthiol, heteroarylthiol, nitro, halide, trihalomethyl, cyano, benzyl, C(O)NR$^5$R$^6$, NR$^5$R$^6$, N(R$^5$)C(=O)—R$^6$, C(=O)—OR$^5$, S(=O)—R$^5$, S(=O)$_2$—R$^5$ or S(=O)$_2$—NR$^5$R$^6$. Each possibility represents a separate embodiment of this invention.

In some embodiments, $R^9$ is H, alkyl, haloalkyl, alkenyl, alkynyl, cycloalkyl, aryl, heteroalicyclic heteroaryl, alkoxy, hydroxy, O—P(=O)(OR$^5$)$_2$, thiol, alkylthiol, aryloxy, heteroaryloxy, arylthiol, heteroarylthiol, nitro, halide, trihalomethyl, cyano, benzyl, C(O)NR$^5$R$^6$, NR$^5$R$^6$, N(R$^5$)C(=O)—R$^6$, C(=O)—OR$^5$, S(=O)—R$^5$, S(=O)$_2$—R$^6$ or S(=O)$_2$—NR$^5$R$^6$. Each possibility represents a separate embodiment of this invention.

In some embodiments, $R^{10}$ is H, alkyl, haloalkyl, cycloalkyl, aryl, heteroalicyclic, benzyl or heteroaryl. Each possibility represents a separate embodiment of this invention.

In some embodiments, $R^{11}$-$R^{14}$ are each independently H, alkyl, haloalkyl, alkenyl, alkynyl, cycloalkyl, aryl, heteroalicyclic heteroaryl, alkoxy, hydroxy, O—P(=O)(OR$^{10}$)$_2$, thiol, alkylthiol, aryloxy, heteroaryloxy, arylthiol, heteroarylthiol, nitro, halide, trihalomethyl, cyano, benzyl, C(O)NR$^{10}$R$^{10'}$, NR$^{10}$R$^{10'}$, N(R$^{10}$)C(=O)—R$^{10'}$, C(=O)—OR$^{10}$, S(=O)—R$^{10}$, S(=O)$_2$—R$^{10}$ or S(=O)$_2$—NR$^{10}$R$^{10'}$. Each possibility represents a separate embodiment of this invention.

In some embodiments, $R^{15}$ and $R^{15'}$ are each independently H, alkyl, haloalkyl, cycloalkyl, aryl, heteroalicyclic, benzyl or heteroaryl. Each possibility represents a separate embodiment of this invention.

In some embodiments, $R^{16}$-$R^{18}$ are each independently H, alkyl, haloalkyl, alkenyl, alkynyl, cycloalkyl, aryl, heteroalicyclic heteroaryl, alkoxy, hydroxy, O—P(=O)(OR$^{15}$)$_2$, thiol, alkylthiol, aryloxy, heteroaryloxy, arylthiol, heteroarylthiol, nitro, halide, trihalomethyl, cyano, benzyl, C(O)NR$^{15}$R$^{15'}$, NR$^{15}$R$^{15'}$, N(R$^{15}$)C(=O)—R$^{15'}$, C(=O)—OR$^{15}$, S(=O)—R$^{15}$, S(=O)$_2$—R$^{15}$ or S(=O)$_2$—NR$^{15}$R$^{15'}$. In another embodiment, $R^{16}$, $R^{17}$ and the adjacent carbon may form together a cycloalkyl ring. Each possibility represents a separate embodiment of this invention.

In some embodiments, $R^{19}$-$R^{23}$ are each independently H, alkyl, haloalkyl, cycloalkyl, aryl, heteroalicyclic, benzyl or heteroaryl. Each possibility represents a separate embodiment of this invention.

In some embodiments, $R^{24}$-$R^{27}$ are each independently H, alkyl, haloalkyl, alkenyl, alkynyl, cycloalkyl, aryl, heteroalicyclic heteroaryl, alkoxy, hydroxy, O—P(=O)(OR$^{15}$)$_2$, thiol, alkylthiol, aryloxy, heteroaryloxy, arylthiol, heteroarylthiol, nitro, halide, trihalomethyl, cyano, benzyl, C(O)NR$^{15}$R$^{15'}$, NR$^{15}$R$^{15'}$, N(R$^{15}$)C(=O)—R$^{15'}$, C(=O)—OR$^{15}$, S(=O)—R$^{15}$, S(=O)$_2$—R$^{15}$ or S(=O)$_2$—NR$^{15}$R$^{15'}$. Each possibility represents a separate embodiment of this invention.

In some embodiments, $R^{28}$-$R^{32}$ are each independently H, alkyl, haloalkyl, alkenyl, alkynyl, cycloalkyl, aryl, heteroalicyclic heteroaryl, alkoxy, hydroxy, O—P(=O)(OR$^{15}$)$_2$, thiol, alkylthiol, aryloxy, heteroaryloxy, arylthiol, heteroarylthiol, nitro, halide, trihalomethyl, cyano, benzyl, C(O)NR$^{15}$R$^{15'}$, NR$^{15}$R$^{15'}$, N(R$^{15}$)C(=O)—R$^{15'}$, C(=O)—OR$^{15}$, S(=O)—R$^{15}$, S(=O)$_2$—R$^{15}$ or S(=O)$_2$—NR$^{15}$R$^{15'}$. Each possibility represents a separate embodiment of this invention.

In some embodiments, $R^{33}$ and $R^{33'}$ are each independently H, alkyl, haloalkyl, cycloalkyl, aryl, heteroalicyclic, benzyl or heteroaryl, wherein $R^{33}$, $R^{33'}$ and the adjacent nitrogen may form together a heteroaryl or a heteroalicyclic ring. Each possibility represents a separate embodiment of this invention.

In some embodiments, $R^{34}$ is H, alkyl, haloalkyl, alkenyl, alkynyl, cycloalkyl, aryl, heteroalicyclic heteroaryl, alkoxy, hydroxy, O—P(=O)(OR$^{33}$)$_2$, thiol, alkylthiol, aryloxy, heteroaryloxy, arylthiol, heteroarylthiol, nitro, halide, trihalomethyl, cyano, benzyl, C(O)NR$^{33}$R$^{33'}$, NR$^{33}$R$^{33'}$, N(R$^{33}$)C(=O)—R$^{33'}$, C(=O)—OR$^{33}$, S(=O)—R$^{33}$, S(=O)$_2$—R$^{33}$ or S(=O)$_2$—NR$^{33}$R$^{33'}$. Each possibility represents a separate embodiment of this invention.

In some embodiments, $R^{35}$ and $R^{35'}$ are each independently H, alkyl, haloalkyl, cycloalkyl, aryl, heteroalicyclic, benzyl or heteroaryl, wherein $R^{35}$, $R^{35'}$ and the adjacent nitrogen may form together a heteroaryl or heteroalicyclic ring. Each possibility represents a separate embodiment of this invention.

In some embodiments, $R^{36}$-$R^{37}$ are each independently alkyl, haloalkyl, benzyl, aryl, cycloalkyl, alkenyl, alkynyl, heteroalicyclic, heteroaryl, CH(P(=O)(OR$^{35}$)$_2$)((C=O)OR$^{35'}$), CH$_2$C$_6$H$_5$, (CH$_2$)$_n$(CO)NR$^{35}$R$^{35'}$ or (CH$_2$)$_n$(COOR$^{35}$). Each possibility represents a separate embodiment of this invention.

In some embodiments, $R^{38}$ and $R^{38'}$ are each independently H, alkyl, haloalkyl, cycloalkyl, aryl, heteroalicyclic, benzyl or heteroaryl, wherein $R^{38}$, $R^{38'}$ and the adjacent nitrogen may form together a heteroaryl or heteroalicyclic ring. Each possibility represents a separate embodiment of this invention.

In some embodiments, $R^{39}$ is alkyl, haloalkyl, benzyl, aryl, cycloalkyl, alkenyl, alkynyl, heteroalicyclic, heteroaryl, CH(P(=O)(OR$^{38}$)$_2$)((C=O)OR$^{38'}$), CH$_2$C$_6$H$_5$, $(CH_2)_n(CO)NR^{38}R^{38'}$ or $(CH_2)_n(COOR^{38})$. Each possibility represents a separate embodiment of this invention.

In some embodiments, $R^{40}$ and $R^{40'}$ are each independently alkyl, haloalkyl, benzyl, aryl, cycloalkyl, alkenyl, alkynyl, heteroalicyclic, heteroaryl, $CH(P(=O)(OR^{41})_2)$ $((C=O)OR^{41'})$, $CH_2C_6H_5$, $(CH_2)_n(CO)NR^{41}R^{41'}$ or $(CH_2)_n(COOR^{41})$. Each possibility represents a separate embodiment of this invention.

In some embodiments, $R^{41}$ and $R^{41'}$ are each independently H, alkyl, haloalkyl, cycloalkyl, aryl, heteroalicyclic, benzyl or heteroaryl. Each possibility represents a separate embodiment of this invention.

In some embodiments, $R^{42}$ and $R^{42'}$ are each independently H, alkyl, haloalkyl, cycloalkyl, aryl, heteroalicyclic, benzyl or heteroaryl, wherein $R^{42}$, $R^{42'}$ and the adjacent nitrogen may form together a heteroaryl or heteroalicyclic ring. Each possibility represents a separate embodiment of this invention.

In some embodiments, $R^{43}$ and $R^{43'}$ are each independently H, alkyl, haloalkyl, cycloalkyl, aryl, heteroalicyclic, benzyl or heteroaryl, wherein $R^{43}$, $R^{43'}$ and the adjacent nitrogen may form together a heteroaryl or heteroalicyclic ring. Each possibility represents a separate embodiment of this invention.

In some embodiments, $R^{44}$ and $R^{44'}$ are each independently H, alkyl, haloalkyl, cycloalkyl, benzyl, aryl, heteroalicyclic, heteroaryl, polymeric moiety or an oligomeric moiety, wherein if nitrogen (N) is adjacent to $R^{44}$ and $R^{44'}$ then $R^{44}$, $R^{44'}$ and the adjacent nitrogen may form a heteroaryl or a heteroalicyclic ring. Each possibility represents a separate embodiment of this invention.

In some embodiments, $R^{45}$ and $R^{45'}$ are each independently H, alkyl, haloalkyl, cycloalkyl, aryl, heteroalicyclic, benzyl or heteroaryl, wherein $R^{45}$, $R^{45'}$ and the adjacent nitrogen may form together a heteroaryl or heteroalicyclic ring. Each possibility represents a separate embodiment of this invention.

In some embodiments, $R^{46}$ and $R^{46'}$ are each independently H, alkyl, haloalkyl, cycloalkyl, aryl, heteroalicyclic, benzyl or heteroaryl. Each possibility represents a separate embodiment of this invention.

In some embodiments, $R^{47}$ and $R^{47'}$ are each independently H, alkyl, haloalkyl, cycloalkyl, aryl, heteroalicyclic, benzyl or heteroaryl. Each possibility represents a separate embodiment of this invention.

In some embodiments, $R^{48}$ and $R^{49}$ are each independently alkyl, haloalkyl, cycloalkyl, aryl, heteroalicyclic, benzyl or heteroaryl. In another embodiment, $R^{45}$ is a $C_3$-$C_{10}$ alkyl, $C_3$-$C_{20}$ alkyl or $C_3$-$C_{30}$ alkyl. In another embodiment, $R^{46}$ is a $C_4$-$C_{10}$ alkyl, $C_4$-$C_{20}$ alkyl or $C_4$-$C_{30}$ alkyl. Each possibility represents a separate embodiment of this invention.

In some embodiments, $R^{48'}$ is a $C_3$-$C_{10}$ alkyl, $C_3$-$C_{20}$ alkyl or $C_3$-$C_{30}$ alkyl. Each possibility represents a separate embodiment of this invention.

In some embodiments, $R^{49'}$ is $C_4$-$C_{10}$ alkyl, $C_4$-$C_{20}$ alkyl or $C_4$-$C_{30}$ alkyl. Each possibility represents a separate embodiment of this invention.

In some embodiments, $R^{50}$ and $R^{51}$ are each independently H, alkyl, haloalkyl, alkenyl, alkynyl, cycloalkyl, aryl, heteroalicyclic heteroaryl, alkoxy, hydroxy, O—P(=O)$(OR^{50})_2$, thiol, alkylthiol, aryloxy, heteroaryloxy, arylthiol, heteroarylthiol, nitro, halide, trihalomethyl, cyano, benzyl, $C(O)NR^{50}R^{51}$, $NR^{50}R^{51}$, $N(R^{50})C(=O)$—$R^{51}$, $C(=O)$—$OR^{50}$, $S(=O)$—$R^{50}$, $S(=O)_2$—$R^{50}$ or $S(=O)_2$—$NR^{50}R^{51}$. Each possibility represents a separate embodiment of this invention.

In some embodiments, $M^1$ is a metal selected from Si, Ti, Zr and Al. Each possibility represents a separate embodiment of this invention.

In some embodiments, n is an integer between 0 and 10. In one embodiment, n is an integer between 0-2, 2-5 or 5-10. Each possibility represents a separate embodiment of this invention.

In some embodiments, p is an integer between 1 and 1000. In one embodiment, p is an integer between 1-100, 100-200, 200-300, 300-400, 400-500, 500-600, 600-700, 700-800, 800-900 or 900-1000. Each possibility represents a separate embodiment of this invention.

In some embodiments, n is an integer between 0 and 10. one embodiment, $n^3$ is 1. In one embodiment, n is 2. In one embodiment, n is 3. In one embodiment, n is 4. In one embodiment, n is 5. In one embodiment, n is 6. In one embodiment, n is 7. In one embodiment, n is 8. In one embodiment, n is 9. In one embodiment, n is 10. Each possibility represents a separate embodiment of this invention.

In some embodiments, $n^1$ is an integer between 1 and 3. In one embodiment, when $M^1$ is Si, Ti or Zr, $n^1$ is an integer between 1 and 3. In one embodiment, when $M^1$ is Al, $n^1$ is an integer between 1 and 2. Each possibility represents a separate embodiment of this invention.

In some embodiment, $n^2$ is 3 or 4. In one embodiment, when $M^1$ is Si, Ti or Zr, $n^2$ is 4. In one embodiment, when $M^1$ is Al, $n^2$ is 3. Each possibility represents a separate embodiment of this invention.

In some embodiments, $n^3$ is an integer between 0 and 10. In one embodiment, $n^3$ is 0. In one embodiment, $n^3$ is 1. In one embodiment, $n^3$ is 2. In one embodiment, $n^3$ is 3. In one embodiment, $n^3$ is 4. In one embodiment, $n^3$ is 5. In one embodiment, $n^3$ is 6. In one embodiment, $n^3$ is 7. In one embodiment, $n^3$ is 8. In one embodiment, $n^3$ is 9. In one embodiment, $n^3$ is 10. Each possibility represents a separate embodiment of this invention.

In some embodiments, L is a linker which is at least one of: a polymeric moiety, an oligomeric moiety, a functional group or any combination thereof where the polymeric moiety, oligomeric moiety and the functional group are as defined herein below. Each possibility represents a separate embodiment of this invention.

In some embodiments, the core is a dendritic, oligomeric or polymeric moiety, where the dendritic moiety, oligomeric moiety and polymeric moiety are as defined herein below. Each possibility represents a separate embodiment of this invention.

In some embodiments, $X^-$ is an anion. In another embodiment, the anion is a monovalent. In another embodiment the anion is polyvalent. In some embodiments, $X^-$ is a triflate $(CF_3SO_3^-)$.

In another embodiment the anion is sulfate, dodecylsulfate (SDS), chloride, bromide, iodide, perchlorate, nitrate, trifluoroacetate, hydroxide, hydrosulfide, sulfide, nitrite, carboxylate, dicarboxylate, sulfonate, tetraflouroborate hexaflourophosphate, hexafluoroarsenate $([AsF_6]^-)$, hexafluoroantimonate $([SbF_6]^-)$, hypophosphite, phosphate, phosphite, cyanate, cyanide, isocyanate, thiocyanate, tetracyanoborate $([B(CN)_4]^-)$, tricyanomethanide $([(NC)_3C]^-)$, dicyanamide $([(NC)_2N]^-)$, triarylmethanide $([(Aryl)_3C]^-)$ wherein aryl is as defined hereinabove, tetralkylborate, tetraarylborate, Difluoro(oxalato)borate, tetrahydroxyborate, bis(oxalato)borate, chromate or sulfonylimide. In another embodiment, non-limiting groups of the carboxylate include formate, propionate, butyrate, lactate, pyruvate, tartrate, ascorbate, gluconate, glutamate, citrate, succinate, maleate, 4-pyridinecarboxylate, 2-hydroxypropanoate, oleate and glucoronate. In another embodiment, non-limiting groups of the sulfonate include mesylate, tosylate, ethanesulfonate, benzenesulfonate, dioctyl sulfosuccinate and triflate. In another embodiment, non-limiting groups of the tetraalkylborates include tetramethylborate, trimethylethylborate and triethylbutylborate. In another embodiment, non-limiting groups of the tetraaryylborates include tetrakis[3,5-bis(trifluoromethyl)phenyl]borate, tetrakis(4-chlorophenyl)borate, tetrakis (pentafluorophenyl)borate and tetrakis(4-fluorophenyl)borate. In another embodiment, the term "sulfonylimide" refers to any anion of the structure $\{[Ewg-SO_2]_2N\}^-$, where "Ewg" is an electron withdrawing moiety. In another embodiment, non-limiting examples of the Ewg include: halide as defined hereinabove, nitro ($NO_2$), cyano (CN) and haloalkyl as defined hereinabove. In another embodiment, non-limiting examples of the sulfonylimide include: bis(trifluoromethane)sulfonimide (TFSI), bis(fluorosulfonyl)imide (FSI) and bis(pentafluoroethyl sulfonyl)imide (BETI). In another embodiment, non-limiting examples of the triarylmethanide include: triphenylmethanide and tris(nitrophenyl)methanide.

In some embodiments, the term "alkyl" comprises an aliphatic hydrocarbon including straight chain and branched chain groups. Preferably, the alkyl group has 1 to 100 carbon atoms, 1-10 carbon atoms, 3-10 carbon atoms, 4-10 carbon atoms, 10-20 carbon atoms, 3-20 carbon atoms, 4-20 carbon atoms, 20-30 carbon atoms, 3-30 carbon atoms, 4-30 carbon atoms, 30-40 carbon atoms, 40-50 carbon atoms, 50-60 carbon atoms, 60-70 carbon atoms, 70-80 carbon atoms, 80-90 carbon atoms or 90-100 carbon atoms. Whenever a numerical range; e.g., "1-100", is stated herein, it implies that the group, in this case the alkyl group, may contain 1 carbon atom, 2 carbon atoms, 3 carbon atoms, etc., up to and including 100 carbon atoms. In certain embodiments, an alkyl group may be substituted or unsubstituted by one or more substituents. Each possibility represents a separate embodiment of this invention.

In some embodiments, the term "alkenyl" refers to an unsaturated alkyl, as defined herein, having at least two carbon atoms and at least one carbon-carbon double bond. In certain embodiments, an alkenyl group may be substituted or unsubstituted by one or more substituents. Each possibility represents a separate embodiment of this invention.

In some embodiments, the term "alkynyl" refers to an unsaturated alkyl having at least two carbon atoms and at least one carbon-carbon triple bond. In certain embodiments, an alkynyl group may be substituted or unsubstituted by one or more substituents. Each possibility represents a separate embodiment of this invention.

In some embodiments, the term "cycloalkyl" refers to an all-carbon monocyclic or fused ring (e.g., rings which share an adjacent pair of carbon atoms) group where one or more of the rings does not have a completely conjugated pi-electron system. In certain embodiments, a cycloalkyl group may be substituted or unsubstituted by one or more substituents. Each possibility represents a separate embodiment of this invention.

In some embodiments, the term "aryl" refers to an all-carbon monocyclic or fused-ring polycyclic (e.g., rings which share adjacent pairs of carbon atoms) groups having a completely conjugated pi-electron system. In certain embodiments, an aryl group may be substituted or unsubstituted by one or more substituents. Each possibility represents a separate embodiment of this invention.

In some embodiments, the term "heteroaryl" refers to a monocyclic or fused ring (e.g., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include succinimide, pyrrole (e.g. 1H-pyrrole or 2H-pyrrole), indole, furan, thiophene, thiadiazole, imidazole, oxazole, thiazole, pyrazole, pyridine, pyrimidine, pyrrolidone (e.g. 2-pyrrolidone or 3-pyrrolidone), quinoline, isoquinoline and purine. The heteroaryl group may be substituted or unsubstituted by one or more substituents. Each possibility represents a separate embodiment of this invention.

In some embodiment, the term "heteroalicyclic" or "heterocyclyl" refers to a monocyclic or fused ring group having in the ring(s) one or more atoms such as nitrogen, oxygen and/or sulfur. The rings may also have one or more double bonds. In certain embodiments, the rings do not have a completely conjugated pi-electron system. Examples, without limitation, include: piperidine, piperazine, tetrahydrofuran, tetrahydropyran, morpholine and the like. The heteroalicyclic or heterocyclyl group may be substituted or unsubstituted by one or more substituents. Each possibility represents a separate embodiment of this invention.

In some embodiments, the term "polymeric moiety" refers to a moiety comprising a polymeric chain and optionally one or more functional groups, defined hereinbelow, linked to the polymeric chain. In some embodiments, the polymeric chain is substituted or unsubstituted by one or more substituents. In some embodiments, the polymeric moiety is a linker or a part of a linker, i.e. it's connected from both sides of the moiety (see polyethylene glycol (PEG) examples below for illustration). In some embodiments, the polymeric moiety is connected from only one side (see polyethylene glycol (PEG) examples below for illustration). In some embodiments, non-limiting examples of polymers include: polyethylene glycol (PEG), polyacrylic acid (PAA), polysaccharides, polypeptides, polynucleotides, polyalkylamines and poly silanes. In some embodiments, non-limiting examples of polysaccharides include: cellulose, starch, glycogen, chitin, amylose and amylopectin. In some embodiments, non-limiting examples of polypeptides include polylysine, polyarginine, polyglycine, polyalanine, cathelicidins, eledoisin and calcitonin. In some embodiments, non-limiting examples of polynucleotides include: RNA and DNA. In some embodiments, non-limiting examples of polyalkylamines include linear and branched polyethylene imines. In some embodiments, non-limiting examples of polysilanes include polydimethylsiloxane (PDMS) and polymethylhydrosiloxane. Each possibility represents a separate embodiment of this invention. In some embodiments, the polymer is a homopolymer or copolymer of the polymers as described hereinabove. In some embodiments, the number of repeating units in one polymeric chain is above 5. In some embodiments, the number of repeating units is 6-10. In some embodiments, the number of repeating units is 10-20. In some embodiments, the number of repeating units is 20-50. In some embodiments, the number of repeating units is 50-100. In some embodiments, the number of repeating units is 100-500. In some embodiments, the number of repeating units is 500-1,000. In some embodiments, the number of repeating units is 1,000-5,000. In some embodiments, the number of repeating units is 5,000-10,000. In some embodiments, the number of repeating units is 10,000-50,000. In some embodiments, the number of repeating units is 50,000-100,000. In some embodiments, the number of repeating units is 100,000-500,000. Each possibility represents a separate embodiment of this invention. In some embodiments, the polymeric moiety is

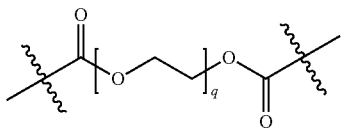

where q is an integer between 6 and 10,000. In some embodiments, the polymeric moiety is

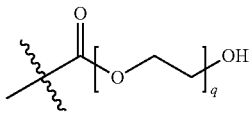

where q is an integer between 6 and 10,000.

In some embodiments, non-limiting examples of functional groups include —O— (ether), —S— (thioether), —O—C(=O)— (ester), —S—C(=S)— (dithioester), —NR$^1$— (amine), —NR$^1$C(=O)— (amide), —(CR$^1$R$^2$)$_n$— (alkylene), —(C(halide)$_2$)$_{n+1}$— (haloalkylene), —S(=O)— (sulfoxide), —S(=O)$_2$— (sulfone), substituted or unsubstituted arylene, substituted or unsubstituted heteroarylene, substituted or unsubstituted cycloalkylene and substituted or unsubstituted heterocyclylene where n is an integer between 0 and 10, R$^1$ and R$^2$ are as defined hereinabove and arylene, heteroarylene, cycloalkylene and heterocyclylene correspond to the hereinabove definitions of aryl, heteroaryl, cycloalkyl and heterocyclyl, respectively. Each possibility represents a separate embodiment of this invention.

In some embodiments, the term "oligomeric moiety" refers to a moiety comprising an oligomeric chain and optionally one or more functional groups, defined hereinabove, linked to the oligomeric chain. In some embodiments, the oligomeric moiety is substituted or unsubstituted by one or more substituents. In some embodiments, the oligomeric moiety is a linker or a part of a linker, i.e. it's connected from both sides of the moiety (see oligoethylene glycol examples below for illustration). In some embodiments, the oligomeric moiety is connected from only one side (see oligoethylene glycol examples below for illustration). In some embodiments, non-limiting examples of oligomers include the same monomers of the polymers as described hereinabove, i.e. ethylene glycol (EG), acrylic acid (PAA), saccharides, peptides, nucleotides, alkylamines and silanes, where the number of repeating units in one oligomeric chain is 2-5. Each possibility represents a separate embodiment of this invention. In some embodiments, the oligomeric moiety is

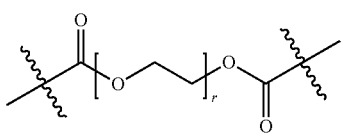

where r is an integer between 2 and 5. In some embodiments, the oligomeric moiety is

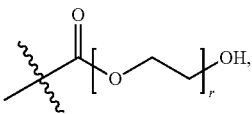

where r is an integer between 2 and 5.

In some embodiments, a dendritic core or a dendrimeric moiety, is defined as repetitively branched molecular moiety. In some embodiments, the dendritic moiety has an atom center (e.g. carbon atom) or a molecular center (e.g. adamantane), where such center is multiply substituted with branches (or "arms") such as functionalized (e.g. with esters or ethers) alkyls and each of these branches is further multiply substituted with identical/other branches; this multiple substitution/functionalization occurs at least once in the smallest dendritic moiety (i.e. carbon with 4 arms) and may occur more than once, when each such substitution/functionalization is referred to as "generation" (i.e. one functionalization of e.g. carbon, the initiator, resulting in tetra-functionalized methane—is a zero generation; subsequent full functionalization of all these four branches with additional branches will result in 12 branches as the first generation and so on). Each possibility represents a separate embodiment of this invention.

In some embodiments, the term "alkoxy" refers to —O-alkyl or an —O-cycloalkyl group and the term "alkylthiol" describes an —S-alkyl or an —S-cycloalkyl group, where alkyl and cycloalkyl are as defined hereinabove. In certain embodiments, the term "aryloxy" and "heteroaryloxy" describe an —O-aryl and an —O-heteroaryl groups, respectively and the term "arylthiol" and "heteroarylthiol" describe an —S-aryl and an —S-heteroaryl groups, where aryl and heteroaryl are as defined hereinabove.

In some embodiments, "halide", "halogen" or "halo" refer to fluorine, chlorine, bromine or iodine.

In some embodiments, the term "haloalkyl" refers to alkyl substituted with at least one halide where alkyl and halide are as defined hereinabove. The haloalkyl group may be substituted or unsubstituted by one or more substituents other than halides. Non-limiting examples of haloalkyl include CF$_3$, CF$_2$CF$_3$, CH$_2$CF$_3$, CCl$_3$, CCl$_2$CCl$_3$, CH$_2$CCl$_3$, CH$_2$CH$_2$CF$_3$, CH$_2$CF$_2$CF$_3$ and CF$_2$CF$_2$CF$_3$. Each possibility represents a separate embodiment of this invention.

In some embodiments, the term "hydroxy" refers to —OH group and the term "thiol" describes a —SH group.

In some embodiments, the term "nitro" group refers to a —NO$_2$ group.

In some embodiments, the term "cyano" or "nitrile" group refers to a —C≡N group.

In some embodiments, non-limiting examples for substituents include: alkyl, haloalkyl, alkenyl, alkynyl, heteroalicyclic, heteroaryl, O—P(=O)(OR$^1$)$_2$ or O—P(=O)(OR$^5$)$_2$ or O—P(=O)(OR$^{10}$)$_2$ or O—P(=O)(OR$^{15}$)$_2$ or O—P(=O)(OR$^{33}$)$_2$ or O—P(=O)(OR$^{35}$)$_2$ or O—P(=O)(OR$^{38}$)$_2$ or O—P(=O)(OR$^{41}$)$_2$ or O—P(=O)(OR$^{42}$)$_2$ or O—P(=O)(OR$^{44}$)$_2$ or O—P(=O)(OR$^{45}$)$_2$ or O—P(=O)(OR$^{46}$)$_2$ or O—P(=O)(OR$^{47}$)$_2$ or O—P(=O)(OR$^{48}$)$_2$ or O—P(=O)(OR$^{50}$), trihalomethyl, S(=O)—R$^1$ or S(=O)—R$^5$ or S(=O)—R$^{10}$ or S(=O)—R$^{15}$ or S(=O)—R$^{33}$ or S(=O)—R$^{35}$ or S(=O)—R$^{38}$ or S(=O)—R$^{41}$ or S(=O)—R$^{42}$ or S(=O)—R$^{44}$ or S(=O)—R$^{45}$ or S(=O)—R$^{46}$ or S(=O)—R$^{47}$ or S(=O)—R$^{48}$ or S(=O)—R$^{50}$, S(=O)$_2$—R$^1$ or S(=O)$_2$—R$^5$ or S(=O)$_2$—R$^{10}$ or S(=O)$_2$—R$^{15}$ or S(=O)$_2$—R$^{33}$ or S(=O)$_2$—R$^{35}$ or S(=O)$_2$—R$^{38}$ or S(=O)$_2$—R$^{41}$ or S(=O)$_2$—R$^{42}$ or S(=O)$_2$—R$^{44}$ or S(=O)$_2$—R$^{45}$ or S(=O)$_2$—R$^{46}$ or S(=O)$_2$—R$^{47}$ or S(=O)$_2$—R$^{48}$ or S(=O)$_2$—R$^{50}$, S(=O)$_2$—NR$^1$R$^2$ or S(=O)$_2$—NR$^5$R$^6$ or S(=O)$_2$—NR$^{10}$R$^{10'}$ or S(=O)$_2$—NR$^{15}$R$^{15'}$ or S(=O)$_2$—NR$^{33}$R$^{33'}$ or S(=O)$_2$—NR$^{35}$R$^{35'}$ or S(=O)$_2$—NR$^{38}$R$^{38'}$ or S(=O)$_2$—NR$^{41}$R$^{41'}$ or S(=O)$_2$—NR$^{42}$R$^{42'}$ or S(=O)$_2$—NR$^{44}$R$^{44'}$ or S(=O)$_2$—NR$^{45}$R$^{45'}$ or S(=O)$_2$—NR$^{46}$R$^{46'}$ or S(=O)$_2$—NR$^{47}$R$^{47'}$ or S(=O)$_2$—NR$^{48}$R$^{49}$ or S(=O)$_2$—NR$^{50}$R$^{51}$, halide, cycloalkyl, alkoxy, nitro, NR$^1$R$^2$ or NR$^5$R$^6$ or NR$^{10}$R$^{10'}$ or NR$^{15}$R$^{15'}$ or NR$^{33}$R$^{33'}$ or NR$^{35}$R$^{35'}$ or NR$^{38}$R$^{38'}$ or NR$^{41}$R$^{41'}$ or NR$^{42}$R$^{42'}$ or NR$^{44}$R$^{44'}$ or NR$^{45}$R$^{45'}$ or NR$^{46}$R$^{46'}$ or NR$^{47}$R$^{47}$ or NR$^{48}$R$^{49}$ or NR$^{50}$R$^{51}$, C(O)NR$^1$R$^2$ or C(O)NR$^5$R$^6$ or C(O)NR$^{10}$R$^{10'}$ or C(O)NR$^{15}$R$^{15'}$ or C(O)NR$^{33}$R$^{33'}$ or C(O)NR$^{35}$R$^{35'}$ or C(O) NR$^{38}$R$^{38'}$ or C(O)NR$^{41}$R$^{41'}$ or C(O)NR$^{42}$R$^{42'}$ or C(O) NR$^{44}$R$^{44'}$ or C(O)NR$^{45}$R$^{45'}$ or C(O)NR$^{46}$R$^{46'}$ or C(O) NR$^{47}$R$^{47'}$ or C(O)NR$^{48}$R$^{49'}$ or C(O)NR$^{50}$R$^{51}$, N(R$^1$)C (=O)—R$^2$ or NR$^5$C(=O)R$^6$ or NR$^{10}$C(=O)R$^{10'}$ or NR$^{15}$C (=O)R$^{15'}$ or NR$^{33}$C(=O)R$^{33'}$ or NR$^{35}$C(=O)R$^{35'}$ or NR$^{38}$C(=O)R$^{38'}$ or NR$^{41}$C(=O)R$^{41'}$ or NR$^{42}$C(=O)R$^{42'}$ or NR$^{44}$C(=O)R$^{44'}$ or NR$^{45}$C(=O)R$^{45'}$ or NR$^{46}$C(=O)R$^{46'}$ or NR$^{47}$C(=O)R$^{47'}$ or NR$^{48}$C(=O)R$^{49}$ or NR$^{50}$C(=O)R$^{51}$, hydroxy, alkylthiol, thiol, arylthiol, heteroarylthiol, C(=O)—OR$^1$ or C(=O)—OR$^5$ or C(=O)—OR$^{10}$ or C(=O)—OR$^{15}$ or C(=O)—OR$^{33}$ or C(=O)—OR$^{35}$ or C(=O)—OR$^{38}$ or C(=O)—OR$^{41}$ or C(=O)—OR$^{42}$ or C(=O)—OR$^{44}$ or C(=O)—OR$^{45}$ or C(=O)—OR$^{46}$, or C(=O)—OR$^{47}$, or C(=O)—OR$^{48}$, or C(=O)—OR$^{50}$, C(=O)—R$^1$ or C(=O)—R$^5$ or C(=O)—R$^{10}$ or C(=O)—R$^{15}$ or C(=O)—R$^{33}$ or C(=O)—R$^{35}$ or C(=O)—R$^{38}$ or C(=O)—R$^{41}$ or C(=O)—R$^{42}$ or C(=O)—R$^{44}$ or C(=O)—R$^{45}$ or C(=O)—R$^{46}$ or C(=O)—R$^{47}$ or C(=O)—R$^{48}$ or C(=O)—R$^{50}$, aryl, aryloxy, heteroaryloxy, C(=S)—O—R$^1$ or C(=S)—O—R$^5$ or C(=S)—O—R$^{10}$ or C(=S)—O—R$^{15}$ or C(=S)—O—R$^{33}$ or C(=S)—O—R$^{35}$ or C(=S)—O—R$^{38}$ or C(=S)—O—R$^{41}$ or C(=S)—O—R$^{42}$ or C(=S)—O—R$^{44}$ or C(=S)—O—R$^{45}$ or C(=S)—O—R$^{46}$ or C(=S)—O—R$^{47}$ or C(=S)—O—R$^{48}$ or C(=S)—O—R$^{50}$, C(=O)—S—R$^1$ or C(=O)—S—R$^5$ or C(=O)—S—R$^{10}$ or C(=O)—S—R$^{15}$ or C(=O)—S—R$^{33}$ or C(=O)—S—R$^{35}$ or C(=O)—S—R$^{38}$ or C(=O)—S—R$^{41}$ or C(=O)—S—R$^{42}$ or C(=O)—S—R$^{44}$ or C(=O)—S—R$^{45}$ or C(=O)—S—R$^{46}$ or C(=O)—S—R$^{47}$ or C(=O)—S—R$^{48}$ or C(=O)—S—R$^{50}$, (CH$_2$CH$_2$O)$_{n+1}$, or any combination thereof. Each possibility represents a separate embodiment of this invention.

Electrolyte additives as described hereinabove are provided, which improve the formation and operation of lithium ion battery, in particular fast-charging lithium-ion batteries having anodes with anode material which is based on any of Si, Ge and/or Sn. In some embodiments, the disclosed additives increase the cycling lifetime of the batteries, which is a critical parameter of their performance.

In certain embodiments, VC or poly-VC may be added to the anode slurry and/or to the binder, to reduce electrolyte consumption and to improve control of the poly-VC chain lengths. Poly-VC may build an artificial SEI on the anode material particles even before, or during formation. In such embodiments, the electrolyte may have less VC (e.g., 5%, 10%, 20%), to reduce its viscosity. Poly-VC for the anode slurry (or binder) may be prepared with polymerization controlling agent to control the molecular weights of the chains (chain length). Electrolyte modifications and anode modifications may be combined and optimized.

In certain embodiments, sacrificial lithium salts may be used in the electrolyte during the formation stage, and/or as part of the anode slurry and/or the cathode formulation—to compensate for lithium losses during the formation stage (e.g., caused by SEI formation) and to increase the energy density. Disclosed lithium salts may enhance lithium content in the electrolyte and/or in the anode and/or in the cathode (e.g., having higher lithium density than respective cathode materials), and possibly be removed as gaseous compounds such as N$_2$, CO$_2$, CO, COS, etc. at a degassing stage after cell formation cycles. Advantageously, removal of the supporting molecular structure (that binds the lithium in the salt) by degassing reduces the volume of non-active material in the cell.

Suggested sacrificial lithium salts include any of the following, substituted or un-substituted, as well as derived compounds: Lithium azodicarboxylate, Lithium bicarbonate R—C(=S)SLi, R—C(=O)SLi, R—C(=S)OLi and Lithium sulfinates, R—SO$_2$Li, where R is e.g., alkyl, haloalkyl, cycloalkyl, carbonyl (e.g., formyl CHO, alkyl or aryl carbonyls with various residues), thiocarbonyl (e.g., thioformyl CHS, alkyl or aryl thiocarbonyls with various residues), aryl, NR$^1$R$^2$, thiol, arylthiol, alkylthiol, heteroarylthiol, heteroalicyclic or heteroaryl; and where alkyl, haloalkyl, cycloalkyl, caroyl, thiocarboyl, aryl, NR$^1$R$^2$, thiol, arylthiol, alkylthiol, heteroarylthiol, heteroalicyclic or heteroaryl are defined hereinabove.

Non-limiting examples for sacrificial lithium salts include:

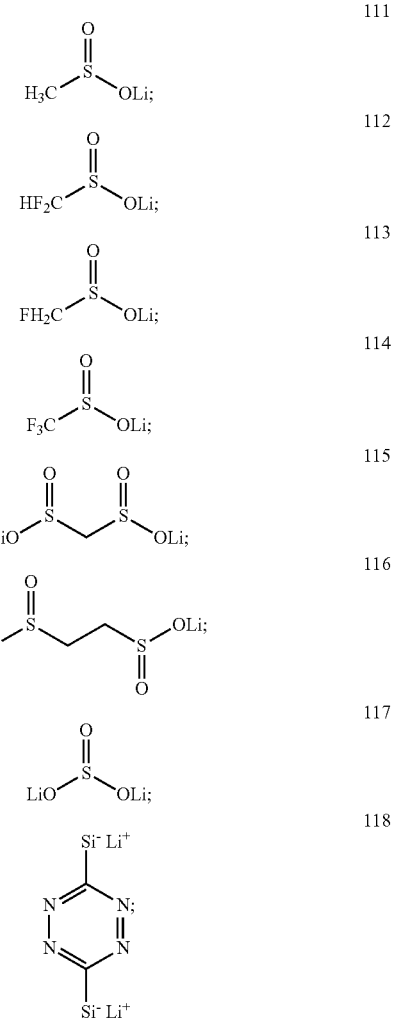

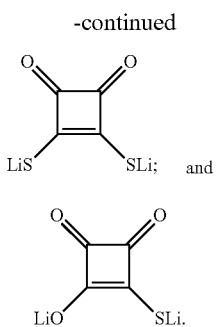

In certain embodiments, any one or more of the oxygen atoms may be exchanged by a sulfur atom.

Non-limiting examples for Lithium azodicarboxylate and Lithium bicarbonate include, respectively:

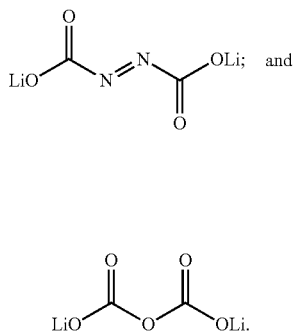

In certain embodiments, Li-poly-aspartate (PAsp) may be used instead of, or in addition to, Li-polyacrylate (PAAc) as binder—for Ge, Si, Sn and possibly graphite anode materials. PAsp is advantageous in that it is environmentally friendly, and possibly improves performance with respect to PAA.

Piezoelectric binders may be used to improve the accommodation of the expanding active material particle within the binder. Optionally, piezoelectric binders may be selected to expand mechanically at voltages corresponding to the lithiation voltage of the anode material particles.

Alternatively or complementarily, piezoelectric binders may be selected so that the mechanical pressure applied by the expanding anode material particle on the binder reduces the anode voltage—allowing extra-charging.

Combinations of the ideas disclosed above may be modified and optimized to improve the operation and/or performance of lithium ion batteries with respect to any of their cycle life, charging/discharging rates, safety and/or capacity.

Any of the disclosed embodiments may be implemented in lithium ion batteries to improve their cycle life, charging/discharging rates, safety and/or capacity. Lithium ion batteries typically comprise anodes and cathodes with current collectors affixed thereto, packed with electrolyte and separator(s) in a soft or/and hard package (e.g., pouches, prismatic or cylindrical packages, etc. Anodes are typically made of anode material particles and additional materials, such as conductive additive(s), binder(s), surfactants, dispersive materials, porosity control materials, etc., and may comprise any of the anode configurations taught, e.g., by U.S. Patent Publication No. 2017/0294687, incorporated herein by reference in its entirety. In certain embodiments, polymerization of coating 105 and/or of coatings of the anode material particles may be controlled, as disclosed, e.g., in any of U.S. Patent Publication No. 2019/0198912 and U.S. Patent Application Nos. 62/711,639 and 62/804,778, incorporated herein by reference in their entirety. For example, anodes may be based on carbon (e.g., graphite, graphene or other carbon-based materials), metalloid anode material such as Si, Ge, Sn and their combinations and/or metals such as Li-metal. Cathodes may comprise lithium metal oxide (LiMeO), wherein Me can be one or several metals selected from Ni, Co, Fe, Mn and Al or sulfur-based cathodes. For example, cathodes may comprise materials based on layered, spinel and/or olivine frameworks, such as LCO formulations (based on $LiCoO_2$), NMC formulations (based on lithium nickel-manganese-cobalt), NCA formulations (based on lithium nickel cobalt aluminum oxides), LMO formulations (based on $LiMn_2O_4$), LMN formulations (based on lithium manganese-nickel oxides) lithium iron-phosphorus oxide (LFP) formulations (based on $LiFePO_4$), lithium rich cathodes, and/or combinations thereof. Cathodes may further comprise additive (e.g., conductive additives), binders, etc. Separator(s) may comprise various materials, e.g., polymers such as any of polyethylene (PE), polypropylene (PP), polyethylene terephthalate (PET), poly vinylidene fluoride (PVDF), polymer membranes such as a polyolefin, polypropylene, or polyethylene membranes. Multi-membranes made of these materials, micro-porous films and/or spray coating thereof, woven or non-woven fabrics etc. may be used as separator(s), as well as possibly composite materials including, e.g., alumina, zirconia, titania, magnesia, silica and calcium carbonate along with various polymer components as listed above.

In any of the disclosed embodiments, electrolytes may be based on liquid electrolytes, typically linear and cyclic carbonates and monothiocarbonates, such as EC (ethylene carbonate), DC (diethyl carbonate), PC (propylene carbonate), VC (vinylene carbonate), FEC (fluoroethylene carbonate), DEC (diethyl carbonate), EB (ethyl butyrate), BA (butyl acetate), EA (ethyl acetate), EMC (ethyl methyl carbonate), DMC (dimethyl carbonate), 1,3-dioxole-2-thione and combinations thereof.

In various embodiments, the electrolytes may comprise any liquid, polymer, gel (e.g., inorganic silica gel electrolytes), glass (e.g., amorphous sulfides-based electrolytes), solid polymer electrolytes (e.g., polyethylene oxide, fluorine-containing polymers and copolymers such as polytetrafluoroethylene), polycrystalline inorganic solid electrolytes and/or combinations thereof. Electrolytes may comprise lithium electrolyte salt(s) such as $LiPF_6$, $LiBF_4$, lithium bis(oxalato)borate, $LiN(CF_3SO_2)_2$, $LiN(C_2F_5SO_2)_2$, $LiAsF_6$, $LiC(CF_3SO_2)_3$, $LiClO_4$, LiTFSI, $LiB(C_2O_4)_2$, $LiBF_2(C_2O_4)$), tris(trimethylsilyl)phosphite (TMSP), and combinations thereof. Ionic liquid(s) may be added to the electrolyte as taught by WIPO Publication No. WO 2018/109774, incorporated herein by reference in its entirety. For example, electrolytes may comprise a large proportion, e.g., 10%, 20%, 30% or more of VC and/or FEC as prominent cyclic carbonate compound, as disclosed e.g., in U.S. Pat. No. 10,199,677, incorporated herein by reference in its entirety. In certain embodiments, electrolytes may comprise linear solvent comprising at least one three-carbon and/or four-carbon chain ester, cyclic carbonate solvent and at least one lithium salt, as disclosed e.g., in U.S. Patent Publication No. 2019/0148774, incorporated herein by reference in its entirety.

In certain embodiments, the four-carbon chain ester may be represented by the structure of Formula (XVI):

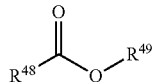

(XVI)

wherein $R^{48}$ and $R^{49}$ are each independently alkyl, haloalkyl, cycloalkyl, aryl, heteroalicyclic, benzyl or heteroaryl;

each of the alkyl, haloalkyl, cycloalkyl, aryl, heteroalicyclic, benzyl or heteroaryl of $R^{48}$, or $R^{49}$ is optionally substituted with one or more of alkyl, haloalkyl, alkenyl, alkynyl, heteroalicyclic, heteroaryl, O—P(=O)(OR$^8$)$_2$, trihalomethyl, cyano, S(=O)—R$^{48}$, S(=O)$_2$—R$^{48}$, S(=O)$_2$—NR$^{48}$R$^{49}$, halide, cycloalkyl, alkoxy, nitro, NR$^{48}$R$^{49}$, C(O)NR$^{48}$R$^{49}$, N(R$^{48}$)C(=O)—R$^{49}$, hydroxy, alkylthiol, thiol, arylthiol, heteroarylthiol, C(=O)—OR$^{48}$, C(=O)—R$^{48}$, aryl, aryloxy, heteroaryloxy, (CH$_2$CH$_2$O)$_{n+1}$ or any combination thereof; and n is an integer between 0 and 10.

In another embodiment, $R^{48}$ is a $C_3$-$C_{10}$ alkyl, $C_3$-$C_{20}$ alkyl or $C_3$-$C_{30}$ alkyl. In another embodiment, $R^{48}$ is a $C_4$-$C_{10}$ alkyl, $C_4$-$C_{20}$ alkyl or $C_4$-$C_{30}$ alkyl. In another embodiment, the electrolyte is ethyl butyrate or butyl acetate.

In certain embodiments, the four-carbon chain ester may be represented by the structure of Formula (XVIa):

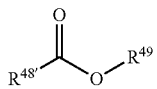

(XVIa)

wherein $R^{48'}$ is a $C_3$-$C_{10}$ alkyl, $C_3$-$C_{20}$ alkyl or $C_3$-$C_{30}$ alkyl;

$R^{49}$ is alkyl, haloalkyl, cycloalkyl, aryl, heteroalicyclic, benzyl or heteroaryl;

each of the alkyl, haloalkyl, cycloalkyl, aryl, heteroalicyclic, benzyl or heteroaryl of $R^{48'}$ or $R^{49}$ is optionally substituted with one or more of alkyl, haloalkyl, alkenyl, alkynyl, heteroalicyclic, heteroaryl, O—P(=O)(OR$^{48}$)$_2$, trihalomethyl, cyano, S(=O)—R$^{49}$, S(=O)$_2$—R$^{48}$, S(=O)$_2$—NR$^{48}$R$^{49}$, halide, cycloalkyl, alkoxy, nitro, NR$^{48}$R$^{49}$, C(O)NR$^{48}$R$^{49}$, N(R$^{48}$)C(=O)—R$^{49}$, hydroxy, alkylthiol, thiol, arylthiol, heteroarylthiol, C(=O)—OR$^{48}$, C(=O)—R$^{48}$, aryl, aryloxy, heteroaryloxy, (CH$_2$CH$_2$O)$_{n+1}$ or any combination thereof;

$R^{48}$ is alkyl, haloalkyl, cycloalkyl, aryl, heteroalicyclic, benzyl or heteroaryl; and n is an integer between 0 and 10.

In certain embodiments, the four-carbon chain ester may be represented by the structure of Formula (XVIb):

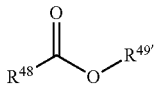

(XVIb)

wherein $R^{48}$ is alkyl, haloalkyl, cycloalkyl, aryl, heteroalicyclic, benzyl or heteroaryl;

$R^{49'}$ is $C_4$-$C_{10}$ alkyl, $C_4$-$C_{20}$ alkyl or $C_4$-$C_{30}$ alkyl;

each of the alkyl, haloalkyl, cycloalkyl, aryl, heteroalicyclic, benzyl or heteroaryl of $R^{48}$ or $R^{49'}$ is optionally substituted with one or more of alkyl, haloalkyl, alkenyl, alkynyl, heteroalicyclic, heteroaryl, O—P(=O)(OR$^{48}$)$_2$, trihalomethyl, cyano, S(=O)—R$^{48}$, S(=O)$_2$—R$^{48}$, S(=O)$_2$—NR$^{48}$R$^{49}$, halide, cycloalkyl, alkoxy, nitro, NR$^{48}$R$^{49}$, C(O)NR$^{48}$R$^{49}$, N(R$^{48}$)C(=O)—R$^{49}$, hydroxy, alkylthiol, thiol, arylthiol, heteroarylthiol, C(=O)—OR$^{48}$, C(=O)—R$^{48}$, aryl, aryloxy, heteroaryloxy, (CH$_2$CH$_2$O)$_{n+1}$ or any combination thereof;

$R^{49}$ is alkyl, haloalkyl, cycloalkyl, aryl, heteroalicyclic, benzyl or heteroaryl; and n is an integer between 0 and 10.

In certain embodiments, the four-carbon chain ester may be represented by the structure of Formula (XIa), Formula (XVIb), or any combination thereof wherein Formula (XVIa) and Formula (XVIb) are described hereinabove.

In certain embodiments, the cyclic carbonate may be represented by the structure of Formula (XVII):

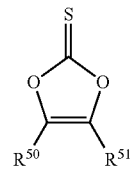

(XVII)

wherein $R^{50}$ and $R^{51}$ are each independently H, alkyl, haloalkyl, alkenyl, alkynyl, cycloalkyl, aryl, heteroalicyclic heteroaryl, alkoxy, hydroxy, O—P(=O)(OR$^{50}$)$_2$, thiol, alkylthiol, aryloxy, heteroaryloxy, arylthiol, heteroarylthiol, nitro, halide, trihalomethyl, cyano, benzyl, C(O)NR$^{50}$R$^{51}$, NR$^{50}$R$^{51}$, N(R$^{50}$)C(=O)—R$^{51}$, C(=O)—OR$^{50}$, S(=O)—R$^{50}$, S(=O)$_2$—R$^{50}$ or S(=O)$_2$—NR$^{50}$R$^{51}$;

each of the alkyl, alkenyl, alkynyl, haloalkyl, cycloalkyl, aryl, benzyl, heteroaryl, heteroalicyclic, alkoxy, alkylthiol, heteroarylthiol, aryloxy, heteroaryloxy or arylthiol of $R^{50}$ or $R^{51}$ is optionally substituted with one or more of alkyl, haloalkyl, alkenyl, alkynyl, heteroalicyclic, heteroaryl, O—P(=O)(OR$^{50}$)$_2$, trihalomethyl, cyano, S(=O)—R$^{50}$, S(=O)$_2$—R$^{50}$, S(=O)$_2$—NR$^{50}$R$^{51}$, halide, cycloalkyl, alkoxy, nitro, NR$^{50}$R$^{51}$, C(O)NR$^{50}$R$^{51}$, N(R$^{50}$)C(=O)—R$^{51}$, hydroxy, alkylthiol, thiol, arylthiol, heteroarylthiol, C(=O)—OR$^{50}$, C(=O)—R$^{50}$, aryl, aryloxy, heteroaryloxy, (CH$_2$CH$_2$O)$_{n+1}$ or any combination thereof; and n is an integer between 0 and 10.

In another embodiment, the cyclic carbonate may be represented by compound 123:

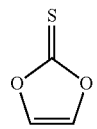

123

A range of experiments has been carried out with various electrolyte solution compositions and various additives. The baseline electrolyte solution comprises a solution of 30 wt % VC, 70 wt % four-carbon ester, 1M LiPF$_6$ salt, without additives. The wt % is provided with respect to the baseline electrolyte solution. Typically, in a non-limiting manner, the four-carbon ester included 1:1 ethyl butyrate, EB and butyl acetate, BA. The following modifications resulted in the following cycling lifetime extensions (in percentage compared to the cycling lifetime with the baseline electrolyte solution, which is designated as 100%):

A solution of 30 wt % VC, 70 wt % four-carbon ester, 1M LiPF$_6$ salt, with a RAFT RS460 additive (compound 1a) between 0.3-0.9 wt % to control SEI growth—resulting in cycling lifetime of 150% with respect to the baseline solution.

A solution of 10 wt % VC, 90 wt % four-carbon ester, 1M LiPF$_6$ salt, without additional additives—resulting in cycling lifetime of 120% with respect to the baseline solution.

A solution of 10 wt % VC, 90 wt % four-carbon ester, 1M LiPF$_6$ salt, with a RAFT RS460 additive (compound 1a) between 0.3-0.9 wt % to control SEI growth—resulting in cycling lifetime of 120% with respect to the baseline solution.

A solution of 20 wt % VC, 90 wt % four-carbon ester, 1M LiPF$_6$ salt, with a RAFT RS460 additive (compound 1a) between 0.3-0.9 wt % to control SEI growth—resulting in cycling lifetime of 120% with respect to the baseline solution.

A solution of 10 wt % VC, 90 wt % four-carbon ester, 1M LiPF$_6$ salt, with a RAFT RS549 (compound 35) between 0.3-0.9 wt % to control SEI growth—resulting in cycling lifetime of 170% with respect to the baseline solution.

A solution of 30 wt % VC, 70 wt % four-carbon ester, 1M LiPF$_6$ salt, with additives 1,3 propanesultone (PS) between 2.5-7.5 wt. % to reduce swelling at elevated temperatures, tertamilbenzene (t-AmB) between 0.5-5 wt % to reduced side reaction at the cathode, and RAFT RS460 (compound 1a) additive between 0.3-0.9 wt % to control SEI growth—resulting in cycling lifetime of 100% with respect to the baseline solution. It is noted that additives t-AmB and RS460 (compound 1a) thus compensated for the reduction in cycling lifetime known to be caused by PS that is used to stabilize the SEI and reduce anode swelling.

A solution of 30 wt % VC, 70 wt % four-carbon ester, 1M LiPF$_6$ salt, with a RAFT RS549 (compound 35) additive between 0.3-0.9 wt % to control SEI growth—resulting in cycling lifetime of 170% with respect to the baseline solution.

A solution of 30 wt % VC, 70 wt % four-carbon ester, 1M LiPF$_6$ salt, with a LiFOB additive between 1-5 wt % to reduce the side reaction at the cathode and a RAFT RS460 (compound 1a) additive between 0.3-0.9 wt % to control SEI growth—resulting in cycling lifetime of 150% with respect to the baseline solution.

A solution of 30 wt % VC, 70 wt % four-carbon ester, 1M LiPF$_6$ salt, with a Tertamilbenzene (t-AmB) additive between 0.5-5 wt % to reduce side reaction at the cathode—resulting in cycling lifetime of 200% with respect to the baseline solution.

It is noted that RAFT RS549 and RS460 are represented, respectively, by:

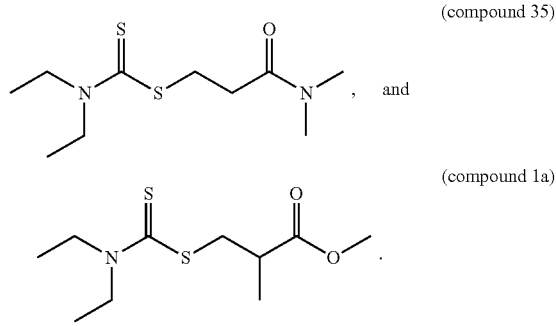

Figure 6:
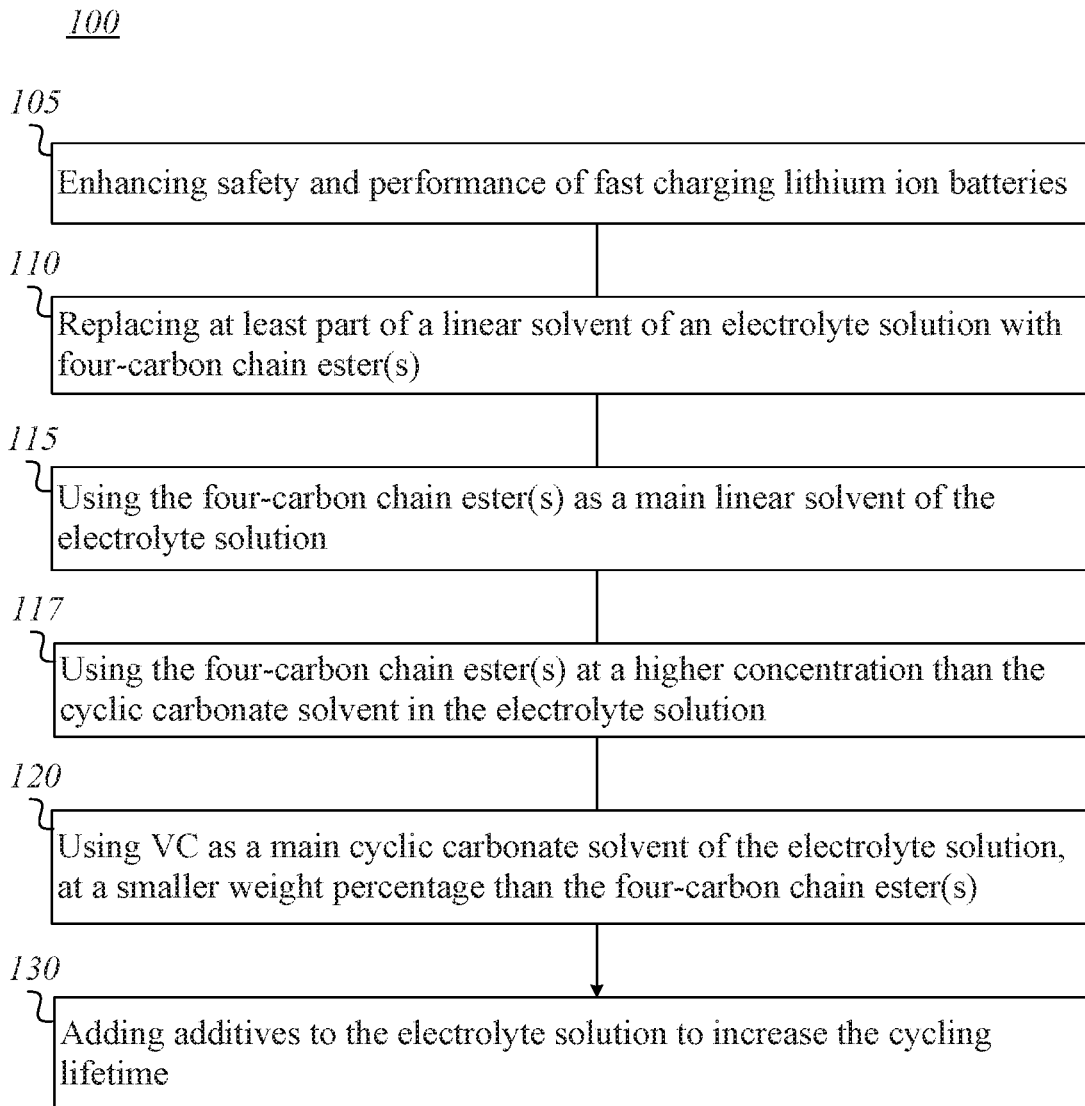
FIG. 6 is a high-level flowchart illustrating a method, according to some embodiments of the invention.

FIG. 6 is a high-level flowchart illustrating a method 100, according to some embodiments of the invention. The method stages may be carried out with respect to the disclosed electrolyte solution, which may optionally be configured to implement method 100. Method 100 may comprise the following stages, irrespective of their order.

Method 100 may comprise enhancing safety and performance of fast charging lithium ion batteries (stage 105), for example by replacing at least part of a linear solvent of an electrolyte solution with at least one four-carbon chain ester (stage 110), e.g., as represented by the structure of Formula (XIV), at a higher concentration than a cyclic carbonate solvent in the electrolyte solution (stage 117). Method 100 may comprise using the at least one four-carbon chain ester as a main linear solvent of the electrolyte solution (stage 115), and using VC as a main cyclic carbonate solvent of the electrolyte solution (stage 120), with the VC being at a smaller weight percentage than the at least one four-carbon chain ester. Method 100 may further comprise adding additives, such as compound 1a, compound 35, LiFOB and/or t-AmB to the electrolyte solution to increase the cycling lifetime of the batteries.

In some embodiments, any combination of the additives, solvents, electrolytes, lithium salts or any other ingredient as described hereinabove can be employed within lithium ion batteries, electrolytic solutions and methods of the present invention. In another embodiment, a linear solvent within the electrolytic solutions comprises at least one four-carbon chain ester, represented by the structure of Formula (XVIa), Formula (XVIb) or any combination thereof as described above. In another embodiment, the solution further comprises compound 1a, compound 35, compound 36, LiFOB and/or tertamilbenzene (t-AmB). In another embodiment, an additive within the electrolytic solutions comprises tertamilbenzene (t-AmB,

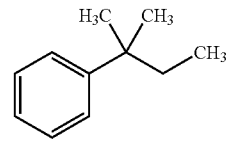

the structure of Formula (I) as described above or any combination thereof.

In another embodiment, an additive within the electrolytic solutions comprises the structure of Formula (Ia), (Iai) or any combination thereof where Formula (Ia) and (Iai) are described above. In another embodiment, an additive within the electrolytic solutions comprises the structure of at least one of compound 1a, compound 35, compound 36, LiFOB and tertamilbenzene (t-AmB). In another embodiment, the solvent within the solutions is a four-carbon chain ester solvent which is represented by the structure of Formula (XVIa), Formula (XVIb) or any combination thereof where Formula (XVIa) and (XVIb) are described above.

Disclosed lithium ion batteries (and/or respective battery cells thereof) may at least partly be configured, e.g., by selection of materials, to enable operation at high charging and/or discharging rates (C-rate), ranging from 3-10 C-rate, 10-100 C-rate or even above 100 C, e.g., 4 C, 5 C, 10 C, 15C, 30 C or more. It is noted that the term C-rate is a measure of charging and/or discharging of cell/battery capacity, e.g., with 1 C denoting charging and/or discharging the cell in an hour, and XC (e.g., 5 C, 10 C, 50 C etc.) denoting charging and/or discharging the cell in 1/X of an hour—with respect to a given capacity of the cell.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A lithium ion battery comprising:
   at least one anode comprising anode active material based on Si, Ge and/or Sn,
   at least one cathode comprising cathode active material based on at least one formulation comprising lithium iron-phosphorus (LFP) oxide and lithium metal oxide (LiMeO), wherein Me is one or more metal selected from nickel, cobalt, manganese and aluminum and Li and O represent one or more respective lithium and oxygen atoms, and
   electrolyte comprising:
      solvent comprising at least one linear carbonate and/or ester and at least one cyclic carbonate and/or ester,
      at least one dissolved lithium salt, and
   at least one additive at 5 wt % at most, selected to enable fast charging the lithium ion battery at a maximal charging rate of 4 C or more;
   wherein the at least one additive is represented by Formula (VIIbi):

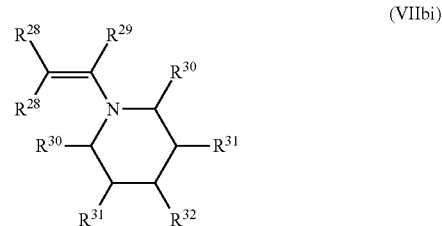

(VIIbi)

wherein
wherein $R^{28}$-$R^{32}$ are each independently $C(O)NR^1R^2$, $NR^1R^2$, $N(R^1)C(=O)—R^2$, $C(=O)—OR^1$, $S(=O)—R^1$, $S(=O)_2—R^1$ or $S(=O)_2—NR^1R^2$;
$n^3$ each is independently an integer between 0 and 10; and
n each is independently an integer between 0 and 10.

2. A lithium ion battery comprising:
   at least one anode comprising anode active material based on Si, Ge and/or Sn,
   at least one cathode comprising cathode active material based on at least one formulation comprising lithium iron-phosphorus (LFP) oxide and lithium metal oxide (LiMeO), wherein Me is one or more metal selected from nickel, cobalt, manganese and aluminum and Li and O represent one or more respective lithium and oxygen atoms, and
   electrolyte comprising:
      solvent comprising at least one linear carbonate and/or ester and at least one cyclic carbonate and/or ester,
      at least one dissolved lithium salt, and
   at least one additive at 5 wt % at most, selected to enable fast charging the lithium ion battery at a maximal charging rate of 4 C or more;
   wherein the at least one additive is represented by Formula (VIIbi):

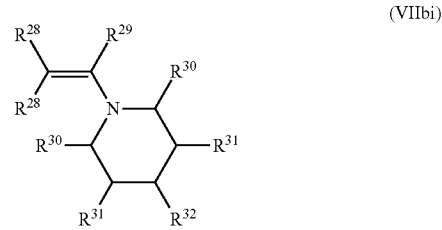

(VIIbi)

wherein
$R^{28}$-$R^{32}$ are each independently hydroxy, $O—P(=O)(OR^{15})_2$ or $R^{15}R^{15'}$;
$R^{15}$ and $R^{15'}$ are described hereinabove; and
n is an integer between 0 and 10.

* * * * *